US009059961B2

(12) United States Patent
Hindawi et al.

(10) Patent No.: US 9,059,961 B2
(45) Date of Patent: Jun. 16, 2015

(54) CREATION AND MAINTENANCE OF SELF-ORGANIZING COMMUNICATION ORBITS IN DISTRIBUTED NETWORKS

(71) Applicant: Tanium Inc., Berkeley, CA (US)

(72) Inventors: David Hindawi, Berkeley, CA (US); Orion Hindawi, Berkeley, CA (US); Lisa Lippincott, Berkeley, CA (US); Peter Lincroft, Albany, CA (US)

(73) Assignee: TANIUM INC., Emeryville, CA (US)

( * ) Notice: Subject to any disclaimer, the term of this patent is extended or adjusted under 35 U.S.C. 154(b) by 266 days.

(21) Appl. No.: 13/797,962

(22) Filed: Mar. 12, 2013

(65) Prior Publication Data

US 2014/0181295 A1 Jun. 26, 2014

Related U.S. Application Data

(60) Provisional application No. 61/745,236, filed on Dec. 21, 2012, provisional application No. 61/774,106, filed on Mar. 7, 2013.

(51) Int. Cl.
*G06F 15/16* (2006.01)
*G06F 15/173* (2006.01)
*H04L 29/08* (2006.01)
(Continued)

(52) U.S. Cl.
CPC ............... *H04L 67/02* (2013.01); *H04L 43/02* (2013.01); *H04L 41/044* (2013.01); *H04L 67/1063* (2013.01); *H04L 67/1048* (2013.01); *H04L 67/1065* (2013.01); *H04L 41/0893* (2013.01); *H04L 67/1046* (2013.01); *H04L 41/04* (2013.01); *H04L 41/082* (2013.01);
(Continued)

(58) Field of Classification Search
CPC ..... H04L 12/26; H04L 67/02; H04L 67/1065; H04L 67/1046; H04L 67/1048; G06F 15/16
USPC .......................................................... 709/224
See application file for complete search history.

(56) References Cited

U.S. PATENT DOCUMENTS 6,049,828 A * 4/2000 Dev et al. ...................... 709/224
6,879,979 B2 4/2005 Hindawi et al.
(Continued)

FOREIGN PATENT DOCUMENTS

EP 1553747 A1 7/2005
EP 2493118 A1 8/2012

OTHER PUBLICATIONS

Hood, C. S., Proactive Network-Fault Detection, Sep. 1997, IEEE Transactions on Reliability, vol. 46, No. 3, 9 pages.
(Continued)

*Primary Examiner* — Tauqir Hussain
(74) *Attorney, Agent, or Firm* — Morgan, Lewis & Bockius LLP

(57) ABSTRACT

In one aspect, machines in a managed network implements a set of rules that cause individual machines to directly interact with only a small number of machines in the network (i.e., a local neighborhood within the network), while the independent local actions of the individual machines collectively cause the individual machines to be self-organized into one or more communication orbits without any global control or coordination by a server or an administrator. The communication orbits are used for supporting network, security and system management communications in the managed network.

28 Claims, 33 Drawing Sheets

(51) Int. Cl.
*H04L 12/26* (2006.01)
*H04L 29/06* (2006.01)
*H04L 29/12* (2006.01)
*H04L 12/24* (2006.01)

(52) U.S. Cl.
CPC ............ *H04L43/0817* (2013.01); *H04L 43/10* (2013.01); *H04L 63/00* (2013.01); *H04L 61/00* (2013.01)

(56) References Cited

U.S. PATENT DOCUMENTS

| | | | |
|---|---|---|---|
| 7,299,047 B2 | 11/2007 | Dolan et al. | |
| 7,555,545 B2 | 6/2009 | McCasland | |
| 7,600,018 B2 | 10/2009 | Maekawa et al. | |
| 7,720,641 B2 | 5/2010 | Alagappan et al. | |
| 7,761,557 B2 * | 7/2010 | Fellenstein et al. | 709/224 |
| 7,844,687 B1 | 11/2010 | Gelvin et al. | |
| 8,078,668 B2 | 12/2011 | Moreau | |
| 8,185,615 B1 | 5/2012 | McDysan et al. | |
| 8,271,522 B2 | 9/2012 | Mehul et al. | |
| 8,477,660 B2 * | 7/2013 | Lee et al. | 370/258 |
| 8,504,879 B2 | 8/2013 | Poletto et al. | |
| 8,885,521 B2 * | 11/2014 | Wang et al. | 370/258 |
| 2001/0056461 A1 * | 12/2001 | Kampe et al. | 709/201 |
| 2002/0042693 A1 * | 4/2002 | Kampe et al. | 702/186 |
| 2002/0073086 A1 | 6/2002 | Thompson et al. | |
| 2003/0101253 A1 | 5/2003 | Saito et al. | |
| 2003/0212676 A1 | 11/2003 | Bruce et al. | |
| 2004/0076164 A1 | 4/2004 | Vanderveen et al. | |
| 2005/0108389 A1 | 5/2005 | Kempin et al. | |
| 2006/0039371 A1 | 2/2006 | Castro et al. | |
| 2007/0005738 A1 | 1/2007 | Alexion-Tiernan et al. | |
| 2007/0211651 A1 * | 9/2007 | Ahmed et al. | 370/256 |
| 2008/0082628 A1 | 4/2008 | Rowstron et al. | |
| 2008/0133582 A1 | 6/2008 | Andersch et al. | |
| 2008/0263031 A1 * | 10/2008 | George et al. | 707/5 |
| 2008/0288646 A1 * | 11/2008 | Hasha et al. | 709/228 |
| 2009/0319503 A1 | 12/2009 | Mehul et al. | |
| 2010/0085948 A1 | 4/2010 | Yu et al. | |
| 2011/0271319 A1 | 11/2011 | Venable, Sr. | |
| 2013/0170336 A1 | 7/2013 | Chen et al. | |
| 2013/0276053 A1 | 10/2013 | Hugard, IV et al. | |

OTHER PUBLICATIONS

Stoica, I., et al., "Chord: A Scalable Peer-to-Peer Lookup Service for Internet Applications," SIGCOMM '01, Aug. 27-31, 2001, San Diego, California, 12 pages.

Tanium Inc, "International Search Report and Written Opinion," PCT/US2013/076971, Apr. 4, 2014, 19 pgs.

Mongeau, D., et al., "Ensuring integrity of network inventory and configuration data," Telecommunications Network Strategy and Planning Symposium, Networks 2004, 11th International Vienna, Austria, Jun. 13-16, 2004, 6 pgs.

Tanium Inc, International Search Report and Written Opinion, PCT/US2014/067607, Feb. 18, 2015, 15 pgs.

* cited by examiner

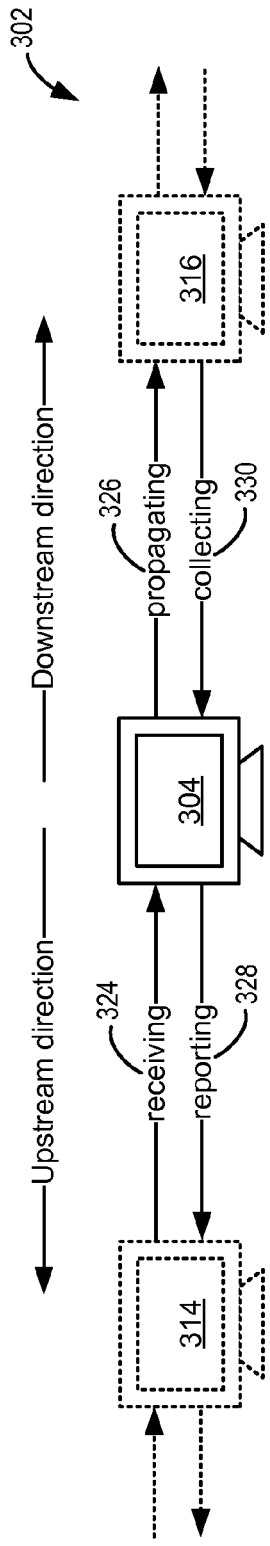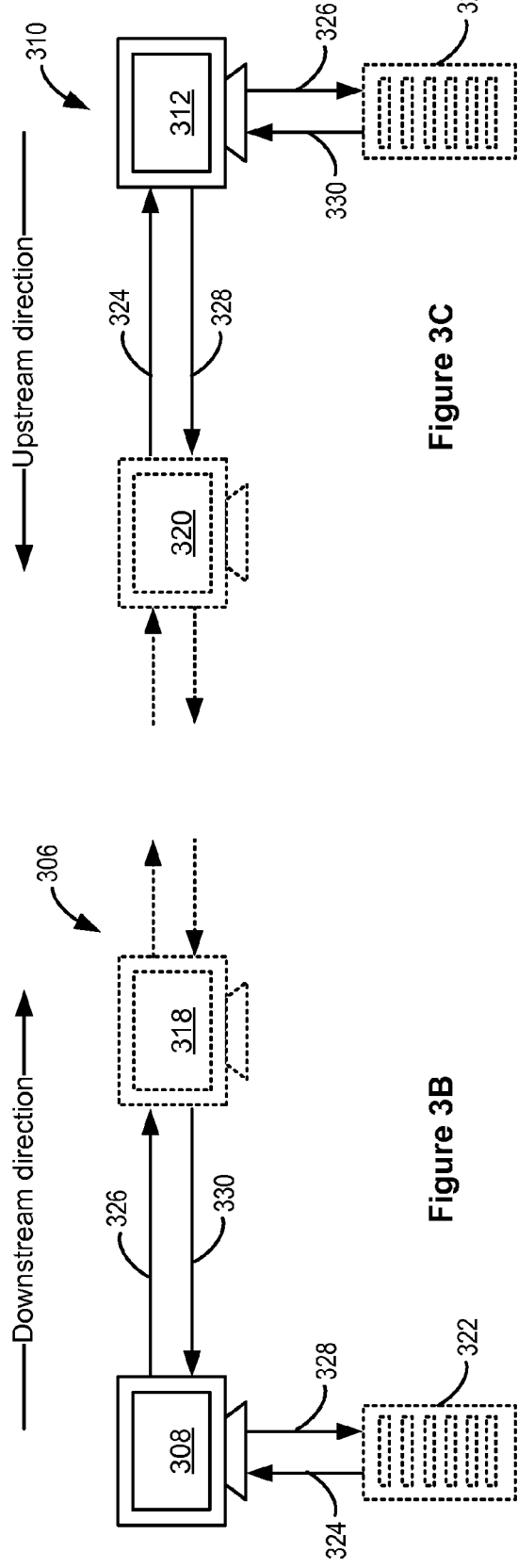
Figure 3A
Figure 3B
Figure 3C

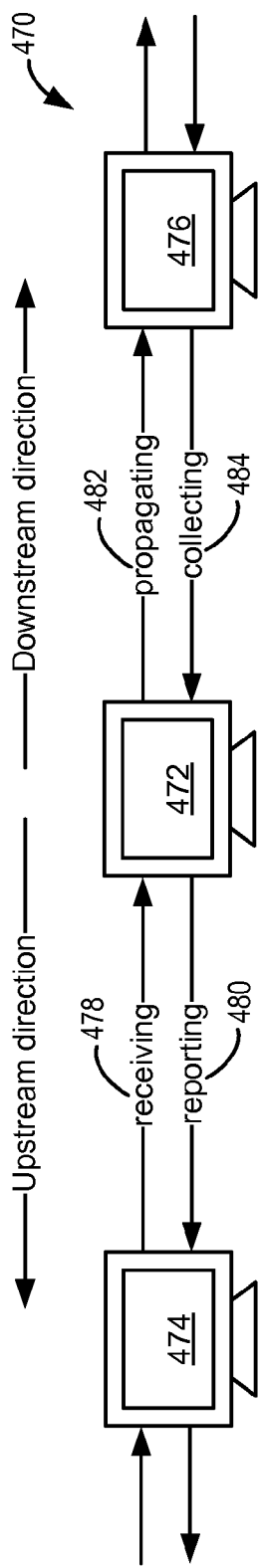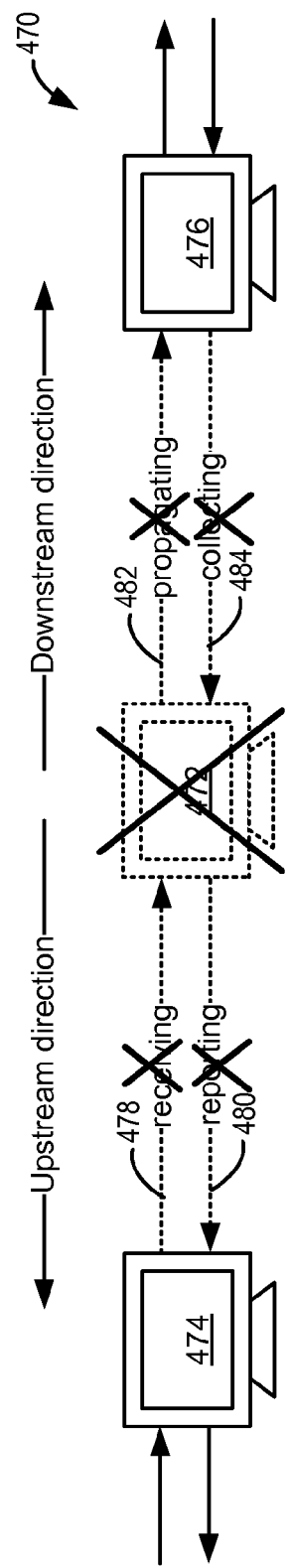
Figure 4W
Figure 4X

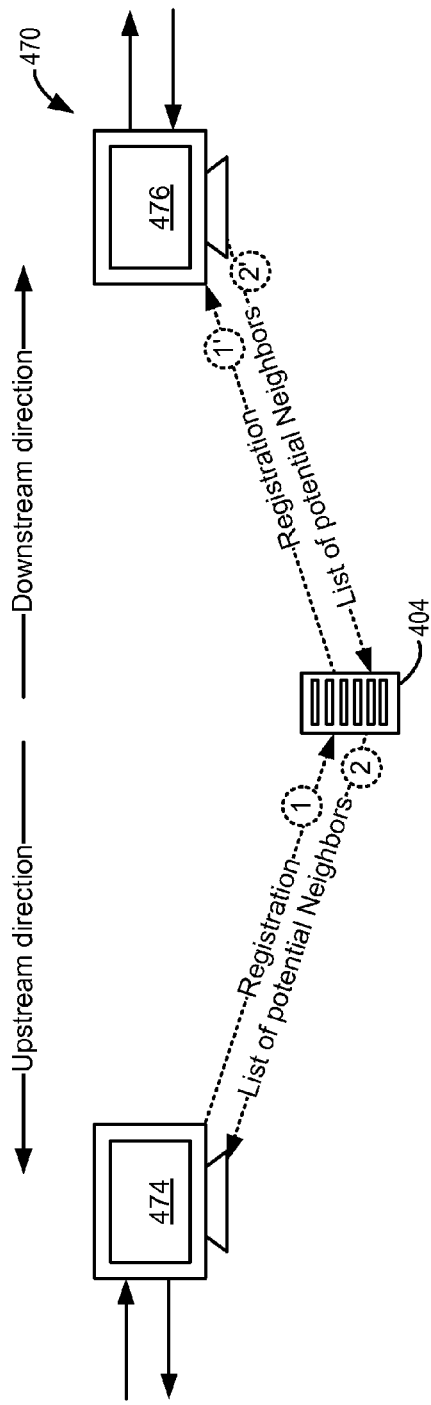
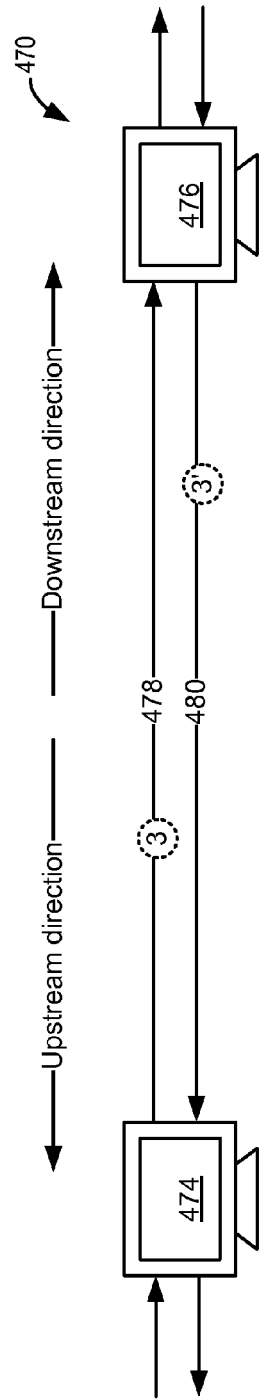

CREATION AND MAINTENANCE OF SELF-ORGANIZING COMMUNICATION ORBITS IN DISTRIBUTED NETWORKS

PRIORITY CLAIM AND RELATED APPLICATIONS

This application claims under 35 U.S.C. 119(e) the benefit of Provisional Application Ser. No. 61/745,236, filed Dec. 21, 2012, titled "System and Network Management Using Self-Organizing Communication Orbits in Distributed Networks," and Provisional Application Ser. No. 61/774,106, filed Mar. 7, 2013, titled "System, Security and Network Management Using Self-Organizing Communication Orbits in Distributed Networks," the entireties of which are hereby incorporated by reference.

This application relates to U.S. patent application Ser. No. 12/412,623, filed Mar. 27, 2009, now U.S. Pat. No. 8,086,729, titled "Distributed Statistical Detection of Network Problems and Causes," U.S. patent application Ser. No. 13/084,923, filed Apr. 12, 2011, titled "Large-Scale Network Querying and Reporting", and U.S. patent application Ser. No. 13/107,625, filed May 13, 2011, titled "Parallel Distributed Network Management." Content of each of the above applications is hereby incorporated by reference in its entirety.

BACKGROUND

A managed network (e.g., an enterprise network) often includes a large number of machines and devices configured to perform a wide variety of functions. The amount of computing assets and the amount of data generated and used by these computing assets scale rapidly with the size of the network. System and resource management on a network, such as collecting real-time information regarding systems and resources in the network and dynamically modifying and reallocating resources and data in the network, requires a substantial amount of computation and communication resources.

In a centrally managed network, a central management server is responsible for issuing requests (e.g., requests for status updates, system management operations, and network management operations, etc.) to the targeted destination nodes in the network. These requests often take a long time to propagate through the network to the appropriate destination nodes. These latencies make real-time management of the machines in the network difficult. For example, it typically takes more time to collect information about the status of machines coupled to the network than it takes for that status to change. Frequently, by the time the requested status information is received by an administrator, such information has already become outdated. In addition, in a centralized managed network, the central server can quickly become overwhelmed by the communication load and becomes a management bottleneck. Furthermore, a centralized management scheme is expensive to implement and maintain.

Some conventional systems attempt to ameliorate the problems of a centralized management scheme by performing some degree of aggregation or processing of data at intermediate control levels, resulting in a hierarchical management structure between the network administrator and the end nodes. These systems also do not scale well. For example, for a network with 100,000 nodes, it may still take several hours or more to report the status of those individual nodes, or even of an aggregate thereof. In that timeframe, many nodes would likely have changed their status, making the status report obsolete. In addition, these hierarchical management structures themselves are difficult and complex to create and maintain, and are prone to problems and failures.

Other conventional systems amass information about network devices into one or more relatively large databases, so that network operators can query those databases for information about devices in the network. These systems also do not scale well. A relatively large network would produce enough data to swamp the operations of a database. One likely consequence is that only a small number of database queries can be made within resource limits of the database or its servers. Another problem with these systems is that their data tend, by the time answers are aggregated, not to reflect the true state of the devices in the network, and, because data is collected over time, the data no longer represent a consistent, snapshot view of those devices.

SUMMARY

In one aspect, machines in a managed network implement a set of rules that cause individual machines to directly interact with only a small number of machines in the network (i.e., a local neighborhood within the network), while the independent local actions of the individual machines collectively cause the individual machines to be self-organized into one or more communication orbits without global control or coordination by a server or an administrator.

More specifically, in some embodiments, a method of managing a non-static collection of systems or machines in a network includes establishing one or more linear communication orbits in the network to communicate system, security and network management requests and data. Machines coupled to the network self-organize themselves into the linear communication orbit(s) according to a common set of rules implemented by each of the individual machines. Minimal intervention or instructions from a central server or an administrator is required for the formation and continued maintenance of the linear communication orbit(s) when machines join and/or exit the network. Each machine coupled to the network implements the same set of rules, where the rules are designed such that the machines' independent actions in accordance with the rules are coordinated on a global scale to establish a unique ordinal position for each machine in an ordered sequence of machines in the network, and to establish and maintain contiguous chains of communication orbits along the ordered sequence of the machines in the network.

More specifically, in some embodiments, from the perspective of an intermediate node or head node in a linear communication orbit, a method of creating, maintaining, and repairing a local segment of the linear communication orbit centered around the intermediate or head node includes: at a first client node coupled to the network (i.e., at the intermediate node or head node): proactively constructing and maintaining a respective local segment of a linear communication orbit in the network, where the respective local segment includes the first client node and four communication channels each originating from or terminating at the first client node, including: (1) a respective receiving channel for receiving information from an immediately preceding node of the first client node, (2) a respective reporting channel for sending information to the immediately preceding node of the first client node, (3) a respective propagation channel for sending information to the next succeeding node of the first client node, and (4) a respective collection channel for receiving information from the next succeeding node of the first client node; and wherein the proactive constructing and maintaining includes: obtaining contact information of one or more potential neighbor nodes for the first client node; proactively establishing the respective propagation channel from the first client node to a downstream neighbor upon detecting that said respective propagation channel to the downstream neighbor does not already exist, the downstream neighbor comprising a live succeeding node among the one or more potential neighbor nodes; and when the one or more potential neighbor nodes include at least one preceding node, proactively establishing the respective reporting channel from the first client node to an upstream neighbor upon detecting that said respective reporting channel to the upstream neighbor does not already exist, the upstream neighbor comprising a live preceding node among the one or more potential neighbor nodes.

In some embodiments, the one or more potential neighbor nodes are identified based on proximity of respective unique identifiers of the one or more potential neighbor nodes to a respective unique identifier of the first client node.

In some embodiments, the downstream neighbor comprises a closest live succeeding node among the one or more potential neighbor nodes and the upstream neighbor comprises a closest live preceding node among the one or more potential neighbor nodes.

In some embodiments, wherein the proactive constructing and maintaining further includes: upon establishing the respective propagation channel from the first client node to the downstream neighbor, terminating a previous propagation channel from the first client node to another succeeding node.

In some embodiments, the proactive constructing and maintaining further includes: upon establishing the respective reporting channel from the first client node to the upstream neighbor, terminating a previous reporting channel from the first client node to another preceding node.

In some embodiments, the proactive constructing and maintaining further includes: allowing the respective receiving channel from the upstream neighbor to the first client node to be established upon a request by the upstream neighbor, wherein the request has been generated by the upstream neighbor to establish a respective propagation channel thereof.

In some embodiments, the proactive constructing and maintaining further comprises: allowing the respective collection channel from the downstream neighbor to the first client node to be established upon a request by the downstream neighbor, wherein the request has been generated by the downstream neighbor to establish a respective reporting channel thereof.

In some embodiments, the first client node is a new node to be inserted into the linear communication orbit. In some embodiments, the first client node is an existing intermediate node in the linear communication orbit. In some embodiments, the first client node is a new head node to be inserted into the linear communication orbit. In some embodiments, the first client node is an existing head node of the linear communication orbit. In some embodiments, the first client node is an existing tail node of the linear communication orbit.

In some embodiments, the preceding neighbor node of the first client node is the server of the network.

In some embodiments, obtaining the contact information of the one or more potential neighbor nodes includes: submitting a respective registration message to a server of the network according to a predetermined maintenance schedule, the registration message including a respective unique identifier of the first client node; and receiving the contact information of the one or more potential neighbor nodes from the server, wherein the one or more potential neighbor nodes have been identified by the server for the first client node.

In some embodiments, proactively establishing the respective propagation channel from the first client node to the downstream neighbor further includes: monitoring responsiveness of a receiving end of an existing propagation channel of the first client node; upon detecting that the receiving end of the existing propagation channel of the first client node has ceased to be responsive, contacting at least one of the one or more potential neighbor nodes to identify the downstream neighbor; and proactively establishing a new propagation channel from the first client node to the downstream neighbor that has been identified.

In some embodiments, proactively establishing the respective reporting channel from the first client node to the upstream neighbor further includes: monitoring responsiveness of a receiving end of an existing reporting channel of the first client node; upon detecting that the receiving end of the existing reporting channel of the first client node has ceased to be responsive, contacting at least one of the one or more potential neighbor nodes to identify the upstream neighbor; and proactively establishing a new reporting channel from the first client node to the upstream neighbor that has been identified.

In some embodiments, from the perspective of an existing node in a linear communication orbit, a method of maintaining and repairing a local segment of the linear communication orbit centered around the existing node includes: at a first client node (e.g., an existing intermediate node) coupled to the network: proactively maintaining a respective local segment of the linear communication orbit in the network, where the respective local segment includes the first client node and four communication channels each originating from or terminating at the first client node, including: (1) a respective receiving channel for receiving information from an immediately preceding node of the first client node, (2) a respective reporting channel for sending information from the first client node to the immediately preceding node, (3) a respective propagation channel for sending information to an immediately succeeding node of the first client node, and (4) a respective collection channel for receiving information from the immediately succeeding node of the first client node, and where the proactive maintaining includes: monitoring responsiveness of a receiving end of an existing propagation channel of the first client node; upon detecting that the receiving end of the existing propagation channel of the first client node ceases to be responsive, contacting one or more potential neighbor nodes to identify a new downstream neighbor, the new downstream neighbor comprising a live succeeding node among the one or more potential neighbor nodes; and proactively establishing a new propagation channel from the first client node to the new downstream neighbor.

In some embodiments, the proactive maintaining further includes: upon detecting that the receiving end of the existing propagation channel of the first client node ceases to be responsive, contacting a server of the network to obtain contact information of the one or more potential neighbor nodes.

In some embodiments, the proactive maintaining further includes: providing a registration message to a server of the network, the registration message including a respective unique identifier of the first client node; and in response to the registration message, receiving contact information of the one or more potential neighbor nodes from the server, where the server identifies the one or more potential neighbor nodes for the first client node based on proximity of respective unique identifiers of the one or more potential neighbor nodes relative to the respective unique identifier of the first client node.

In some embodiments, the proactive maintaining further includes: receiving a request from the new downstream neighbor to establish a respective reporting channel of the new downstream neighbor; and in response to the request, allowing a new collection channel for receiving information from the new downstream neighbor to be established, wherein the new collection channel also serves as the respective reporting channel of the new downstream neighbor.

In some embodiments, the proactive maintaining further includes: monitoring responsiveness of a receiving end of an existing reporting channel of the first client node; upon detecting that the receiving end of the existing reporting channel of the first client node ceases to be responsive, contacting at least one of the one or more potential neighbor nodes to identify a new upstream neighbor, the new upstream neighbor comprising a live preceding node among the one or more potential neighbor nodes; and proactively establishing a new reporting channel from the first client node to the new upstream neighbor.

In some embodiments, the proactive maintaining further includes: upon detecting that the receiving end of the existing reporting channel of the first client node ceases to be responsive, contacting a server of the network to obtain contact information of the one or more potential neighbor nodes.

In some embodiments, the proactive maintaining further includes: receiving a request from the new upstream neighbor to establish a respective propagation channel of the new upstream neighbor; and in response to the request, allowing a new receiving channel for receiving information from the new upstream neighbor to be established, wherein the new receiving channel also serves as the respective propagation channel of the new upstream neighbor.

In some embodiments, from the perspective of a new intermediate node or a new tail node, a method for inserting the new intermediate node or the new tail node into an existing linear communication orbit includes: at a first client node (e.g., the new intermediate node or the new tail node) to be coupled to the network: providing a registration message to a server of the network, the registration message specifying a respective unique identifier of the first client node; receiving from the server contact information of one or more potential neighbor nodes for the first client node in a linear communication orbit, where the linear communication orbit is formed by a plurality of client nodes currently known to exist in the network according to a sequential order of respective unique identifiers of the plurality of client nodes, wherein the linear communication orbit includes a head node, a tail node, and a sequence of one or more intermediate nodes between the head node and the tail node, and where the server provides management messages to the plurality of client nodes through the head node, and each intermediate node receives the management messages from the server through a respective upstream neighbor in the linear communication orbit and forwards the management messages to a respective downstream neighbor in the linear communication orbit; proactively establishing a respective reporting channel for providing information to a respective upstream neighbor of the first client node and allowing a respective receiving channel for receiving information from the respective upstream neighbor to be established by the respective upstream neighbor, the respective upstream neighbor comprising a closest live preceding node among the one or more potential neighbor nodes; and when the one or more potential neighbor nodes include at least one live succeeding node (e.g., when the first client node is to become a new intermediate node and not the new tail node of the linear communication orbit): proactively establishing a respective propagation channel for providing information to a respective downstream neighbor of the first client node and allowing a respective collection channel for receiving information from the respective downstream neighbor of the first client node to be established by the respective downstream neighbor, the respective downstream neighbor comprising a closest live succeeding node among the one or more potential neighbor nodes; and upon establishment of the respective receiving and propagation channels, terminating an existing communication channel from the server to the first client node and an existing communication channel from the first client node to the server.

In some embodiments, the method further includes: prior to establishment of the respective receiving channel for receiving information from the respective upstream neighbor and the respective reporting channel for sending information to the respective upstream neighbor, proactively establishing a first communication channel for receiving information from the server, and a second communication channel for sending information to the server.

In some embodiments, the method further includes: receiving a network management message from the respective upstream neighbor via the respective receiving channel of the first client node, the network management message including instructions from the server regarding a network management action; performing the network management action according to the instructions in the network management message; updating the network management message with local updates by the first client node; and forwarding the updated network management message to the respective downstream neighbor via the respective propagation channel of the first client node.

In some embodiments, the method further includes: receiving a report message from the respective downstream neighbor via the respective collection channel of the first client node; updating the report message with local updates by the first client node; and forwarding the updated report message to the respective upstream neighbor via the respective reporting channel of the first client node.

In some embodiments, the method further includes: when the one or more potential neighbor nodes include at least one live succeeding node: the first client node proactively establishes the respective propagation channel of the first client node before the respective receiving channel of the first client node is established; and the first client node terminates the existing communication channel from the first client node to the server before terminating the existing communication channel from the server to the first client node.

In some embodiments, from the perspective of a server, a method of managing a network comprising a non-static collection of machines, includes: at the server of the network: maintaining a record identifying a plurality of client nodes known to be coupled to the network during a present timeframe, where the plurality of client nodes are self-organized in a linear communication orbit, where the plurality of client nodes in the linear communication orbit include a head node, a tail node, and a sequence of one or more intermediate nodes between the head node and the tail node, and where the server provides management messages to the plurality of client nodes through the head node, and each intermediate node receives the management messages from the server through a respective upstream neighbor in the linear communication orbit and forwards the management messages to a respective downstream neighbor in the linear communication orbit; receiving a respective request from a first client node to join the network; based on a respective unique identifier of the first client node, providing, to the first client node, contact information for a plurality of potential neighbor nodes for the first client node in the linear communication orbit, where the contact information is utilized by the first client node to establish a communication channel with at least one of the potential neighbor nodes and become part of the linear communication orbit.

In some embodiments, providing the contact information is based on a sequential order of the respective unique identifier of the first client node relative to respective unique identifiers of the plurality of client nodes.

In some embodiments, the plurality of potential neighbor nodes include one or more succeeding neighbor nodes for the first client node, and the one or more succeeding neighbor nodes include the head node of the linear communication orbit.

In some embodiments, the plurality of potential neighbor nodes include one or more preceding neighbor nodes for the first client node, and the one or more preceding neighbor nodes include the tail node of the linear communication orbit.

In some embodiments, the method further includes: allowing a respective communication channel from the server to the first client node to persist until a forward communication channel has been established from a respective preceding neighbor node of the plurality of potential neighbor nodes to the first client node.

In some embodiments, the method further includes: allowing a respective communication channel from the first client node to the server to persist until a forward communication channel has been established from the first client node to a respective succeeding neighbor node of the one or more potential neighbor nodes.

In some embodiments, the method further includes: allowing a respective communication channel from the server to the head node to persist until a forward communication channel has been established from the first client machine to the head node.

In some embodiments, the method further includes: allowing a respective communication channel from the head node to the server to persist until a backward communication channel has been established from the head node to the first client node.

In some embodiments, the method further includes: after the respective communication channel from the server to the head node and the respective communication channel from the head node to the server have been terminated, utilizing the first client node as a new head node of the linear communication orbit.

In some embodiments, providing the contact information is based on a sequential order of respective IP addresses of the first client node and the plurality of client nodes.

In some embodiments, the contact information of the potential neighbor nodes are respective IP addresses of the potential neighbor nodes.

In some embodiments, the method further include: receiving respective registration messages from the plurality of client nodes according to a predetermined schedule; and upon detecting that a particular client node of the plurality of client nodes has failed to provide a respective registration message according to the predetermined schedule, updating the record to reflect departure of the particular client node from the network and the linear communication orbit.

In some embodiments, the method further includes: providing a particular management message to the plurality of client nodes by sending the particular management message to the head node via a respective communication channel from the server to the head node, where the head node acts upon the particular management message according to instructions contained in the particular management message and forwards the particular management message to a respective downstream neighbor of the head node in the linear communication orbit.

In some embodiments, the method further includes: receiving a management report from at least one of the plurality of client nodes currently known to exist in the linear communication orbit, where management report includes information provided by a sequence of one or more client nodes preceding said at least one client node in the linear communication orbit.

In some embodiments, the method further includes: the at least one of the plurality of client nodes is the tail node of the linear communication orbit.

Various embodiments may provide one or more of the following advantages:

In some embodiments, status information can be collected in substantially real-time. Assuming a network of 100,000 nodes, an inquiry response time can be in the order of seconds (e.g., 15 seconds) rather than hours or days in the case of conventional management schemes.

In some embodiments, only a single server is used in the entire network, and system management infrastructure cost can be greatly reduced as compared to conventional management schemes. For example, conventional hierarchical management infrastructure may require 50-100 servers for managing 100,000 nodes, with an operating cost of $10,000-20,000 per server per year. In some embodiments of the present invention, annual savings on infrastructure alone may reach $500,000 to $2,000,000.

Conventional technologies require massive amounts of data to flow over a wide area network, which is typically a bottleneck, and is typically slow and expensive, and not always available. In some embodiments of the present invention, most of the management communications can be accomplished with local area networks, which are fast, cheap and always available.

In some embodiments, only a small number of connections need to be maintained. For example, in a network of 100,000 nodes, according to conventional management techniques, a single management query may involve opening at least 200,000 connections—100,000 for the query to be sent from the server to every node, and 100,000 for the answers back to the server. In contrast, in some embodiments of the present invention, only about 200 connections may be needed—100 for the query to be sent from the server to the head node on each contiguous linear communication orbit, and 100 for the answers back from the tail node on each contiguous linear communication orbit.

Other embodiments and advantages are apparent to those skilled in the art in light of the descriptions and drawings in this specification.

BRIEF DESCRIPTION OF THE DRAWINGS

FIGS. 3A-3C illustrate respective local segments of an exemplary linear communication orbit for performing system, security and network management in a managed network in accordance with some embodiments.

FIGS. 4W-4Z illustrate self-repair of an existing linear communication orbit when an intermediate node has existed the network in accordance with some embodiments.

Like reference numerals refer to corresponding parts throughout the drawings.

DESCRIPTION OF EMBODIMENTS

Figure 1:
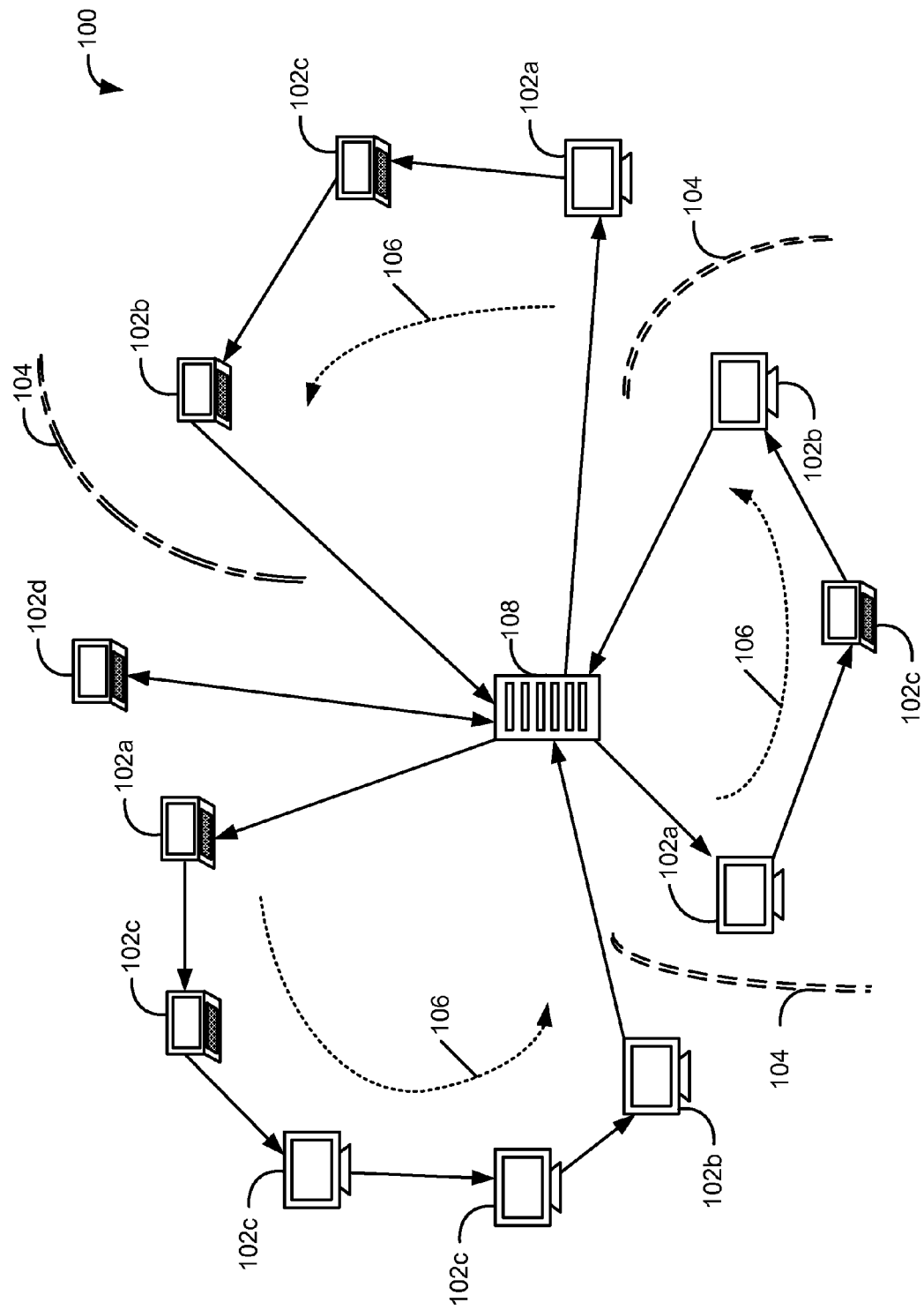
FIG. 1 illustrates a communication topology for performing system, security and network management in a managed network in accordance with some embodiments.

FIG. 1 illustrates a managed network 100 comprising a plurality of interconnected machines 102 (including 102a-d), e.g., computers, servers, mobile devices, and other networked devices. Examples of managed network 100 include an enterprise network or another network under common management. In some embodiments, at least some of machines 102 coupled to managed network 100 are distributed across different geographical areas and/or localized at the same physical location. In some embodiments, machines 102 coupled to managed network 100 are divided into several sub-networks separated by one or more firewalls 104. In some embodiments, machines 102 currently coupled to network 100 are self-organized into one or more contiguous segments 106 of a single linear communication orbit. In some embodiments, each contiguous segment 106 is viewed as a respective linear communication orbit. In some embodiments, each linear communication orbit is used to support system, security and network management communications within managed network 100. In some embodiments, managed network 100 also includes server 108 that facilitates the creation and maintenance of the one or more contiguous segments 106. In some embodiments, each contiguous segment 106 includes one head node (e.g., head node 102a), one tail node (e.g., tail node 102b), and a sequence of zero or more intermediate client nodes (e.g., intermediate node(s) 102c) in between the head node and the tail node. In some embodiments, the head node and tail node of each contiguous segment 106 are connected to server 108, as shown in FIG. 1. In some embodiments, only the head node of each contiguous segment 106 is connected to the server, while the intermediate nodes and tail nodes are not connected to the server. In some embodiments, when a node is not part of any contiguous segment 106, that node remains as a singleton (e.g., singleton 102d) connected to server 108.

Although each machine 102 within managed network 100 is optionally configured to communicate with another machine within or outside of managed network 100 through various connection-oriented and/or connectionless protocols during their normal operations (e.g., user-level operations, such as emailing, Internet browsing, VoIP, database accessing, etc.), the ad hoc connections established for these normal operations are not the focus of the present discussion and are not shown in FIG. 1. Instead, the present specification focuses on communication orbits that are established and maintained to facilitate system, security and/or network management operations ascribed to manual and programmed administrations of network 100. Examples of system, security and network management operations include: (1) collection of status information (e.g., bandwidth, load, availability, resource inventory, application status, machine type, date of last update, security breach, errors, etc.) from individual machines of the managed network; (2) issuance of system, security and network management commands (e.g., commands related to shutdown, restart, failover, release of resources, change access authorizations, backup, deployment, quarantine, load balancing, etc.) for individual resources and/or machines on the managed network; (3) remotely controlled software installations and updates (e.g., enterprise software installations and updates, patch installations, anti-virus updates, database updates, file sharing, etc.); (4) detecting presence of particular malicious programs, code, script (e.g., virus, malware, security holes, etc.) on individual machines on the managed network; (5) removal of or disabling particular malicious programs, code, script (e.g., virus, malware, security holes, etc.) on individual machines on the managed network; (6) disabling or suspending suspicious or high-risk operations and activities (e.g., Internet or operating system activities of suspected virus, malware, etc.) on particular machines on the managed network; (7) detecting unmanaged machines connected to the managed network; (8) detecting data leakage (e.g., transmission of classified information) from machines on the managed network to locations or machines outside of the managed network; (9) detecting connection or data transfer to/from removable data storage devices (e.g., memory stick, or other removable storage devices) from/to particular ports (e.g., a USB drive) of particular machines on the managed network. Other system, security and network management operations are possible and are apparent to those of ordinary skills in the art.

In some embodiments, as shown in FIG. 1, the linear communication orbit linking all of the machines coupled to network 100 is a unidirectional communication orbit including a respective unidirectional communication channel between each pair of adjacent machines in an ordered sequence of all machines 102 in network 100. In some embodiments, the linear communication orbit is a bidirectional communication orbit including a respective pair of communication channels (one for each direction) between each pair of adjacent machines in an ordered sequence of all machines 102 in network 100. In some embodiments, a unidirectional communication orbit is used for propagating status inquiries and management commands to machines 102 in network 100. In some embodiments, a bidirectional communication orbit is used for software and file distribution to machines 102 in network 100.

In some embodiments, a single dedicated server (e.g., server 108) is provided in the entire network (e.g., network 100). In some embodiments, server 108 is elected automatically from among all or a subset of machines 102 according to various predetermined election rules implemented on machines 102. In some embodiments, no server is needed to facilitate the formation and maintenance of the linear communication orbit(s) in network 100, as long as machines 102 have other ways of obtaining their respective ordinal positions (or a respective list of their potential neighbors) in the sequence of all machines currently coupled to network 100. For example, in some embodiments, each machine may store a static list of its potential neighbors rather than relying on a server to provide such a list, provided that only a substantially fixed set of machines can be coupled to the network.

As set forth in the background, some conventional techniques for system, security and network management rely on a hierarchical system management infrastructure. The hierarchical system management infrastructure includes one or more intermediate servers for funneling management inquiries and requests toward subsidiary intermediate servers and leaf nodes of the hierarchical infrastructure. The one or more intermediate servers also aggregate responses and reports from subsidiary intermediate servers and the leaf nodes. The hierarchical system management structure is rigid and difficult to modify in real-time. Failure of an intermediate server can cause large scale unavailability of many machines even if those machines do not suffer from any defects themselves. In addition, the hierarchical system management infrastructure has many potential bottlenecks at the intermediate servers, making management communications up and down the hierarchy inefficient, time consuming, and often untimely. Furthermore, the hierarchical system management infrastructure is costly to setup and to maintain both in terms of equipment and personnel.

In contrast, communication orbit(s) 106 shown in FIG. 1 do not require a hierarchical management structure. Even though a single server (e.g., server 108) is employed in some embodiments, most of the management duties and communications are provided on a substantially flat (as opposed to hierarchical) structure made up of all the machines (e.g., machines 102) coupled to the network (e.g., network 100). Consequently, there is minimal requirement imposed on the capabilities of the server.

In addition, as discussed in more detail later, each machine in the communication orbit(s) 106 shown in FIG. 1 is only communicating directly with a small number of other machines (e.g., its immediate predecessor and successor machines in a local segment of the linear communication orbit). Machines 102 in each local segment can quickly reestablish the continuity of the linear communication orbit when a particular machine in the communication orbit fails or exits network 100. The linear communication orbit shown in FIG. 1 also provides quick and easy insertions of new machines into network 100 because the insertion only affects a local segment of the linear communication orbit involving a small number of machines 102 already present in the orbit. As a result, the system management structure shown in FIG. 1 can quickly scale up and down with minimal equipment and personnel cost devoted to the changes made to the system management infrastructure itself.

In some embodiments, system, security and network management communications are propagated along the linear communication orbit(s) in one or both directions to collect system and network information, invoke system, security and network management actions, and/or push out system and network updates. In some embodiments, each machine 102 receiving a communication message from its upstream neighbor node (or downstream neighbor node) acts upon the message by providing an update to the message based on its local state or information, performing some aggregation of the information in the message, and/or forwarding the message to its downstream neighbor node (or upstream neighbor node) along the linear communication orbit. Essentially, each machine expends a small amount of resources to take on a small part of the duties of an intermediate management server without being overly burdened. More details on how the system, security and network management messages are propagated to and collected from machines 102 in network 100 through linear communication orbit(s) 106 are provided in the Applicants' prior application, U.S. patent application Ser. No. 12/412,623, filed Mar. 27, 2009, now U.S. Pat. No. 8,086,729, entitled "Distributed Statistical Detection of Network Problems and Causes," which is hereby incorporated by reference in its entirety.

An important feature of the linear communication orbit(s) 106 is that they are automatically formed without global, continuous, and/or active intervention by any network administrative program or personnel. Each machine 102 joining network 100 is equipped with (or provided with) a set of predetermined rules. According to the set of predetermined rules, each machine 102 finds its neighboring machines and coordinates with these neighboring machines to self-organize into a local segment of the linear communication orbit. The local segments of adjacent machines overlap and fuse into a contiguous segment of the linear communication orbit.

In some embodiments, each machine 102 obtains the set of rules from server 108 as the machine first joins network 100. In some embodiments, each machine 102 queries server 108 to obtain pertinent information that helps the machine to determine its ordinal position in the linear communication orbit. Each machine 102 then proactively contacts its potential predecessor and successor machines to identify its upstream and downstream neighbor machines and to establish a local segment of the linear communication orbit centered about said machine 102.

In some embodiments, the linear communication orbit organically grows or contracts as machines join and leave network 100, without global, continuous, and/or active intervention by any network administrative programs or personnel. Although all machines 102 implement the same set of rules and each machine only directly interacts with its immediate neighborhood machines, the rules are designed in a way that causes global coordination of the machines' independent local actions. The global coordination results in self-organization and automatic repair and maintenance of the linear communication orbit(s) 106.

Figure 2B:
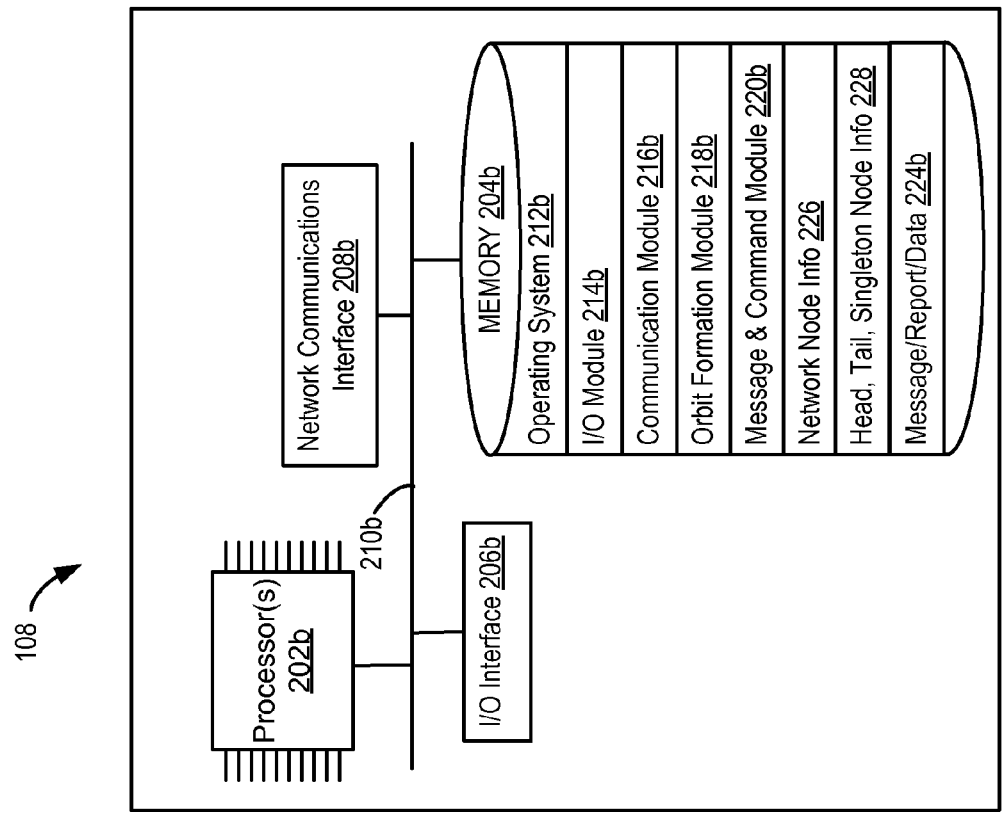
FIG. 2B is a block diagram of an exemplary server in a managed network in accordance with some embodiments.
Figure 2A:
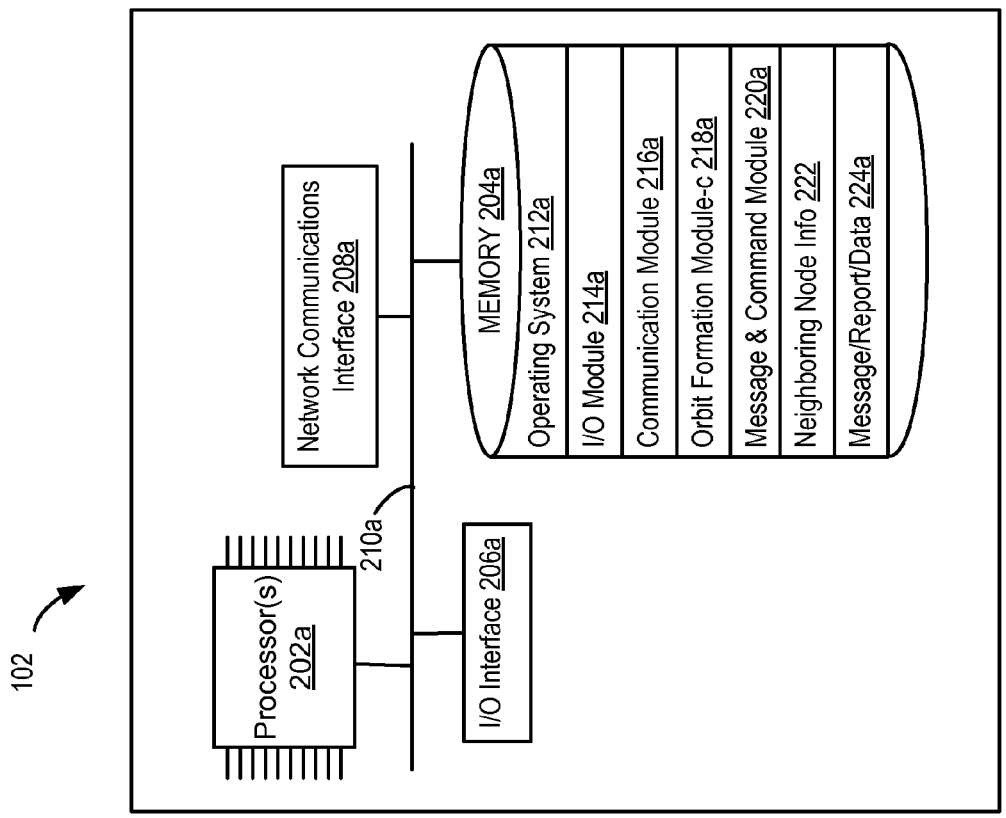
FIG. 2A is a block diagram of an exemplary client machine in a managed network in accordance with some embodiments.

FIG. 2A is a block diagram of an exemplary machine 102 shown in FIG. 1. In some implementations, machine 102 includes one or more processors 202a, memory 204a for storing programs and instructions for execution by one or more processors 202a, one or more communications interfaces such as input/output interface 206a and network interface 208a, and one or more communications buses 210a for interconnecting these components.

In some embodiments, input/output interface 206a includes a display and input devices such as a keyboard, a mouse or a track-pad. In some embodiments, communication buses 210a include circuitry (sometimes called a chipset) that interconnects and controls communications between system components. In some embodiments, memory 204a includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. In some embodiments, memory 204a includes one or more storage devices remotely located from the one or more processors 202a. In some embodiments, memory 204a, or alternatively the non-volatile memory device(s) within memory 204a, comprises a non-transitory computer readable storage medium.

In some embodiments, memory 204a or alternatively the non-transitory computer readable storage medium of memory 204a stores the following programs, modules and data structures, instructions, or a subset thereof:

Operating System 212a that includes procedures for handling various basic system services and for performing hardware dependent tasks.

I/O module 214a that includes procedures for handling various basic input and output functions through one or more input and output devices.

Communication module 216a that is used for connecting machine 102 to other machines (e.g., other machines 102 in network 100) or servers (e.g., server 108) via one or more network communication interfaces 208a (wired or wireless) and one or more communication networks, such as the Internet, other wide area networks, local area networks, metropolitan area networks, and so on.

Orbit formation module 218a that includes instructions implementing a predetermined set of rules for creating, maintaining, and repairing the linear communication orbit for network and system management.

Message and command module 220a that includes instructions for handling (1) receipt, processing, propagation, collection and reporting of system, security and network management messages and commands, and/or (2) distribution of files and software updates.

Neighboring node information 222 that includes information identifying neighboring nodes of machine 102.

Messages, reports and/or other data 224a that is stored, temporarily or otherwise, upon receipt from a predecessor node, successor node or server, and/or that is locally generated, revised or supplemented by machine 102 prior to transmission to a predecessor node, successor node or server.

FIG. 2B is a block diagram of an exemplary server 108 shown in FIG. 1. In some implementations, server 108 includes one or more processors 202b, memory 204b for storing programs and instructions for execution by the one or more processors 202b, one or more communications interfaces such as input/output interface 206b and network interface 208b, and one or more communications buses 210b for interconnecting these components.

In some embodiments, input/output interface 206b includes a display and input devices such as a keyboard, a mouse or a track-pad. In some embodiments, communication buses 210a include circuitry (sometimes called a chipset) that interconnects and controls communications between system components. In some embodiments, memory 204b includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. In some embodiments, memory 204b includes one or more storage devices remotely located from the one or more processors 202b. In some embodiments, memory 204b, or alternatively the non-volatile memory device(s) within memory 204b, comprises a non-transitory computer readable storage medium.

In some embodiments, memory 204b or alternatively the non-transitory computer readable storage medium of memory 204b stores the following programs, modules and data structures, instructions, or a subset thereof:

Operating System 212b that includes procedures for handling various basic system services and for performing hardware dependent tasks.

I/O module 214b that includes procedures for handling various basic input and output functions through one or more input and output devices.

Communication module 216b that is used for connecting server 108 to machines 102 coupled to network 100 via one or more network communication interfaces 208b (wired or wireless) and one or more communication networks, such as the Internet, other wide area networks, local area networks, metropolitan area networks, and so on.

Orbit formation module 218b that includes instructions to determine and provide ordinal positions of machines 102 in an ordered sequence of all machines 102 currently known to be coupled to network 100. In some embodiments, orbit formation module also stores a list of singletons, and head nodes and/or tail nodes of all contiguous segments of the linear communication orbit in the network.

Message and command module 220b that includes instructions for (1) providing and collecting system, security and network management messages and commands and/or (2) distribution of files and software updates. In some embodiments, message and command module 220b provides a user interface for a network or system administrator to directly perform various system and network functions, such as issuing status inquiries, providing management instructions, deploying system configurations, and dispatching software updates, etc.

Network node information 226 that includes information identifying all nodes known to be coupled to network 100.

Head, tail and singleton node information 228, identifying head nodes, tail nodes and singleton nodes with established communication channels to and/or from server 108.

Messages, reports and/or other data 224b that is temporarily stored upon receipt from a head node, tail node, or other reporting node.

FIGS. 2A and 2B are merely illustrative of the structures of machines 102 and server 108. A person skilled in the art would recognize that particular embodiments of machines 102 and server 108 may include more or fewer components than those shown. One or more modules may be divided into sub-modules, and/or one or more functions may be provided by different modules than those shown.

FIGS. 3A-3C illustrate configurations of various local segments of a linear communication orbit in accordance with some embodiments. FIG. 3A illustrates a local segment (e.g., local segment 302) that is centered about an intermediate client node (e.g., intermediate node 304). FIG. 3B illustrates a local segment (e.g., local segment 306) of a linear communication orbit that includes a head node (e.g., head node 308) of the linear communication orbit. FIG. 3C illustrates a local segment (e.g., local segment 310) of a linear communication orbit that includes a tail node (e.g., tail node 312) of the linear communication orbit.

As shown in FIG. 3A, local segment 302 of the linear communication orbit includes intermediate node 304 and two immediately adjacent nodes, i.e., predecessor node 314 and successor node 316. Each node is implemented by a respective machine 102 coupled to network 100 in FIG. 1. Although only a single local segment is shown in FIG. 3A, a person skilled in the art would recognize that each machine 102 other than a head node and a tail node in a linear communication orbit is the center of a respective local segment and has a predecessor node and a successor node in the linear communication orbit. In some embodiments, an intermediate node is persistently connected only to its predecessor and successor nodes, and not to the server or other nodes in the network, for sending and receiving system, security and network management communications.

In some embodiments, all machines 102 coupled to network 100 are sorted into an ordered sequence according to a respective unique identifier associated with each machine 102. For example, in some embodiments, respective IP addresses of machines 102 are used to sort the machines into an ordered sequence. In some embodiments, the machines are sorted according to decreasing IP address values, an upstream direction of the linear communication orbit is the direction of increasing IP address values, and a downstream direction of the linear communication orbit is the direction of decreasing IP address values.

In some embodiments, the machines are sorted according to increasing IP address values, an upstream direction of the linear communication orbit is the direction of decreasing IP address values, and a downstream direction of the linear communication orbit is the direction of increasing IP address values.

In some embodiments, other types of unique identifiers are used, each type having a deterministic way of sorting the unique identifiers of that type into an ordered sequence. In some embodiments, each machine is provided with rules for identifying its own upstream and downstream neighbors given the unique identifiers of its potential neighbor machines. For example, machine 304 is provided with a rule to identify a live machine having the closest higher IP address value relative to machine 304 as its downstream neighbor (e.g., in this example, successor node 316), and to identify a live machine having the closest lower IP address value relative to machine 304 as its upstream neighbor (e.g., in this example, predecessor node 314).

In some embodiments, when a machine has just joined the managed network, said machine is a singleton and not yet part of any existing linear communication orbit in the managed network. The singleton machine will determine its ordinal position relative to one or more other machines in the network to either join an existing linear communication orbit or to form a new linear orbit with one or more other singletons. FIG. 3A illustrates a local segment of the linear communication orbit when the local segment is in a steady state, i.e., all machines are currently functioning and there is currently no machine needing to be inserted into or removed from this local segment of the linear communication orbit.

As shown in FIG. 3A, in a local segment (e.g., local segment 302) of the linear communication orbit, each intermediate machine central to the local segment, as represented by machine 304, has four communication channels linking said machine to its immediate neighbor machines, as represented by predecessor node 314 and successor node 316. The four communications channels of said machine include: (1) a receiving channel (e.g., receiving channel 324) for receiving information from a preceding neighbor machine (e.g., predecessor node 314), (2) a reporting channel (e.g., reporting channel 328) for providing information to the preceding neighbor machine, (3) a propagation channel (e.g., propagation channel 326) for sending information to a succeeding neighbor machine (e.g., successor node 316), and (4) a collection channel (e.g., collection channel 330) for receiving information from the succeeding neighbor machine.

Although both forward and backward communication channels are shown between each pair of adjacent machines in FIG. 3A, in some embodiments, only forward communication channels (i.e., communication channels each leading from an upstream node to a downstream node) are established.

As a person skilled in the art would recognize, the receiving channel of a particular machine and the propagation channel of the predecessor machine of said particular machine are both provided by a forward communication channel established between the particular machine and its predecessor machine. Similarly, the reporting channel of a particular machine and the collection channel of the predecessor machine of said particular machine are both provided by a backward communication channel established between the particular machine and its predecessor machine. The propagation channel of a particular machine and the receiving channel of the successor machine of said particular machine are both provided by a forward communication channel established between the particular machine and its successor machine. The collection channel of a particular machine and the reporting channel of the successor machine of said particular machine are both provided by a backward communication channel established between the particular machine and its successor machine.

In some embodiments, during operation, machine 304 receives a system management message from its predecessor node 314 through its receiving channel 324. In various embodiments, the message is a message originally generated at predecessor node 314, at a server of the managed network, at another machine upstream of predecessor node 314, or by a user of any of the above. In addition, if the message did not originate from predecessor node 314, the message may have been updated or modified by one or more of the machines upstream of predecessor node 314 since the time that the message was generated originally. In some embodiments, machine 304 parses the system management message received from predecessor node 314 to determine whether it contains a status query, a data request, an instruction, and/or data for further dissemination downstream. Based on the content of the message, machine 304 either updates the system management message with additional information (e.g., local status information known to machine 304), carries out the instruction, does both, or does nothing to the message, according to the content of the message. In addition, machine 304 decides whether to propagate the message further downstream along the linear communication orbit or to report directly to the originator of the message (e.g., the server). In some embodiments, and/or in some circumstances, machine 304 autonomously generates additional messages (e.g., a status query, a diagnostic message, an alert, etc.) to propagate down or up the linear communication orbit.

In some embodiments, after machine 304 makes any necessary updates to the system management message received from predecessor node 314, machine 304 propagates the message further downstream to its successor node 316. Specifically, machine 304 propagates the message to its successor node 316 through its propagation channel 326. Successor node 316 receives the message from machine 304 and performs the same types of actions in response to the message as machine 304 has performed, but according to its local conditions and statuses.

In some embodiments or in some circumstances, successor node 316 will propagate the message further downstream to its own successor node (not shown in FIG. 2). In some cases, successor node 316 decides that a report needs to be provided back to the originator of the message, and prepares and sends a report message upstream or directly to the originator. For example, in some embodiments, if the message is a status query originated from the server, successor node 316 sends the report message directly to the server once the requested status information has been collected. The report message would contain the collected status information or an aggregate thereof. In some embodiments, if the message is a request for a software patch received from a particular machine upstream and successor node 316 is in possession of such a software patch, successor node 316 sends the requested software patch upstream along the linear communication orbit through the nodes situated between successor node 316 and the particular machine. The report message in this case includes the requested software patch and information (e.g., destination information) to identify the requester machine.

In this example, when a report message is to be sent upstream from successor node 316 to machine 304 along the linear communication orbit, the report message is received from successor node 316 through collection channel 330 of machine 304. When machine 304 receives the report message from its successor node 316, machine 304 forwards the report message further upstream to its predecessor node 314. In some embodiments, machine 304 optionally updates the message/report/data with local information known to machine 304. In some embodiments or circumstances (e.g., if machine 304 has no information to add to the report message), machine 304 simply relays the report message upstream to the predecessor machine 314 without making any modifications to the message. For example, when the report message contains a requested software patch, machine 304 will simply relay the report message further upstream without making any modifications to the message. As shown in FIG. 3A, machine 304 sends the report message to machine 314 through reporting channel 328 of machine 304.

FIG. 3A shows a local segment of a linear communication orbit that is centered about an intermediate node 304. A linear communication orbit or each contiguous segment thereof also includes a head node and a tail node. FIG. 3B shows local segment 306 centered about a head node (e.g., head node 308). FIG. 3C shows local segment 310 centered about a tail node (e.g., a tail node 312).

As shown in FIG. 3B, local segment 306 includes head node 308 and its successor node 318. In addition, head node 308 is connected to server 322 that serves as a pseudo-predecessor node for head node 308. Head node 308 has a pseudo-receiving channel 324, a pseudo-reporting channel 328, a propagation channel 326, and a collection channel 330. Pseudo-receiving channel 324 of head node 308 is a forward communication channel established between server 322 and head node 308. Pseudo-reporting channel 328 of head node 308 is a backward communication channel established between server 322 and head node 308. In this specification, a central server is deemed to be a predecessor node to all head nodes in the network along their respective local segments. Therefore, a forward communication channel between the server and the head node is a channel for sending information downstream from the server to the head node. A backward communication channel between the server and the head node is a channel for sending information upstream from the head node to the server. Propagation channel 326 of head node 308 is a forward communication channel established between head node 308 and its successor node 318. Collection channel 330 of head node 308 is a backward communication channel established between head node 308 and its successor node 318.

As shown in FIG. 3C, local segment 310 includes tail node 312 and its predecessor node 320. In addition, tail node 312 is connected to server 322 that serves as a pseudo-successor node for tail node 312. Tail node 312 has a pseudo-propagation channel 326, a pseudo-collection channel 330, a receiving channel 324, and a reporting channel 328. Pseudo-propagation channel 326 of tail node 312 is a forward communication channel established between server 322 and tail node 312. Pseudo-collection channel 330 of tail node 322 is a backward communication channel established between server 322 and tail node 312. In this specification, a central server is deemed to be a successor node to all tail nodes in the network along their respective local segments. Therefore, a forward communication channel between the server and the tail node is a channel for sending information downstream from the tail node to the server. A backward communication channel between the server and the tail node is a channel for sending information upstream from the server to the tail node. Receiving channel 324 of tail node 312 is a forward communication channel established between tail node 310 and its predecessor node 320. Reporting channel 328 is a backward communication channel established between tail node 312 and its predecessor node 320.

Not shown in FIGS. 3A-3C is a singleton node that is connected only to the server, and has only a pair of communication channels, one for receiving information from the server, and the other for providing information to the server.

In some embodiments, server 322 maintains a record of nodes currently known to be coupled to the managed network and their respective unique identifiers. Server 322 also maintains the ordinal positions of these machines in a sorted sequence according to their respective unique identifiers. In some embodiments, server 322 also maintains a list of head nodes, tail nodes, and singleton nodes that have opened forward and backward connections to server 322, such that server 322 can determine the current topologies of the linear communication orbit and its contiguous segments.

As shown in FIGS. 3A-3C, each pair of adjacent machines in the linear communication orbit has a pair of communication channels established between them. This pair of communication channels provides full-duplex communications between the pair of adjacent machines. Each machine has the ability to simultaneously receive information from and provide information to its adjacent machines upstream and downstream in the linear communication orbit. In some embodiments, the communication channels are established using a connection-oriented communication protocol, such as TCP, SMTP, DCCP, connection-oriented Ethernet, ATM, IPS, SCTP, or any other suitable connection-oriented communication protocol. Although it is possible to use less reliable, connectionless protocols, such as UDP, to support communications between adjacent machines in the linear communication orbit, maintaining a stable communication channel based on a connection-oriented communication protocol is advantageous in some embodiments because such protocols are more reliable and require less error correction and processing time. In some embodiments, a connectionless protocol may be advantageous because it is more lightweight as compared to a connection-oriented protocol. In various embodiments, the communication channels may be supported by both wired and wireless communication protocols and communication means. In addition, each machine only needs to maintain a small number of open connections (e.g., at most four open connections) at any given time. In most cases, this is not burdensome to the machines and eliminates latencies that could be introduced by reestablishing the connections for each individual communications.

Figure 4A:
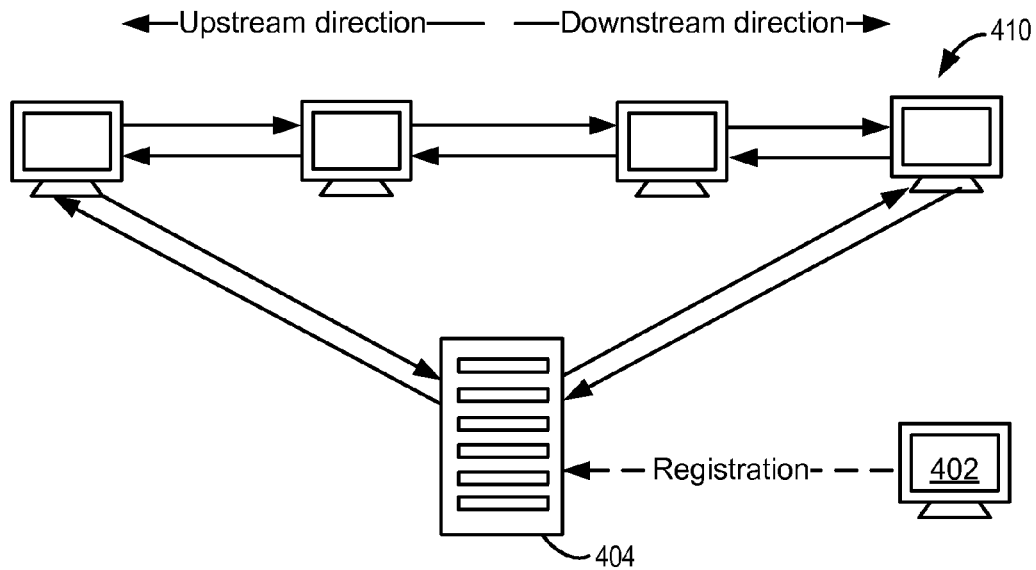
FIGS. 4A-4D illustrate insertion of a new singleton node in a managed network in accordance with some embodiments.

FIGS. 3A-3C illustrate some basic building blocks of a linear communication orbit. FIGS. 4A-4Z illustrate some exemplary processes for autonomously establishing, maintaining, and repairing the linear communication orbit based on a set of predetermined rules, and without global control or manipulation. A person skilled in the art would recognize that FIGS. 4A-4Z are merely illustrative of how machines may communicate with one another to set up respective local segments of the linear communication orbit around themselves, and that the particular set of rules used to by the machines to establish the linear communication orbit may vary from embodiment to embodiment.

FIGS. 4A-4D illustrate how a machine (e.g., machine 402) becomes a singleton connected only to the central server (e.g., server 404). In some embodiments, when machine 402 first joins the managed network, machine 402 notifies server 404 that it has just joined the network (or just become live on the network). In some embodiments, machine 402 notifies server 404 through a registration message sent to server 404. In some embodiments, the registration message includes a respective unique identifier (e.g., IP address or another type of unique identifier) of machine 402. In general, server 404 and machines in the network are aware of how to sort the particular type of unique identifiers provided by the machines in a linear sequence. For example, the server would recognize that the IP address 172.16.254.1 precedes the IP address 172.16.254.4. For another example, a server may implement an ordering system (e.g., a unique identifier 12345 precedes another unique identifier 12346) for a particular type of unique identifiers (e.g., a set of five digit serial numbers), where each machine in the network has been assigned one of such unique identifiers. In some embodiments, other numbering or sequencing schemes are possible, as long as the numbering or sequencing scheme is known to the machines in the network and remains relative stable over time.

Figure 4B:
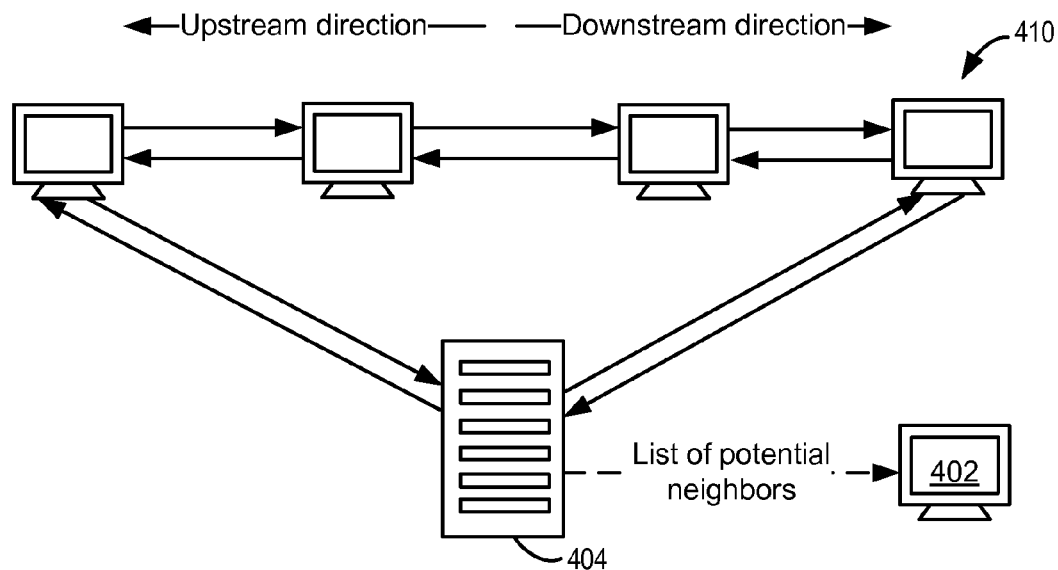

In some embodiments, as shown in FIG. 4A, machine 402 sends a registration message through a connectionless protocol or a broadcast protocol, and the message includes the IP address of machine 402. As is shown in FIG. 4B, in response to the registration message received from machine 402, server 404 sends to machine 402 a list of potential neighbor machines for machine 402. Server 404 determines the rightful ordinal position of machine 402 in the linear communication orbit based on the identifier of machine 402, and the identifiers of all other machines currently known to be live in the managed network. As will be shown later, the server's knowledge does not have to be accurate or up to date at all times.

In some embodiments, server 404 identifies multiple potential preceding neighbors for machine 402 and multiple potential succeeding neighbors for machine 402. This redundancy is desirable since some of these machines may have gone offline between the time that they last reported to server 404 and the time that machine 402 tries to contact them to join the linear communication orbit. In some embodiments, when the unique identifiers used by server 404 to order the machines in the network are the IP addresses of the machines, server 404 provides 20 nearest preceding IP addresses and 20 nearest succeeding IP addresses relative to the IP address of machine 402. In some embodiments, server 404 does not determine whether an IP address is associated with a live machine or not, and machine 402 verifies whether a particular IP address is live (i.e., is associated with a live machine) by contacting the machine at that IP address directly. In some embodiments, server 404 provides other types of information (e.g., media access control addresses, also called MAC addresses) to machine 402, and machine 402 uses that information to find the contact information of its potential preceding neighbors and potential succeeding neighbors.

Figure 4C:
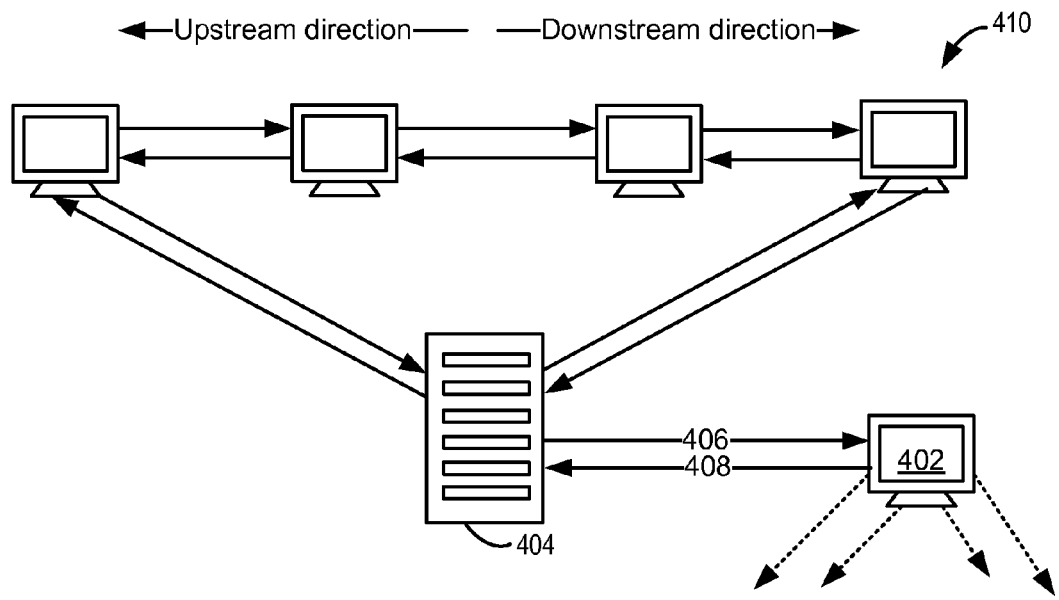

As shown in FIG. 4C, when machine 402 first joins the network, machine 402 also proceeds to establish a forward connection 406 and a backward connection 408 to server 404. Server 404 then uses forward connection 406 to provide information and send queries to machine 402, and uses backward connection 408 to collect information or receive reports from machine 402. Once the connections are established, machine 402 is joined to the network, but is not yet part of any linear communication orbit (e.g., linear communication orbit 410) already present in the network.

In some embodiments, as shown in FIG. 4C, upon receiving the list of potential neighbors from server 404, machine 402 proceeds to reach out to potential neighbor machines in the order provided by the server in each direction (i.e., the upstream direction and the downstream direction) until a potential neighbor machine responds or all the potential neighbor machines are exhausted in that direction.

Figure 4D:
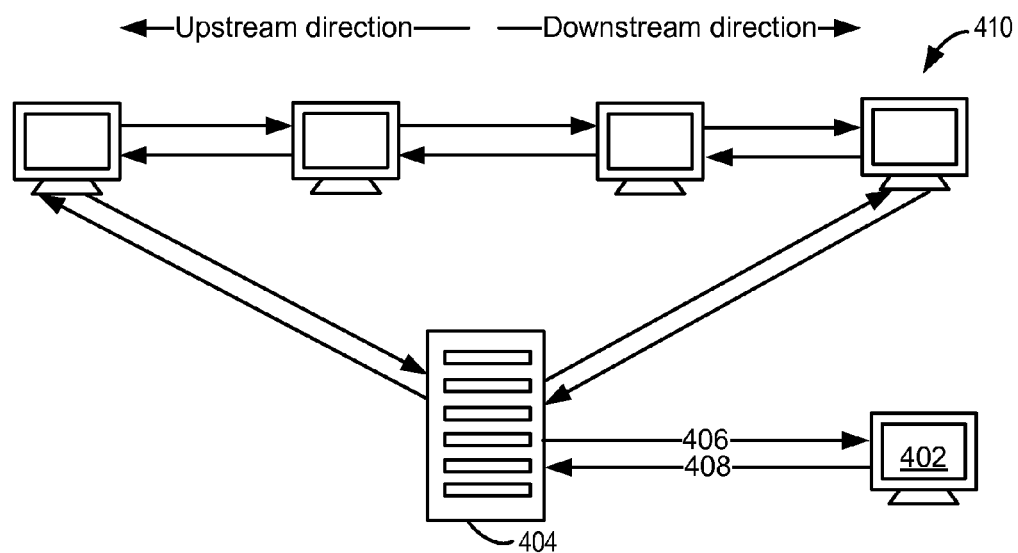

In most scenarios, machine 402 will find a live neighbor machine after one or more attempts to locate the nearest live potential neighbor machine in the list. If no live neighbor is found in the upstream direction, but a nearest live neighbor is found in the downstream direction, machine 402 will become a new head node of a linear communication orbit containing the downstream neighbor. If no live neighbor is found in the downstream direction, but a nearest live neighbor is found in the upstream direction, machine 402 will become a new tail node of a linear communication orbit containing the upstream neighbor. If no live neighbor is found in neither the upstream nor the downstream direction, machine 402 will remain a singleton communicating only with server 404, as shown in FIG. 4D. If subsequently, another new machine that has nearest identifier to machine 402 joins the network, the new machine will take the same actions as machine 402 has done, and ultimately make contact with machine 402 to form a segment of a new linear communication orbit.

FIGS. 4E-4J illustrate how a new machine (e.g., machine 412) is incorporated into an existing linear communication orbit (e.g., linear communication orbit 410) and becomes the new head node of the linear communication orbit.

Figure 4E:
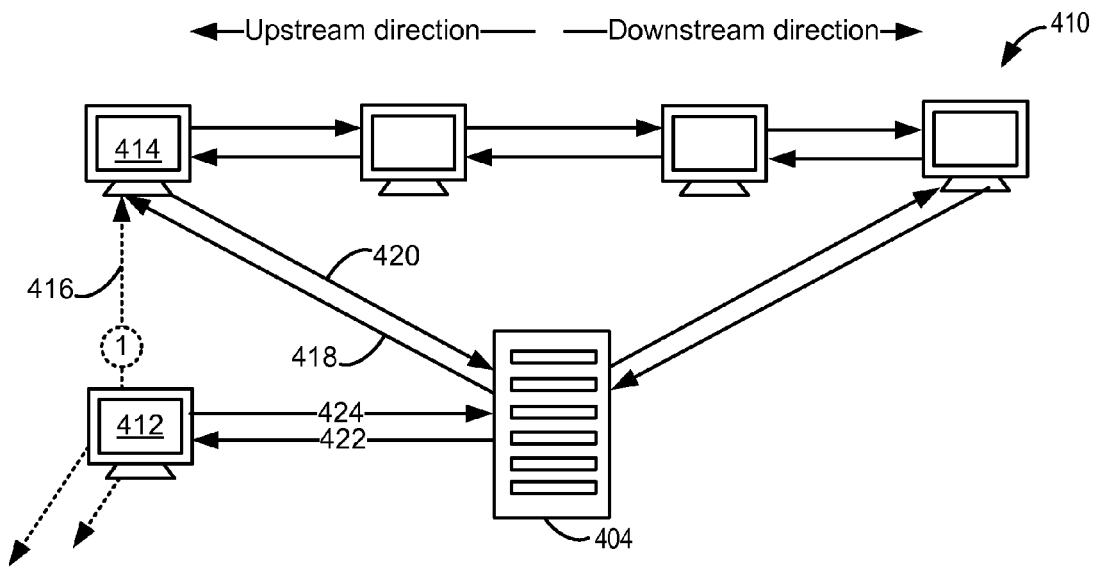
FIGS. 4E-4J illustrate insertion of a new head node in an existing linear communication orbit of a managed network in accordance with some embodiments.

As shown in FIG. 4E, new machine 412 joins the network and, as described above, obtains the list of potential neighbor nodes, e.g., by sending a registration message to server 404. The list of potential neighbor nodes includes potential preceding neighbor nodes and potential succeeding neighbor nodes. New machine 412 goes down the list in both the upstream direction and the downstream direction to find its nearest live preceding node and its nearest live succeeding node. In this particular example, none of the potential upstream neighbor nodes responded to the contact from new machine 412, e.g., either because they are no longer active in the network, or there is a firewall separating them from new machine 412. Suppose that the nearest live downstream node that responded to new machine 412 is the current head node 414 of the existing linear communication orbit 410. New machine 412 will replace machine 414 in its role and become the new head node of linear communication orbit 410. As shown in FIG. 4E, the current head node (i.e., machine 414) has a forward connection 418 and a backward connection 420 established between sever 404 and machine 414. In addition, new machine 412 has also established a forward connection 422 and a backward connection 424 between server 404 and new machine 412 when it first joined the network. In some embodiments, the process to insert new machine 412 proceeds as follows.

In some embodiments, as shown in FIG. 4E, the first live downstream neighbor that responded to the contact from new machine 412 is machine 414. Once new machine 412 confirms that its closest live downstream neighbor in the network is machine 414, it proceeds to open a forward communication channel (e.g., forward communication channel 416) from new machine 412 to the existing head node (i.e., machine 414). In some embodiments, a rule implemented by all machines in the network is to always proactively open a forward connection to its nearest live succeeding node (i.e., its downstream neighbor) when such a node is discovered in the network and there isn't already such a connection in place.

Figure 4F:
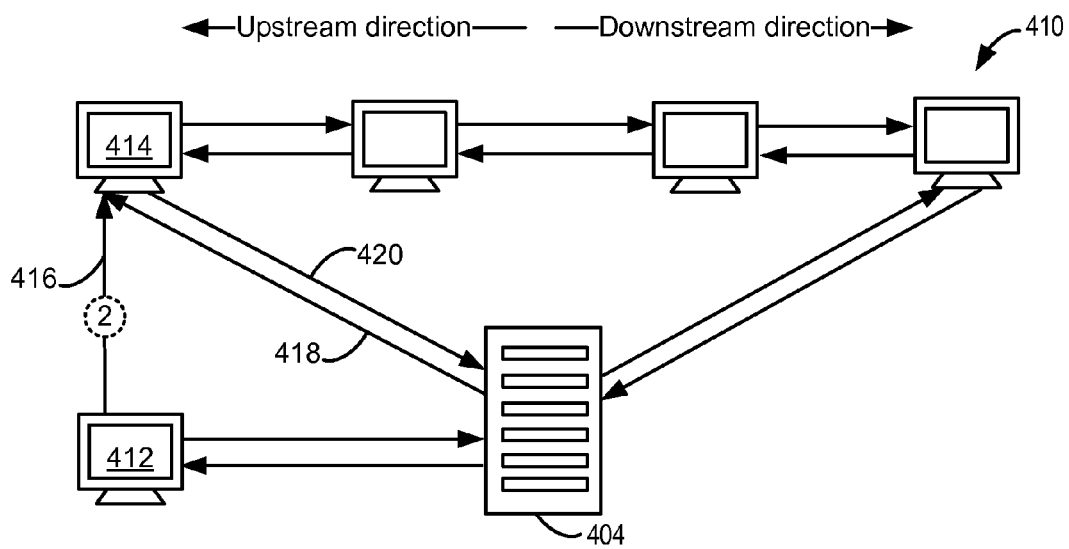

As shown in FIG. 4F, forward communication channel 416 has been established from new machine 412 to existing head node 414. Forward communication channel 416 will serve as the propagation channel for new machine 412 (and as the new receiving channel for machine 414) to provide information to machine 414. Any information that needs to be propagated from server 404 to machine 414 can now be propagated either through new machine 412 (e.g., through new receiving channel 416 of machine 414) or to machine 414 directly from the server (e.g., through existing receiving channel 418 of machine 414).

Figure 4G:
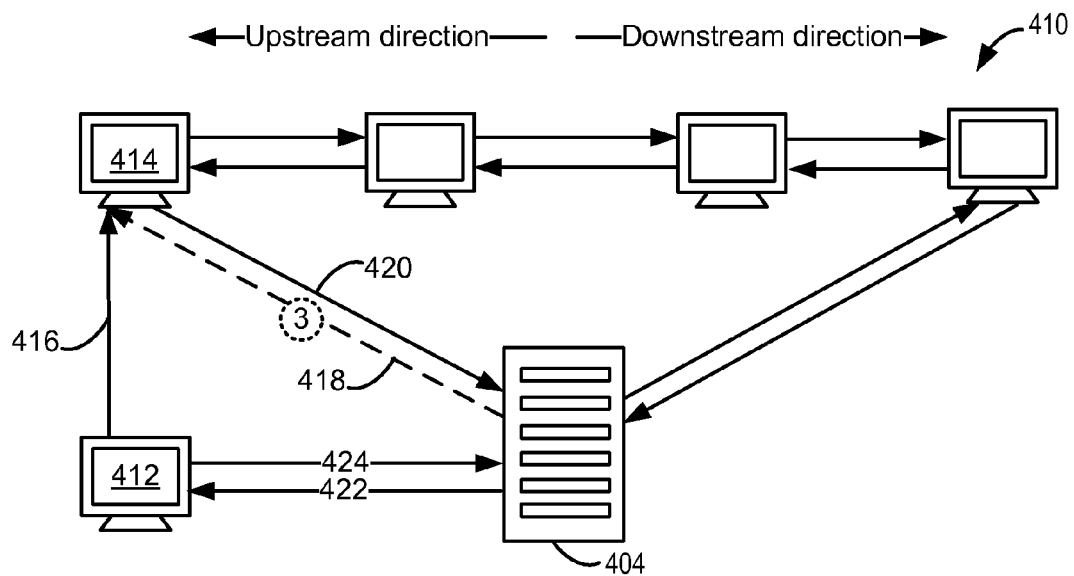

Now the machine 414 has two receiving channels. Upon detecting that a preceding node (e.g., machine 412) has established a forward connection to itself, machine 414 proceeds to terminate the existing forward connection leading from server 404 to machine 414, as shown in FIG. 4G. In some embodiments, a node does not proactively terminate a duplicate receiving channel unless it is a current head node.

Figure 4H:
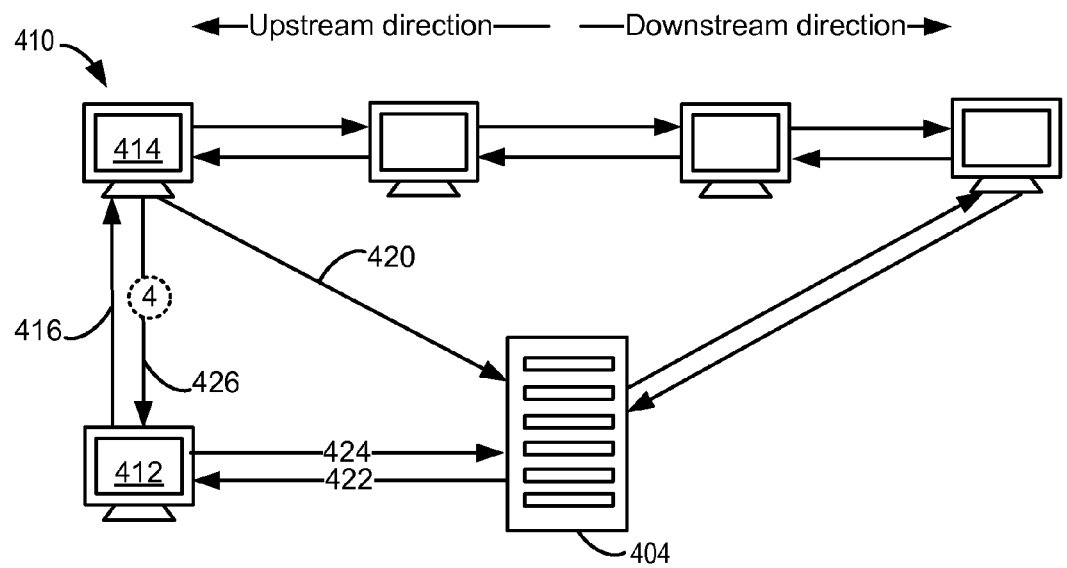

As shown in FIG. 4H, the existing receiving channel 418 of machine 414 has been terminated by machine 414. Machine 414 now relies solely on new machine 412 to provide system, security and network management information through new receiving channel 416 of machine 414 (i.e., propagation channel 416 of new machine 412). At this point, new machine 412 is not yet fully inserted into linear communication orbit 410, since it still has not established a collection channel. Machine 414 continues to serve as the head node of linear communication orbit 410, and is responsible for returning information received from the rest of the linear communication orbit to server 404 through its existing reporting channel 420.

In the next stage, machine 414 detects that there is another live machine having a lower ordinal position than itself present in the network, and that this machine is its upstream neighbor in the linear communication orbit 410. In some embodiments, machine 414 discovers machine 412 by periodically registering with server 404 with a registration message, and in return receives a list of potential neighbor nodes in both directions. In some embodiments, machine 414 discovers machine 412 when new machine 412 makes the initial contact with machine 414. In this example, machine 414 discovers that it should no longer remain as the head node of linear communication orbit 410, and that its new upstream neighbor node is new machine 412. Upon the discovery that new machine 412 is a live upstream neighbor and that there is no existing backward communication channel between machine 414 and new machine 412, machine 414 proceeds to open a new backward communication channel (e.g., backward communication channel 426) from machine 414 to new machine 412, as shown in FIG. 4H. In some embodiments, a rule implemented by all machines in the network is to always proactively open a backward communication channel to the nearest live preceding node (i.e., its upstream neighbor) when such a node is discovered in the network and there isn't already such a communication channel in place.

As shown in FIG. 4H, new backward communication channel 426 will serve as the new reporting channel of machine 414 and the collection channel of new machine 412. At this point, machine 414 can report back to server 404 either directly through its existing reporting channel 420 or through new reporting channel 426. New machine 412 is now fully functional within linear communication orbit 410 as the new head node of linear communication orbit 410.

Figure 4I:
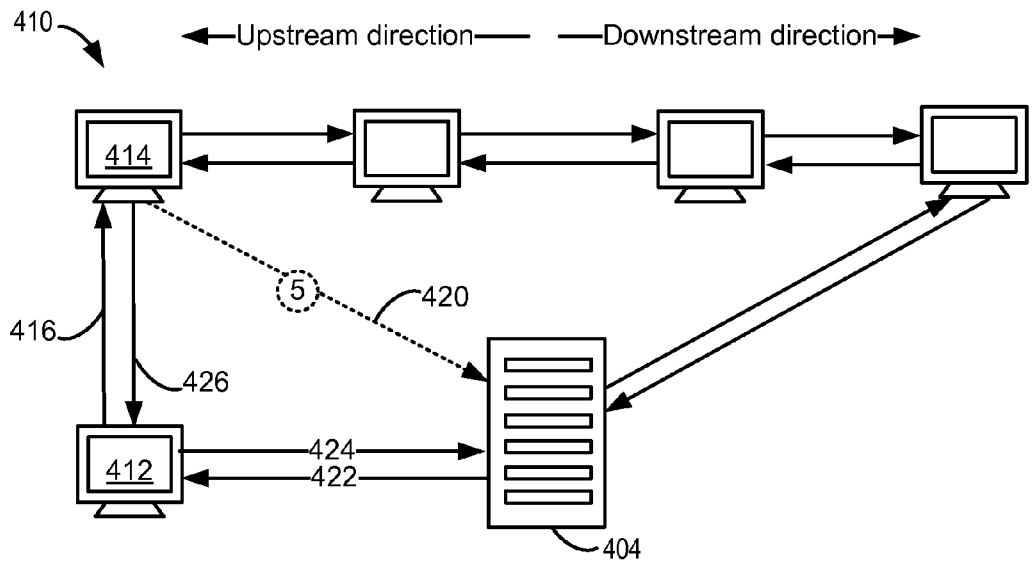
Figure 4J:
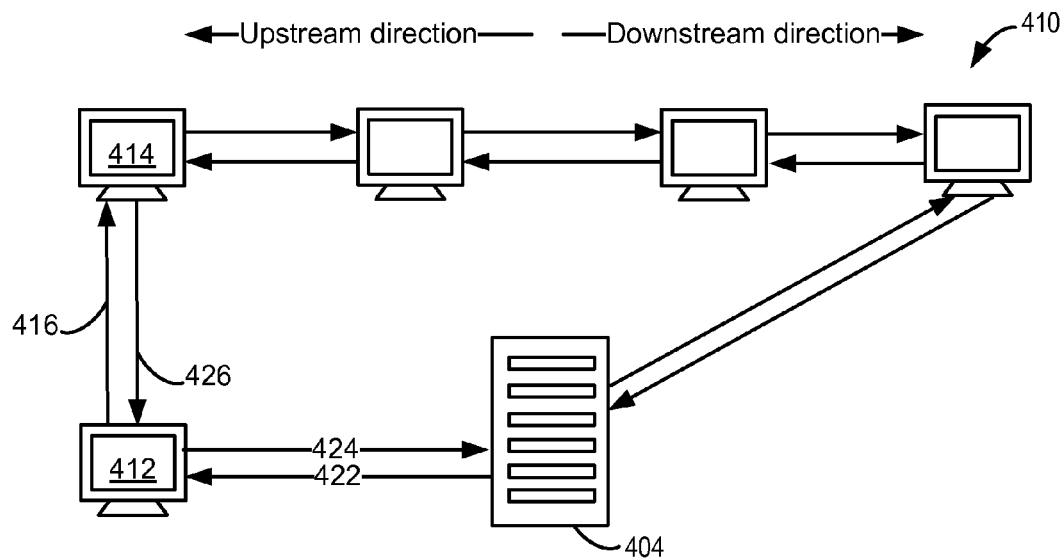

Since machine 414 now has duplicate reporting channels (one channel to new machine 412 and the other channel directly back to server 404), machine 414 proceeds to terminate the old reporting channel 420 back to server 404, as shown in FIG. 4I. In some embodiments, a node always proactively terminates an old, duplicate reporting channel when a new reporting channel has been established. As shown in FIG. 4J, after having terminated the old reporting channel 420 to server 404, machine 414 has fully changed its role from being the head node of linear communication channel 410 to being an intermediate node of linear communication orbit 410.

As shown in FIG. 4J, in a steady state, new machine 412 serves as the new head node of linear communication orbit 410. New machine 412 receives information from server 404 through its receiving channel 422 leading from server 404 to machine 412. New machine 412 forwards the information and any updates to machine 414 through its propagation channel 416 leading from new machine 412 to machine 414. The new intermediate node (i.e., machine 414) further processes and/or forwards the information downstream to the other nodes of linear communication orbit 410. When machine 414 sends information upstream to new machine 412, new machine 412 receives the information through collection channel 426 of new machine 412. New machine 412 then sends the received information along with any local updates to server 404 through reporting channel 424 of new machine 412.

In some embodiments, the server 404 keeps an updated list of all the head nodes in the network and sends those nodes a trigger to register as soon as it has new requests (for system and security management operations, etc.), thereby avoiding the delay inherent in the registration interval.

FIGS. 4E-4J illustrate the scenario for inserting a new head node into an existing linear communication orbit. FIGS. 4K-4P illustrate another scenario where a new tail node is inserted into an existing linear communication orbit.

Figure 4K:
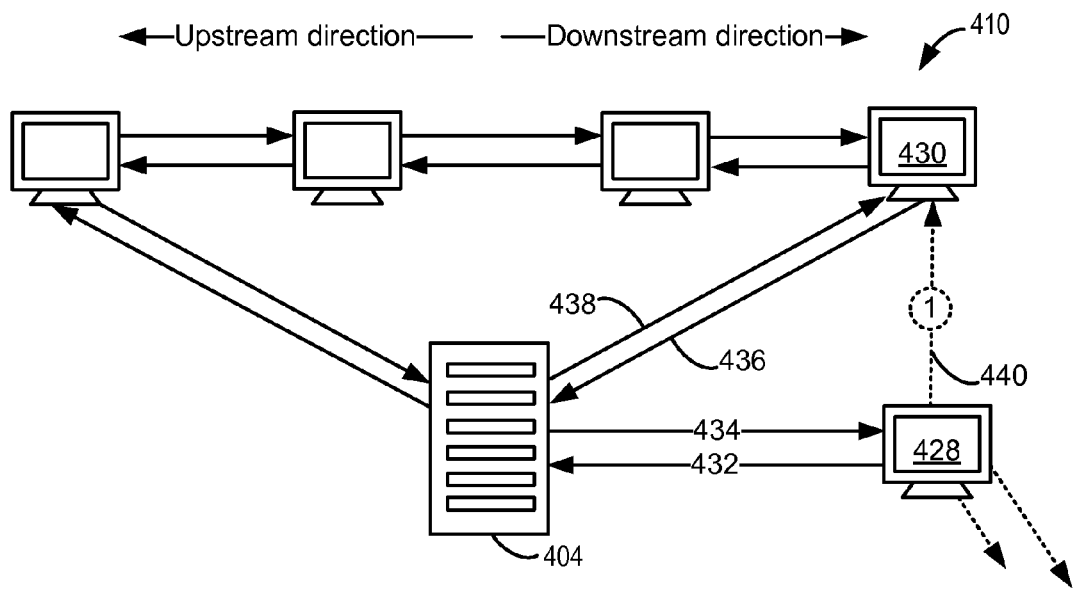
FIGS. 4K-4P illustrate insertion of a new tail node in an existing linear communication orbit of a managed network in accordance with some embodiments.

As shown in FIG. 4K, a new machine (e.g., new machine 428) has joined the managed network and established forward connection 432 and backward connection 434 to server 404. New machine 428 has also obtained a list of potential neighbor nodes, e.g., by sending a registration message to server 404. The list of potential neighbor nodes includes potential preceding neighbor nodes and potential succeeding neighbor nodes for new machine 428. New machine 428 attempts to identify its nearest live preceding node and its nearest live succeeding node by contacting the list of nodes one by one in both the upstream direction and the downstream direction.

In this particular example, none of the potential succeeding neighbor nodes responded to the contact from new machine 428. The nearest live upstream node that responded to new machine 428 is the current tail node 430 of existing linear communication orbit 410. Tail node 430 has a forward connection (e.g., forward connection 436) and a backward connection (e.g., backward connection 438) to server 404. Tail node 430 sends information to server 404 through forward connection 436 and receives information from server 404 through backward connection 438. In this example, since machine 430 has a lower ordinal position than new machine 428, new machine 428 will replace machine 430 in its role and become the new tail node of linear communication orbit 410. In some embodiments, the process for inserting new machine 428 proceeds as follows.

As shown in FIG. 4K, once new machine 428 confirms that its upstream neighbor (i.e., closest live preceding node) in the network is machine 430, it proceeds to open a backward communication channel (e.g., backward communication channel 440) from new machine 428 to machine 430. In some embodiments, a rule implemented by all machines in the network is to always proactively open a backward communication channel to a closest live preceding machine (i.e., an upstream neighbor) if such a preceding machine has been discovered and there isn't already such a communication channel in place.

Figure 4L:
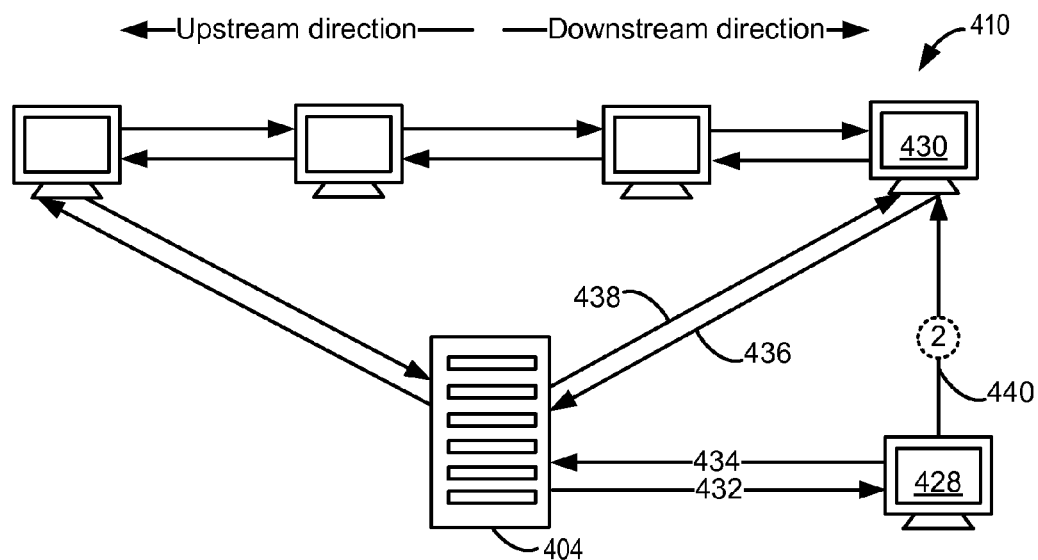

As shown in FIG. 4L, backward communication channel 440 has been established from new machine 428 to existing tail node 430. Backward communication channel 440 will serve as the reporting channel for new machine 428 (and a new collection channel for machine 430) to provide information to machine 430. Machine 430 now receives information in the upstream direction from both server 404 and new machine 428.

Figure 4M:
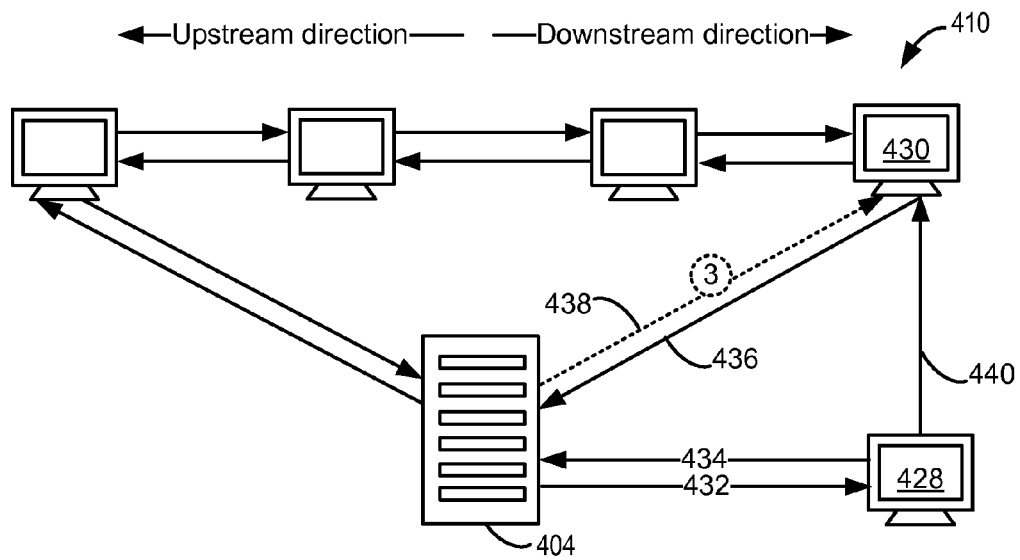

Now, machine 430 has two collection channels, and it proceeds to terminate the old collection channel 438 between machine 430 and server 404, as shown in FIG. 4M. In some embodiments, a node does not proactively terminate a duplicate collection channel unless it is a current tail node. Once the old collection channel 438 has been terminated by machine 430, machine 430 relies solely on its newly established collection channel 440 to receive information in the upstream direction. At this point, new machine 428 is not yet fully inserted into linear communication orbit 410, as it has not yet established a receiving channel.

In the next stage, machine 430 detects that a new machine (e.g., new machine 428) having the next higher ordinal position relative to itself has entered the network, and that new machine 428 should succeed it in linear communication orbit 410. In some embodiments, machine 430 discovers machine 428 by periodically reporting to server 404 with a registration message, and in return receives a list of potential neighbor nodes in both directions. In some embodiments, machine 430 discovers new machine 428 when new machine 428 makes the initial contact with machine 430.

Figure 4N:
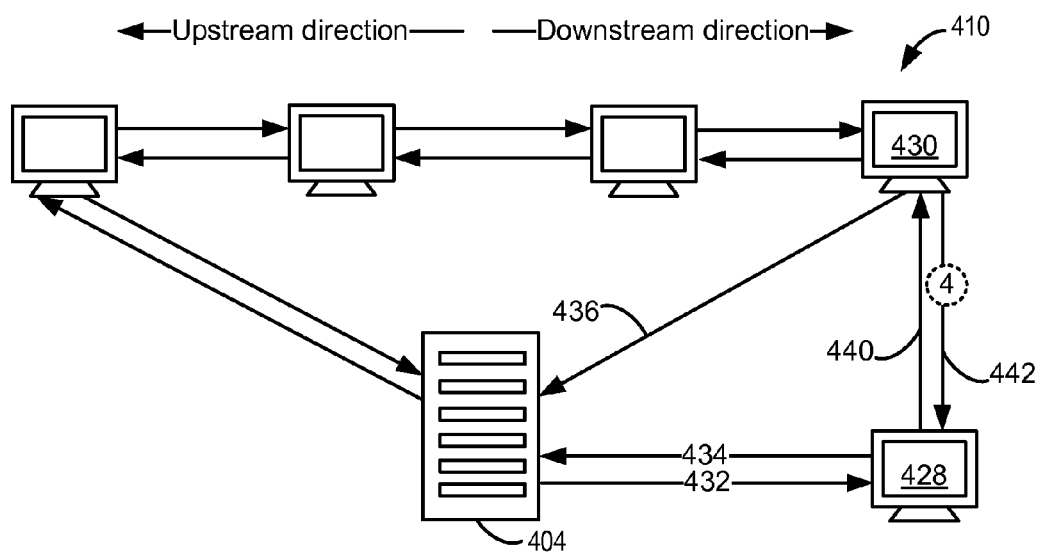

Upon discovering that new machine 428 is its downstream neighbor in linear communication orbit and a forward connection does not already exist between itself and new machine 428, machine 430 proceeds to open a new forward communication channel (e.g., forward communication channel 442) from machine 430 to new machine 428, as shown in FIG. 4N. New forward communication channel 442 will serve as the new propagation channel of machine 430 and the receiving channel of new machine 438. In some embodiments, a rule implemented by all machines in the network is to proactively open a forward communication channel to a closest live succeeding machine (i.e., downstream neighbor) if such a succeeding machine has been discovered and such a forward communication channel does not already exist.

Figure 4O:
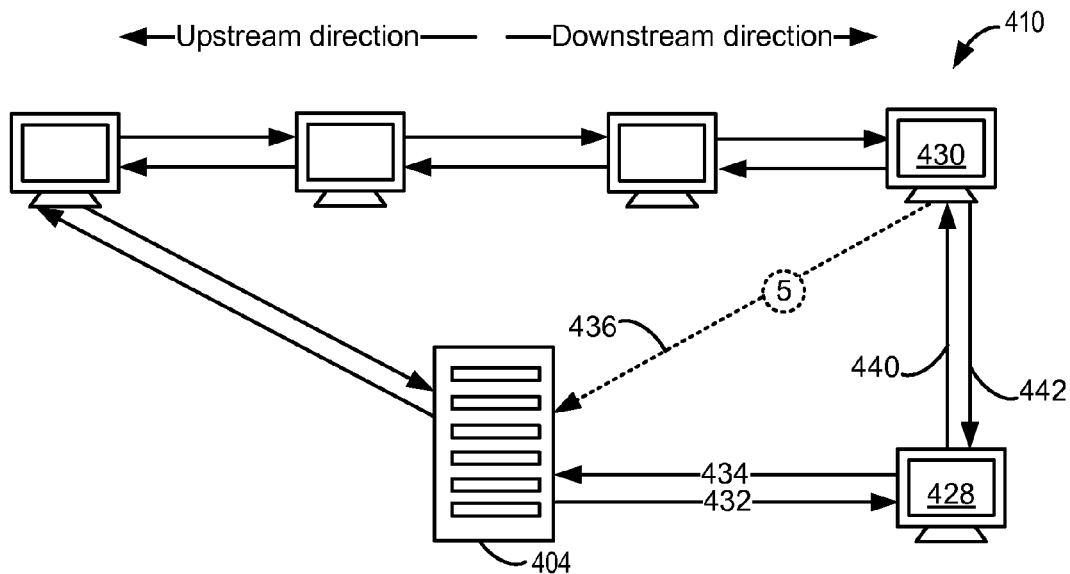

At this point, machine 430 can propagate information downstream either directly through its existing propagation channel 436 or through new propagation channel 442. New machine 428 is now fully functional within linear communication orbit 410 as the new tail node of linear communication orbit 410. Since machine 430 now has duplicate propagation channels (one channel to new machine 428 and another channel to server 404), machine 430 proceeds to terminate the old propagation channel 436 connected to server 404, as shown in FIG. 4O. In some embodiments, a node always proactively terminates an old, duplicate propagation channel when a new propagation channel has been established. After having terminated the old propagation channel 436 to server 404, machine 430 has fully changed its role from being the tail node of linear communication channel 410 to being an intermediate node of linear communication orbit 410.

Figure 4P:
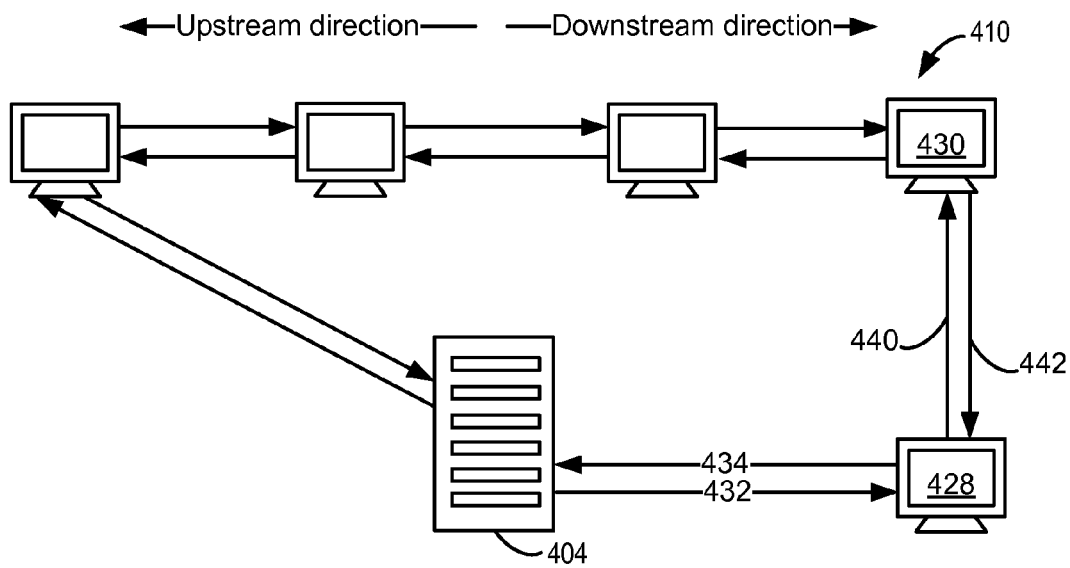

As shown in FIG. 4P, during a steady state, new machine 428 serves as the new tail node of linear communication orbit 410. New machine 428 receives information from machine 430 through its receiving channel 442 leading from machine 430 to machine 428. New machine 428 propagates the information and any updates to server 404 through its propagation channel 434 leading from new machine 302 to server 404. In the upstream direction, when new machine 428 receives information from server 404 through its collection channel 432, new machine 428 sends the information upstream to machine 430 through reporting channel 440 of new machine 428. Machine 430, now serving as an intermediate node, further processes and/or forwards the information upstream to other nodes in linear communication orbit 410.

In some embodiments, similar to the processes described above with respect to inserting a new head node or a new tail node into an existing linear communication orbit, the insertion of a new intermediate node into the existing linear communication orbit can be performed based on the same set of rules mentioned above. In general, an existing intermediate node that is having a new upstream neighbor node inserted behaves similarly to an existing head node that is having a new head node inserted. In general, an existing intermediate node that is having a new downstream neighbor node inserted behaves similarly to an existing tail node that is having a new tail node inserted. In general, when a new intermediate node is inserted between a pair of adjacent nodes in a linear communication orbit, the actions taken by each node depends on the relative position of said node among the three nodes involved in the insertion. FIGS. 4Q-4V illustrate an example process for inserting a new machine (e.g., new machine 444) as an intermediate node in a linear communication orbit (e.g., linear communication orbit 410).

Figure 4Q:
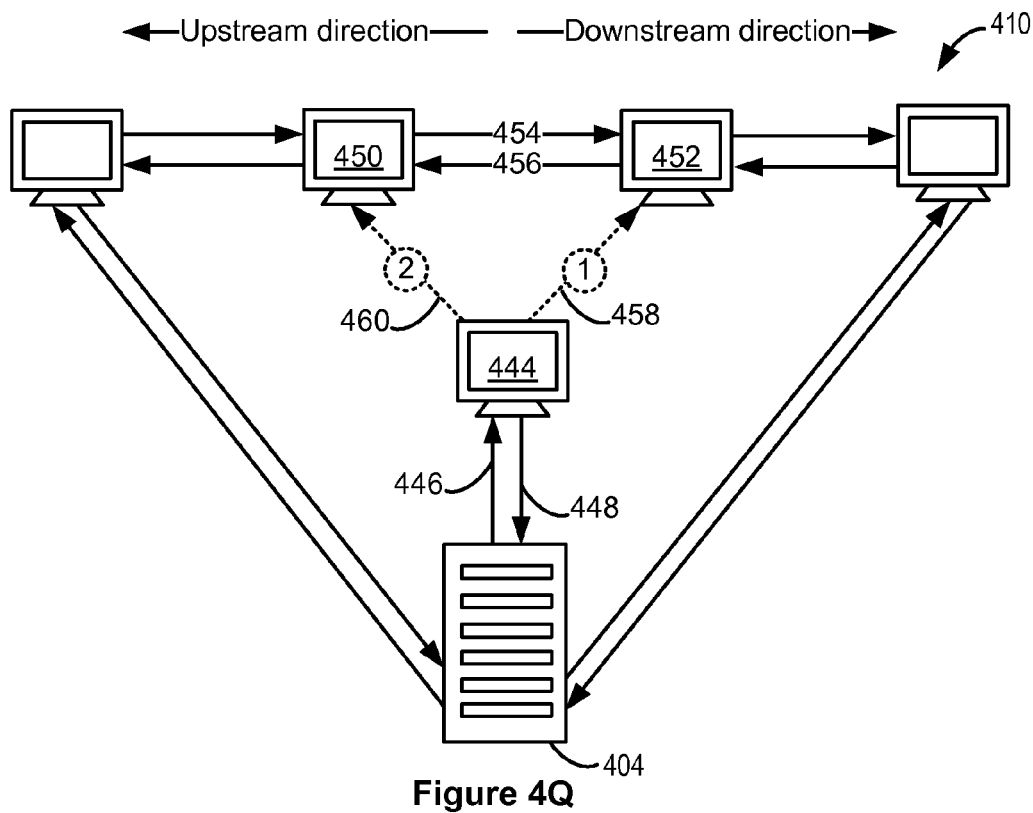
FIGS. 4Q-4V illustrate insertion of a new intermediate node in an existing linear communication orbit of a managed network in accordance with some embodiments.

As shown in FIG. 4Q, new machine 444 has joined the managed network and established forward connection 446 and backward connection 448 between new machine 444 and server 404. New machine 444 then obtains a respective list of potential neighbor nodes in both the upstream and the downstream directions. New machine 444 then attempts to make contact with its nearest live preceding node and nearest live succeeding node. In this particular example, a nearest live upstream node (e.g., machine 450) and a nearest live downstream node (e.g., machine 452) responded to new machine 444. Machine 450 and machine 452 are adjacent nodes in the existing linear communication orbit 410. Based on the ordinal positions determined according to their respective unique identifiers (e.g., IP addresses), new machine 444 will be inserted as an intermediate node between machine 450 and machine 452. Although machines 450 and 452 are shown as intermediate nodes in the linear communication orbit 410, the same process would apply when machine 450 is a head node, and/or when machine 452 is a tail node of an existing linear communication orbit.

As shown in FIG. 4Q, once new machine 444 confirms that its downstream neighbor in the network is machine 452, machine 444 proceeds to open a forward communication channel (e.g., forward communication channel 458) from new machine 444 to machine 452. In some embodiments, a rule implemented by all machines in the network (and here independently applied by new machine 444) is to proactively open a forward communication channel to a downstream neighbor when such downstream neighbor has been discovered and such channel does not already exist.

As further shown in FIG. 4Q, once new machine 444 confirms that its upstream neighbor in the network is machine 450, it proceeds to open a backward communication channel (e.g., backward communication channel 460) from new machine 444 to machine 450. In some embodiments, a rule implemented by all machines in the network (and here independently applied by new machine 444) is to proactively open a backward communication channel to an upstream neighbor when such upstream neighbor has been discovered and such channel does not already exist. In some embodiments, each machine always opens a forward connection to its downstream neighbor before it opens a backward connection to its upstream neighbor.

Figure 4R:
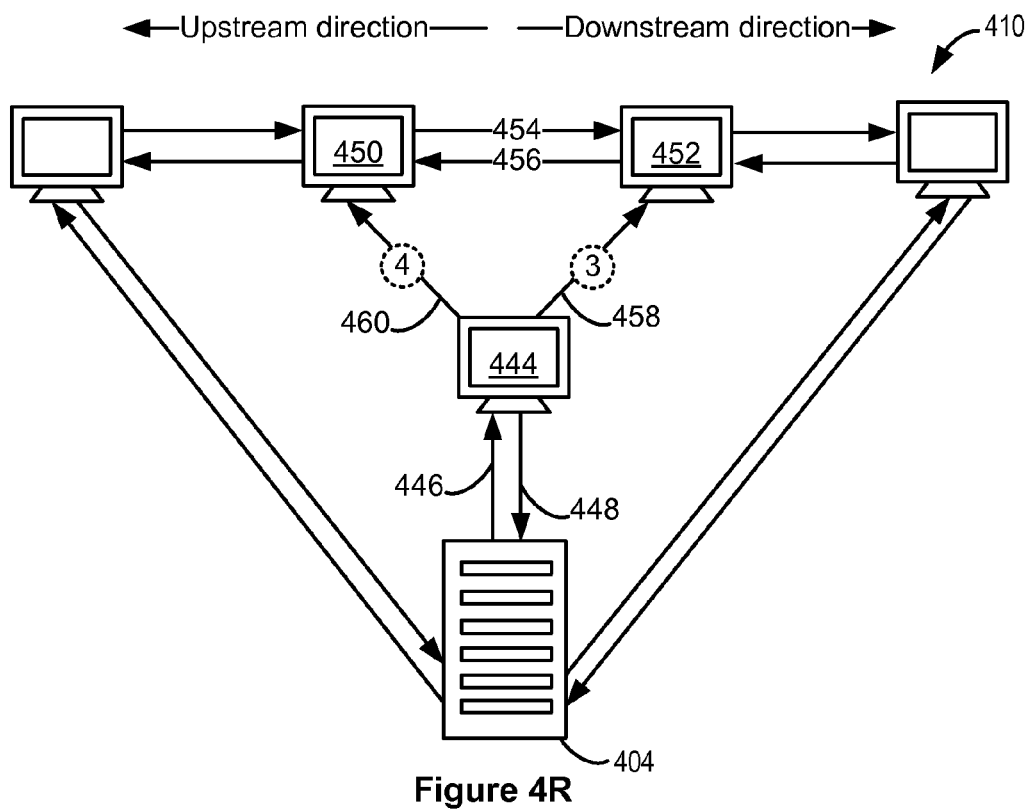

As shown in FIG. 4R, new machine 444 has already opened forward communication channel 458 to its downstream neighbor 452, and backward communication channel 460 to its upstream neighbor 450. Forward communication channel 458 will serve as a propagation channel for new machine 444 and a new receiving channel for machine 452. Backward communication channel 460 will serve as a reporting channel for new machine 444 and a new collection channel for machine 450.

Figure 4S:
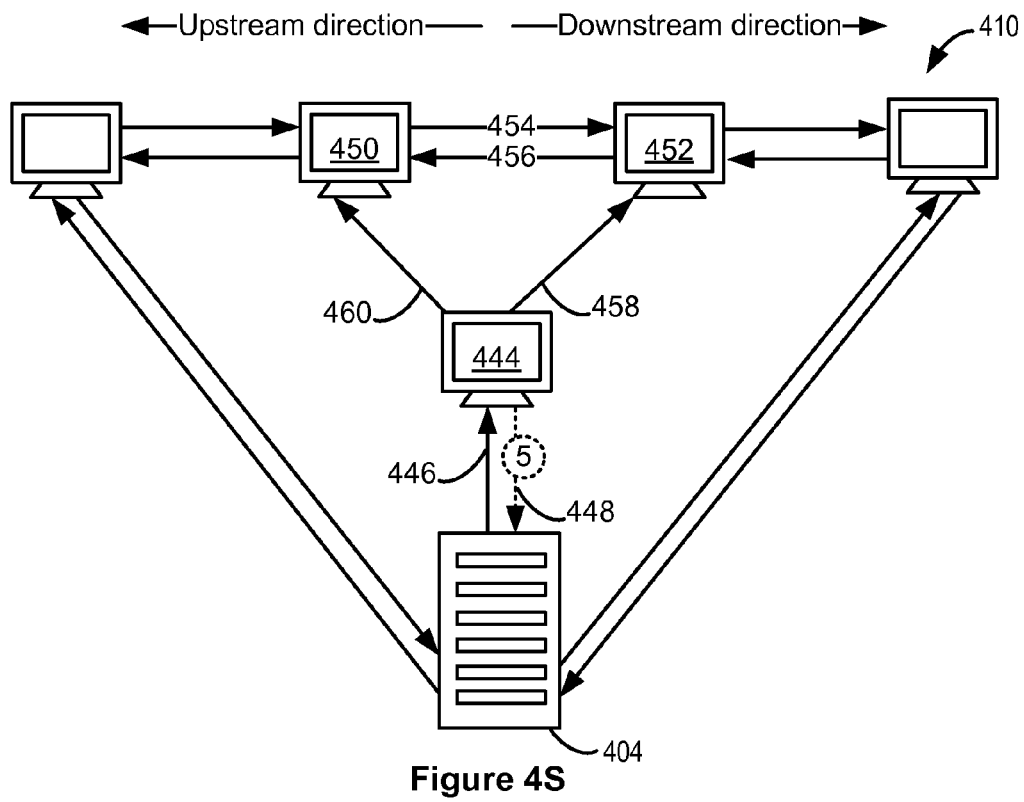
Figure 4T:
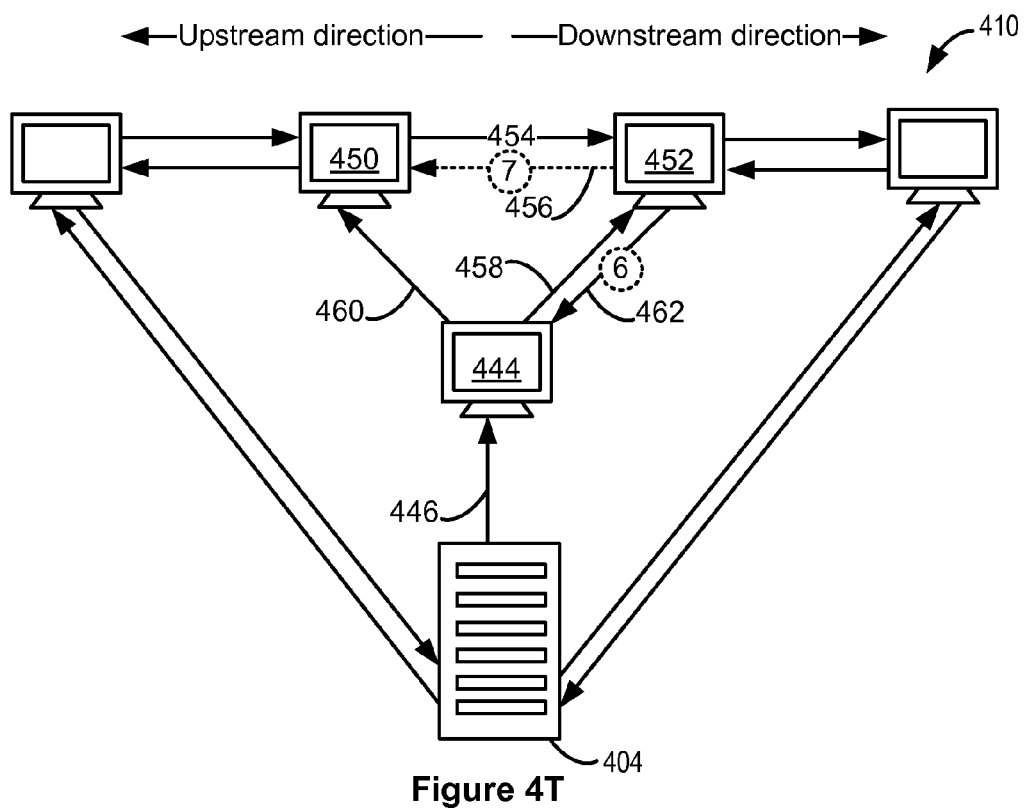

As shown in FIG. 4S, new machine 444 now has two propagation channels, an old propagation channel 448 to server 404, and a new propagation channel 458. New machine 444 proceeds to terminate the old propagation channel 448 to server 404. As shown in FIG. 4T, after new machine 444 has terminated the old propagation channel 448, new machine 444 sends information in the downstream direction through its new propagation channel 458.

As shown in FIG. 4S, after new machine 444 has established backward communication channel 460 to machine 450, machine 450 receives information in the upstream direction through two collection channels 456 and 460. Even though machine 450 now has two collection channels, it does not actively terminate the old collection channel 456. Instead, machine 450 relies on its former successor node 452 to terminate the backward communication channel 456. In some embodiments, a rule implemented by all machines is to terminate a redundant reporting channel leading to an old non-server predecessor node, but not a redundant collection channel leading from an old non-server successor node.

As shown in FIG. 4T, when machine 452 discovers that new machine 444 is now its new upstream neighbor, machine 452 proceeds to open a backward communication channel (e.g., backward communication channel 462) to new machine 444. Backward communication channel 462 will serve as the collection channel for new machine 444 to receive information from machine 452. Backward communication channel 462 also serves as a new reporting channel for machine 452 to send information to new machine 444. As shown in FIG. 4T, machine 452 now has two backward communication channels, one channel 456 to its old upstream neighbor 450 and another channel 462 to its new upstream neighbor 444. Based on the rules implemented by all machines and here independently applied by machine 452, machine 452 proceeds to terminate the backward communication channel 456 to its previous upstream neighbor 450.

Figure 4U:
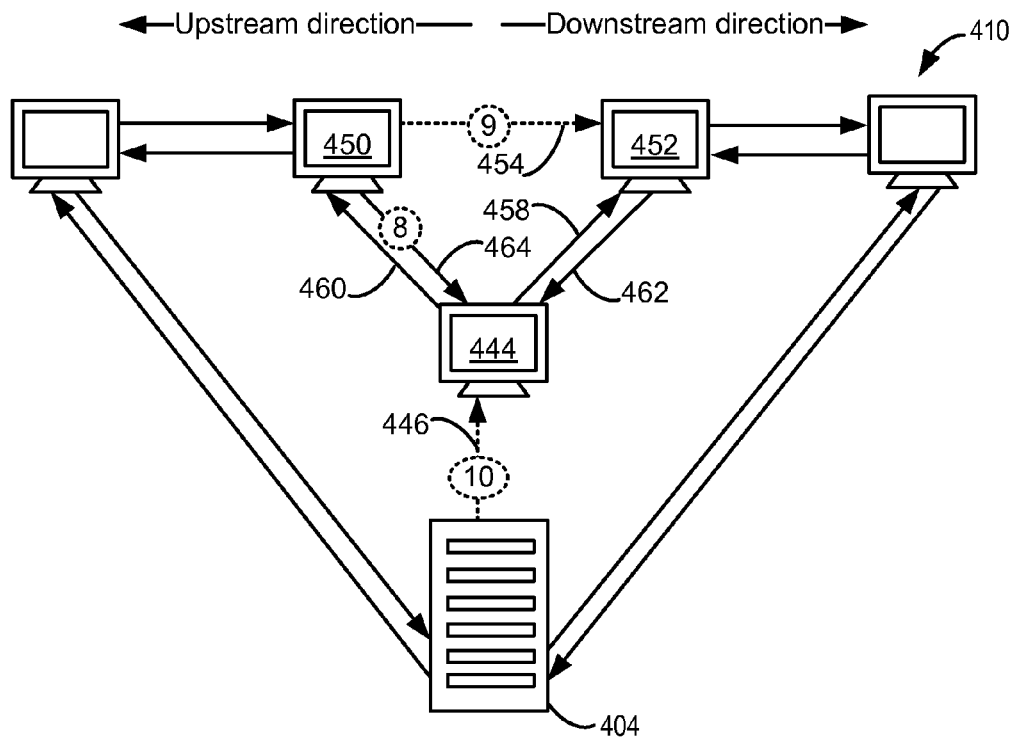

As shown in FIG. 4U, after machine 450 discovers that new machine 444 is its new downstream neighbor in linear communication orbit 410, machine 450 proceeds to open new forward communication channel 464 from machine 450 to new machine 444. New forward communication channel 464 will serve as the new propagation channel of machine 450, and the receiving channel of new machine 444. At this point, machine 450 can send information in the downstream direction to machine 452 through its existing propagation channel 454 and to new machine 444 through its new propagation channel 464.

Since machine 450 now has a redundant propagation channel, machine 450 proceeds to terminate the old propagation channel 454 to machine 452, as shown in FIG. 4U. In some embodiments, a rule implemented by all machines and here independently applied by machine 450 is to terminate an old forward communication channel to a previous downstream neighbor, when a new forward communication channel to a new downstream neighbor has been established.

When machine 450 has established forward communication channel 464 to new machine 444, and machine 452 has established backward communication channel 462 to new machine 444, the local segment centered about new machine 444 is completely established. At this point, new machine 444 proceeds to terminate forward communication channel 446 from server 404. Once forward communication channel 446 has been terminated, new machine 444 is completely inserted into linear communication orbit 410 and becomes an intermediate node in linear communication orbit 410, as shown in FIG. 4V.

During a steady state, new machine 444 serves as a new intermediate node between machine 450 and machine 452. New machine 444 receives information from machine 450 through its receiving channel 464 leading from machine 450 to new machine 444. New machine sends the received information and any updates to machine 452 through its propagation channel 458 leading from new machine 444 to machine 452. When propagating information in the upstream direction, new machine 444 receives information from machine 452 through its collection channel 462 leading from machine 452 to new machine 444. New machine 444 then sends the received information upstream to machine 450 through its reporting channel 460 leading from new machine 444 to machine 450.

As described above, new machine 444 and existing machines 450 and 452 implement the same set of rules to independently determine their respective positions in the linear communication orbit, identify their respective upstream and downstream neighbors in the linear communication orbit, establish new communication channels to their new upstream and/or downstream neighbors, and drop old, duplicate communication channels to their old upstream and/or downstream neighbors. The independent actions of machines 444, 450, and 452 are coordinated on a global scale simply by the design of the rules. As a result of the coordination, a simple linear communication orbit is created and maintained for transport information, instructions, and updates to and from all machines in the network in a full-duplex manner.

Figure 4V:
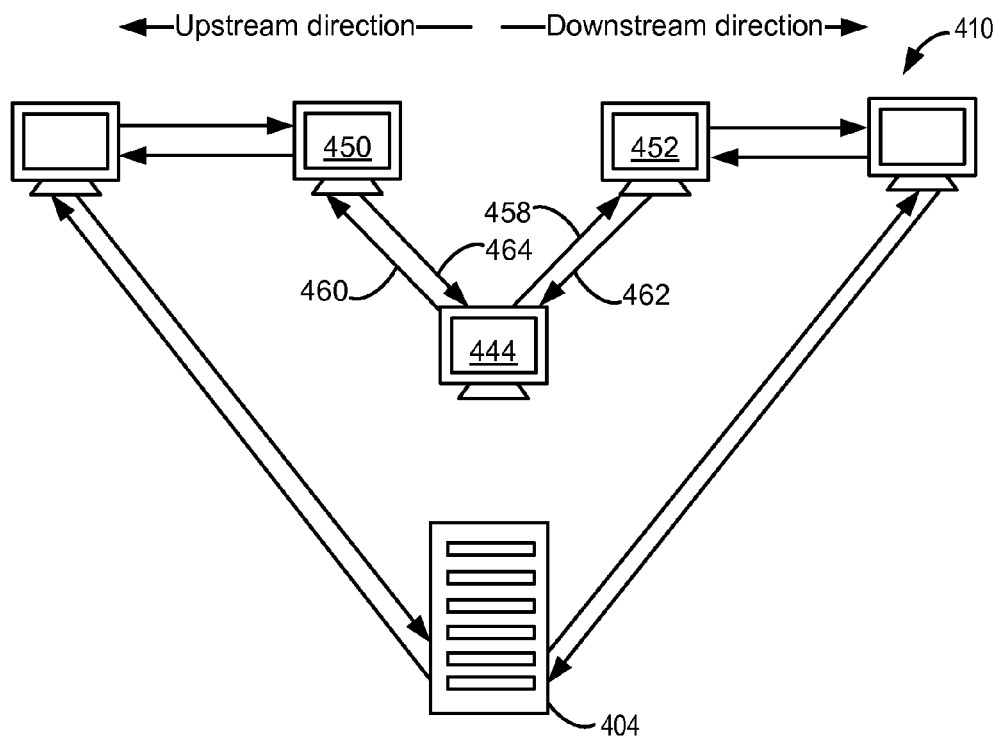
Figure 5A:
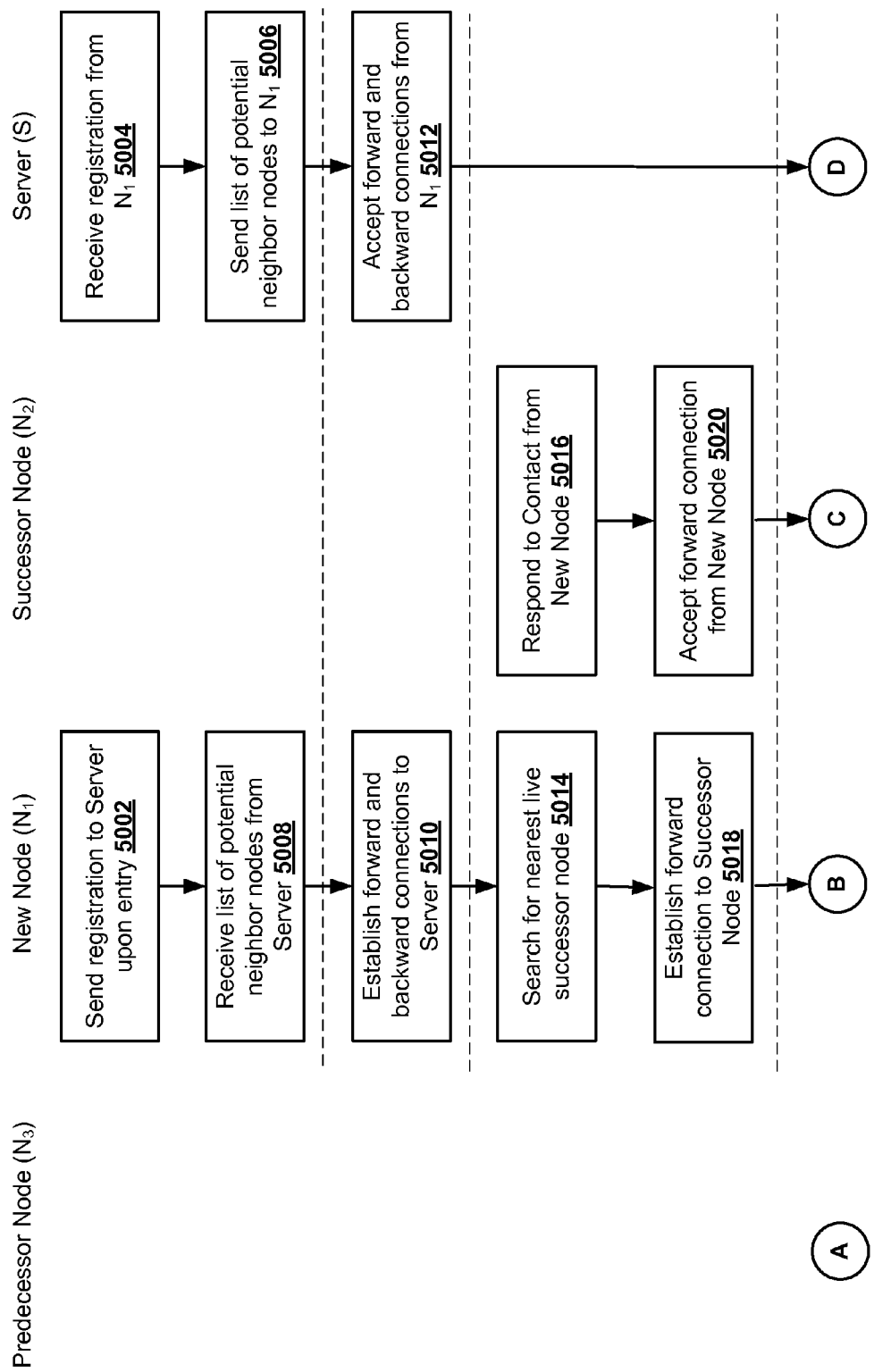
FIGS. 5A-5D are flow diagrams illustrating interactions between a new intermediate node, a predecessor node of the new node, a successor node of the new node, and a server during insertion of the new intermediate node into an existing linear communication orbit in accordance with some embodiments.
Figure 5B:
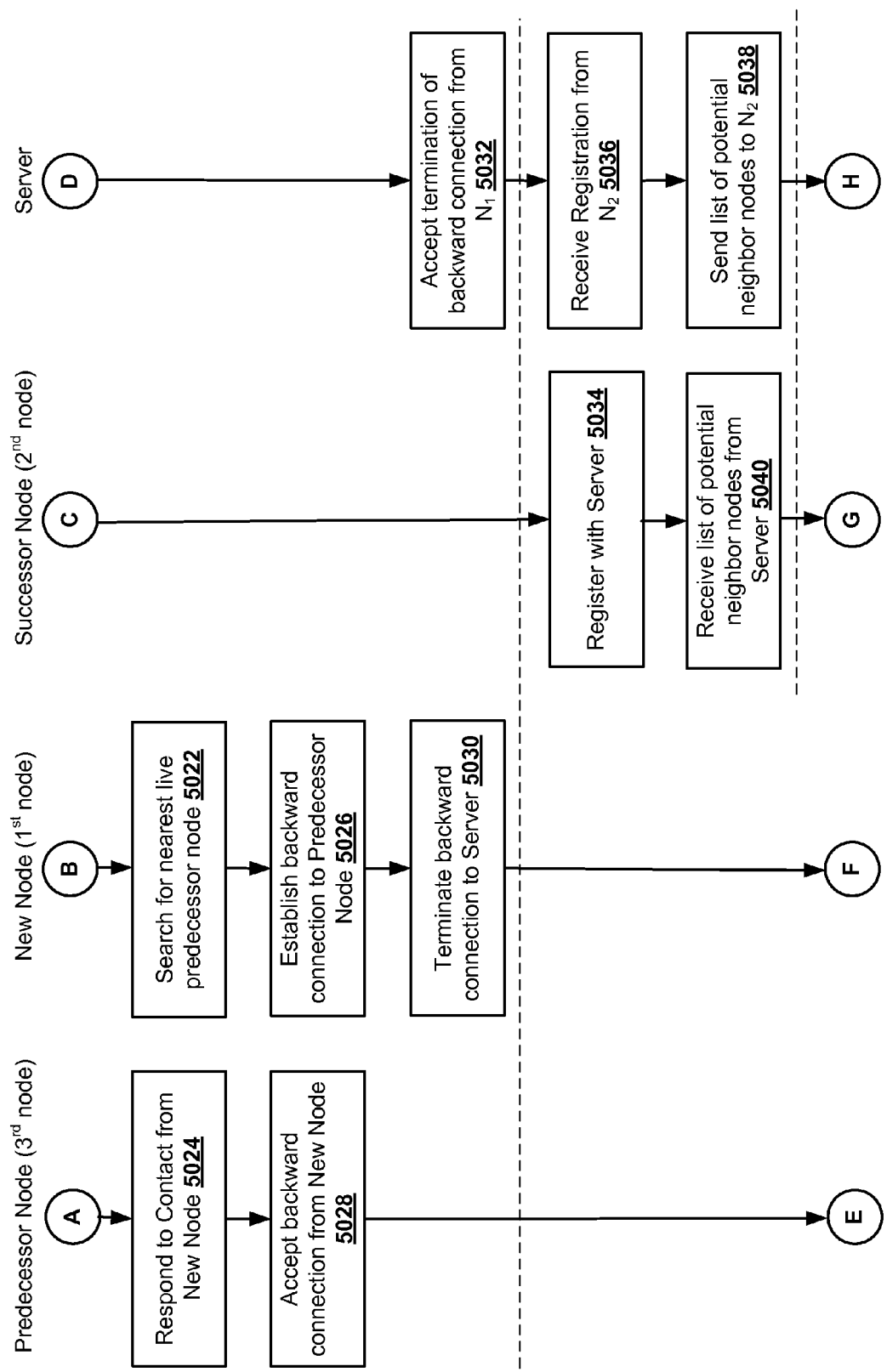
Figure 5C:
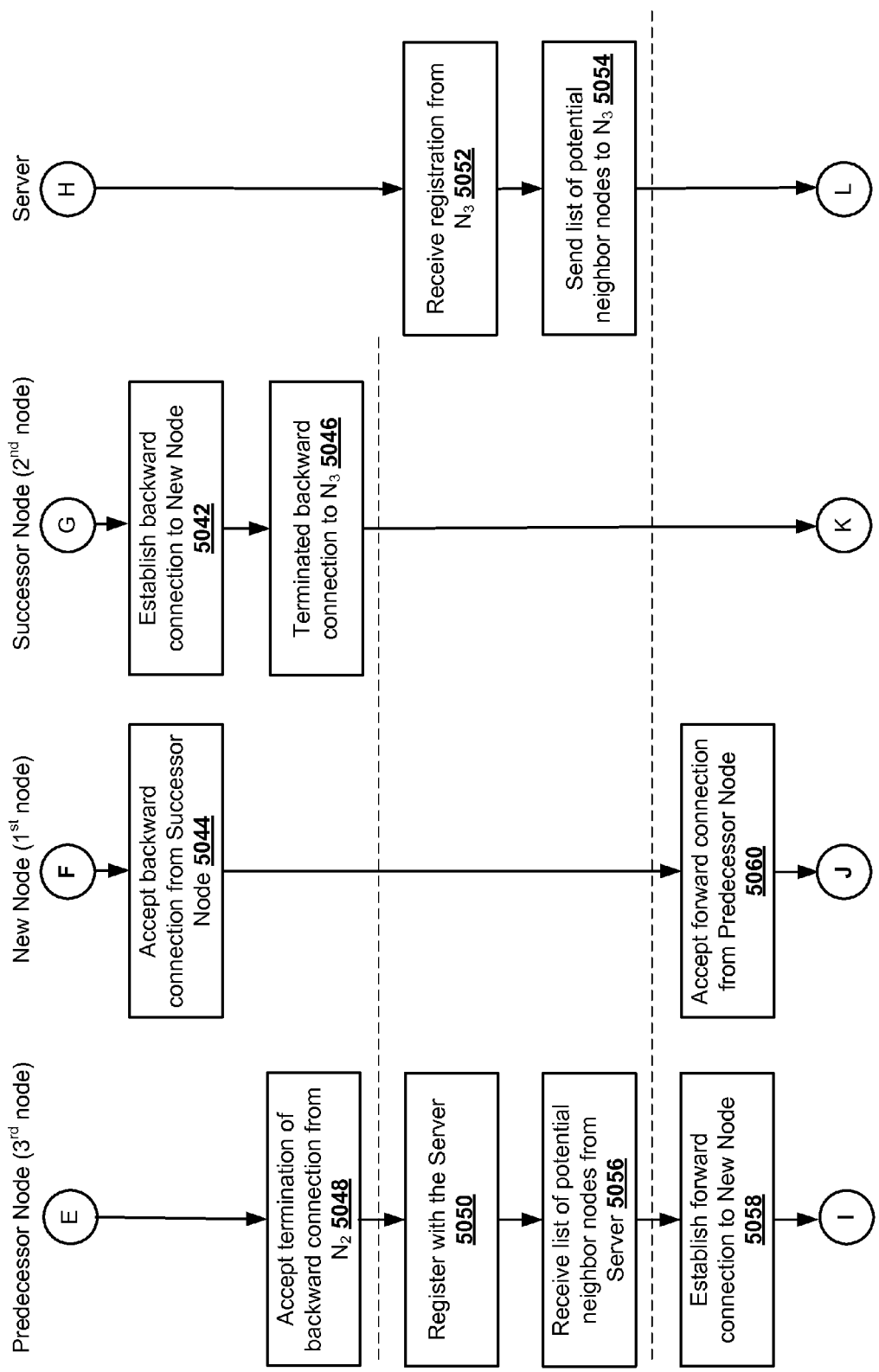
Figure 5D:
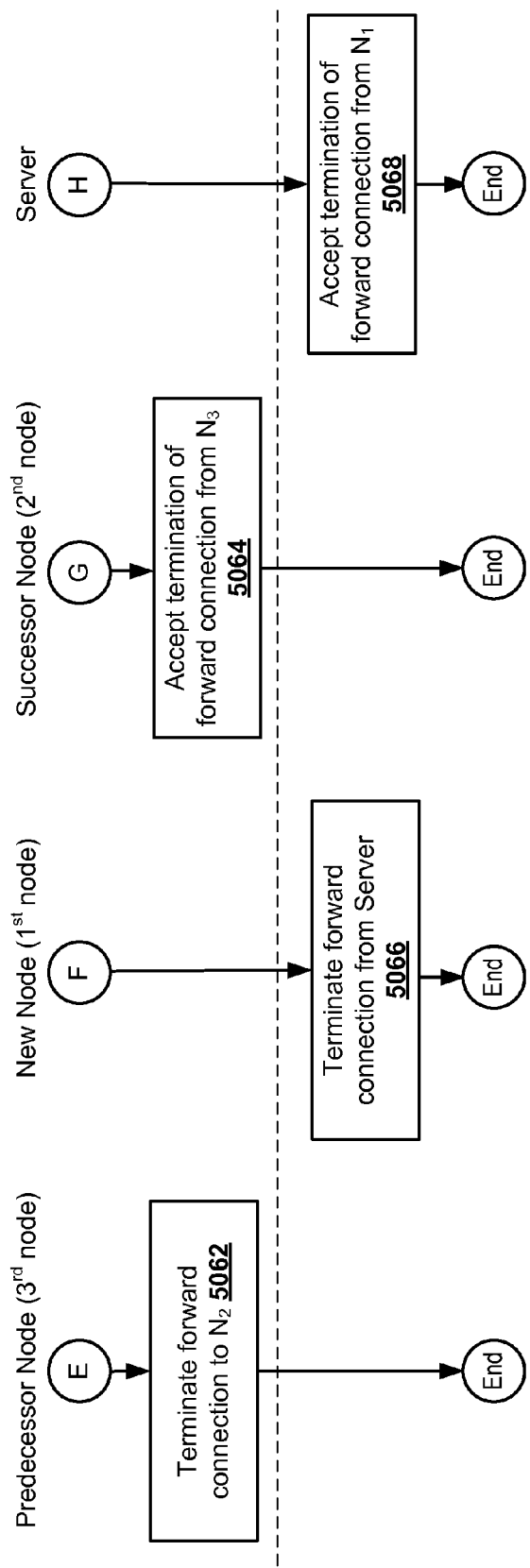
Figure 6A:
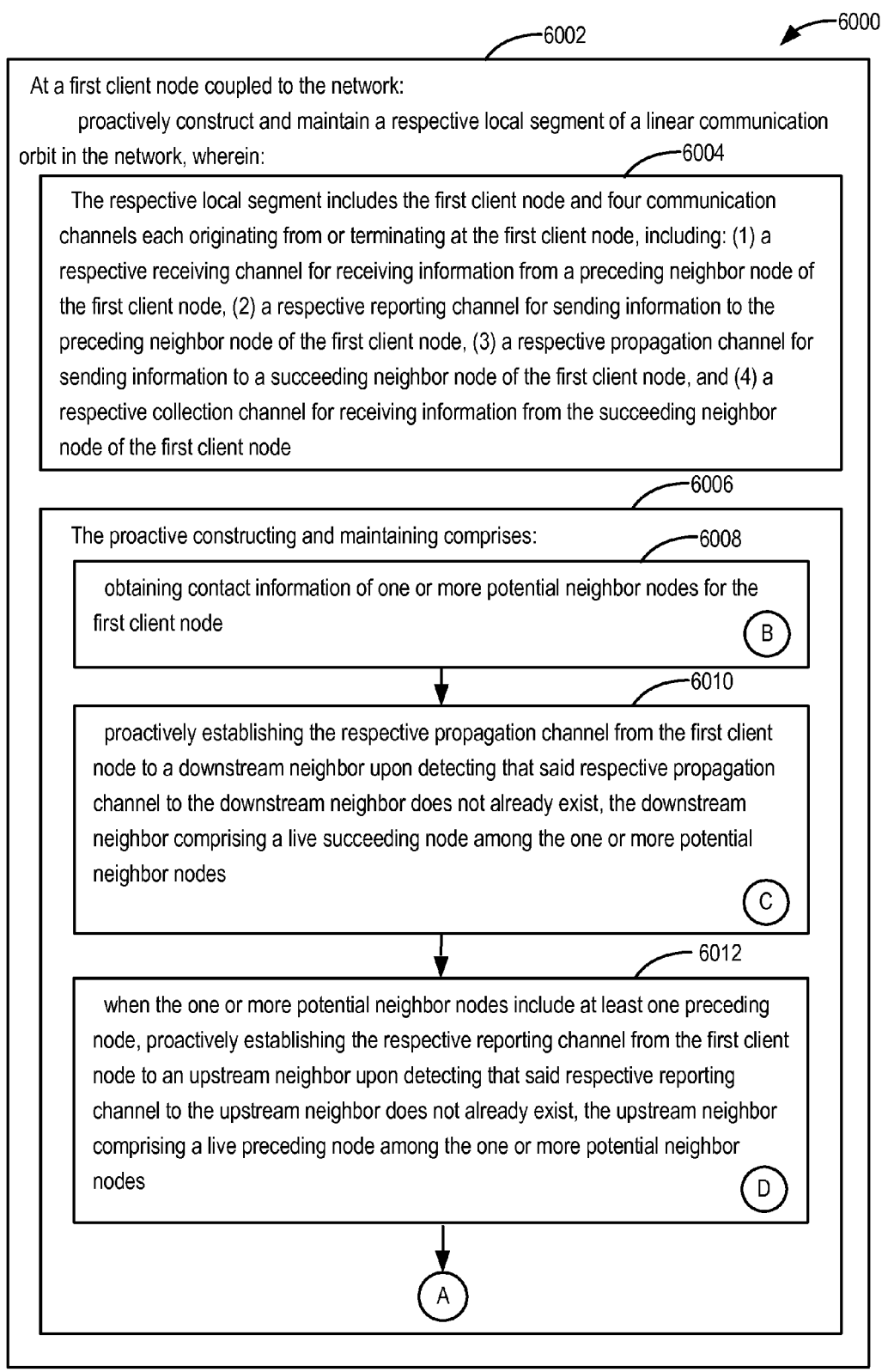
FIG. 6A-6D is a flow diagram illustrating a method performed by an intermediate node or head node of a linear communication orbit in accordance with some embodiments.
Figure 6B:
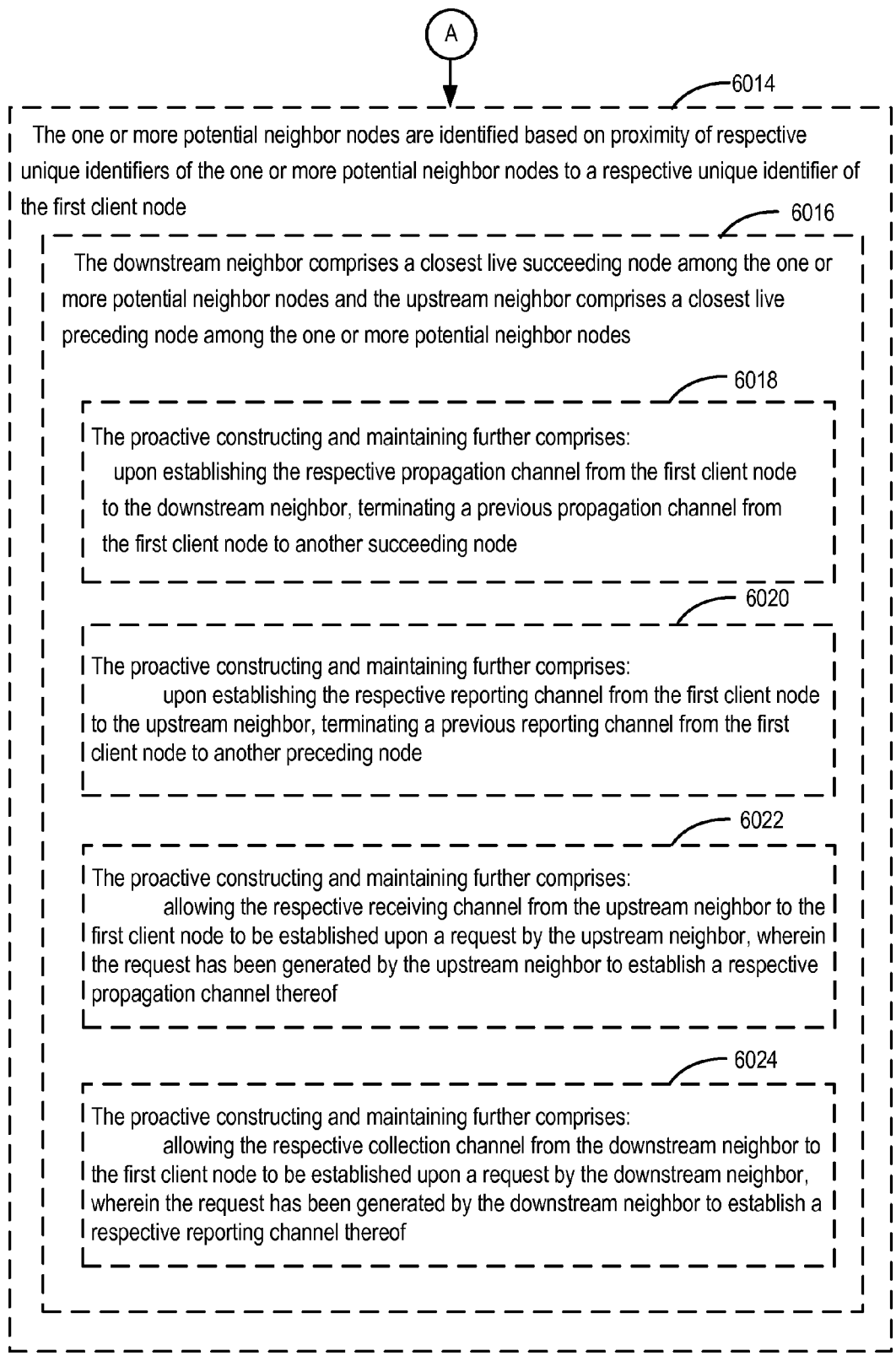
Figure 6C:
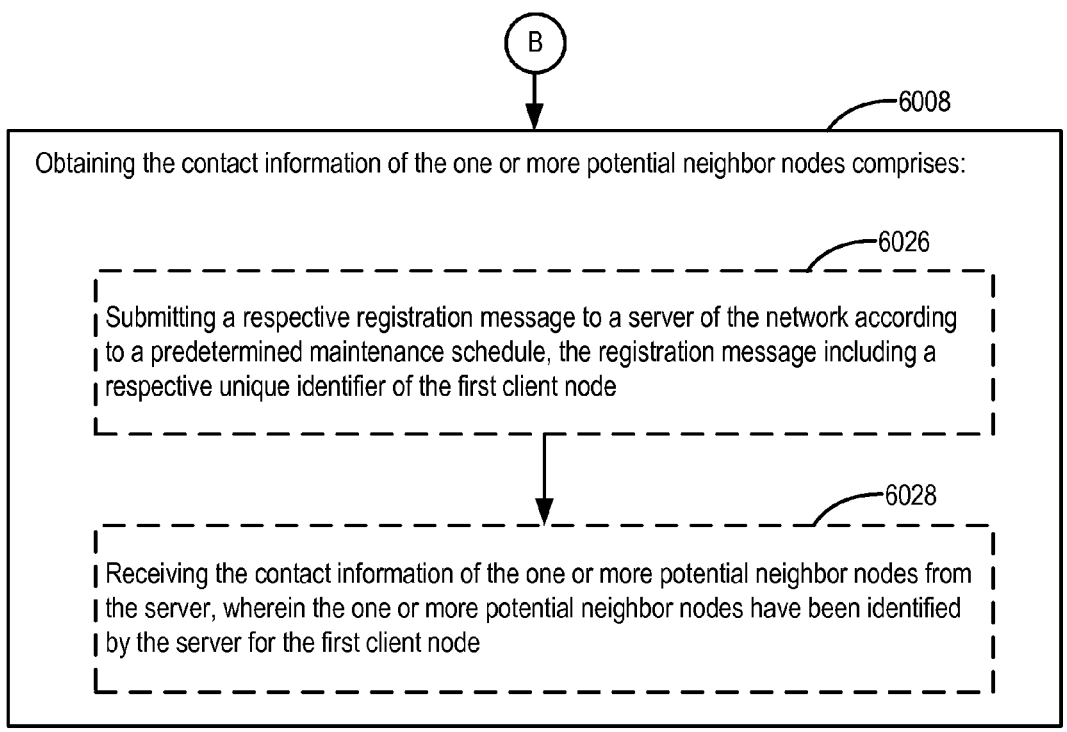
Figure 6C:
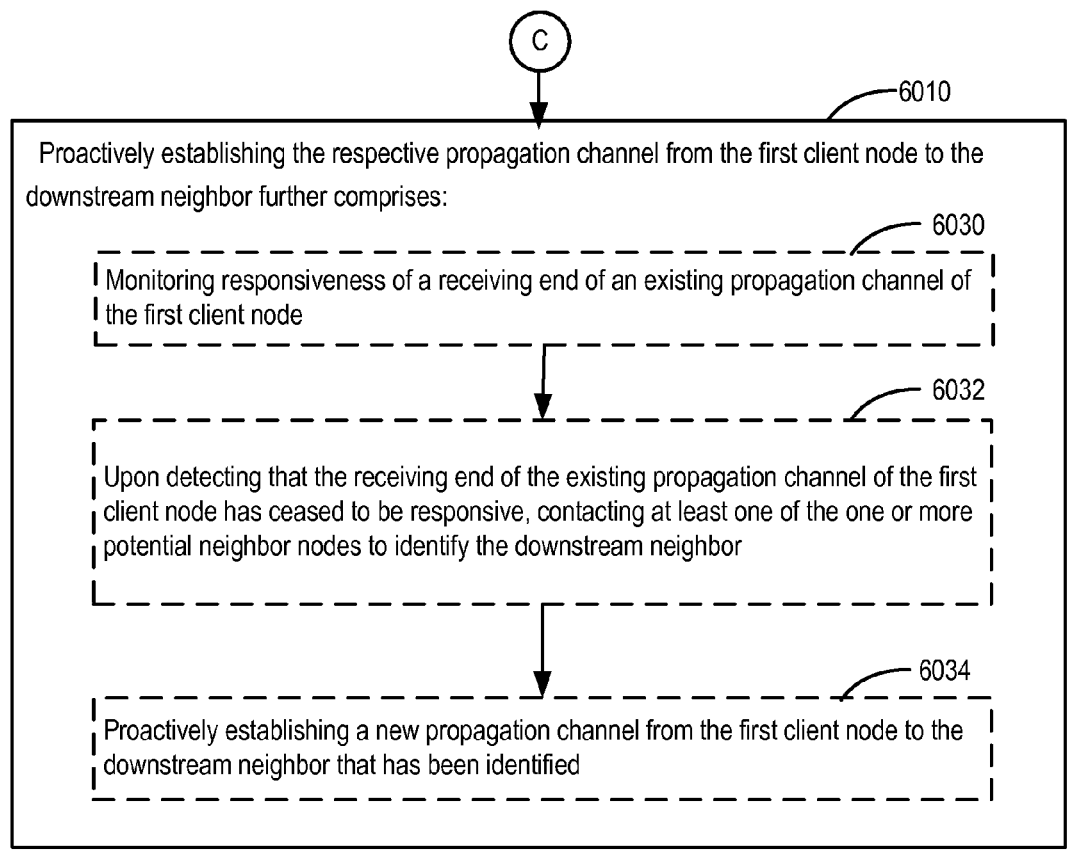
Figure 6D:
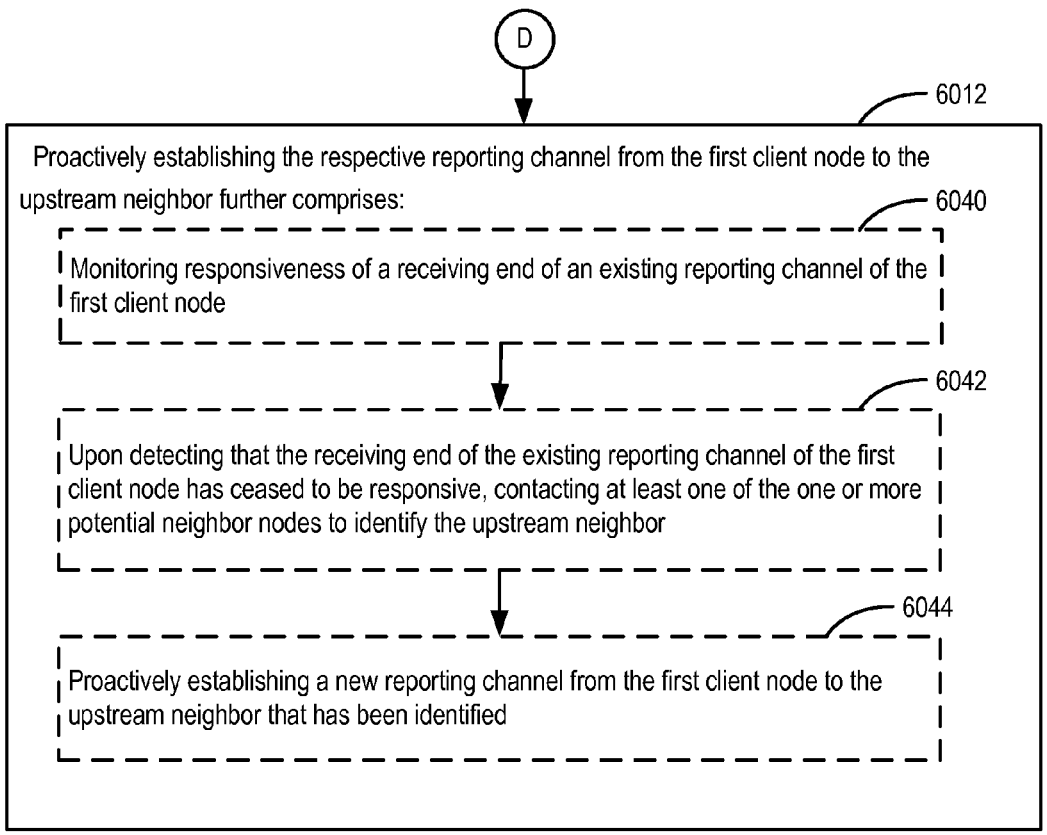

FIGS. 4A-4V illustrate only some exemplary processes for inserting a new node into an existing linear orbit. The rules implemented by the machines can be modified in various embodiments. A general requirement for the rules is that each node in the network only terminates an existing communication channel when it has established another communication channel of the same type. In addition, each node only proactively terminates two types of communication channels, and relies on its neighbors to terminate the other two types of communication channels. This additional requirement ensures that there is symmetry in the actions of the nodes and that the independent actions of neighboring nodes are coordinated in the end to form a complete local segment of the linear communication orbit. In some embodiments, it takes only a few milliseconds to establish the communication channels and insert a new node into the linear communication channel. As a result, there is virtually no downtime of system, security and network management communication during the insertion of a new node into the network.

FIGS. 4W-4Z illustrate a process for self-repair or self-healing of a linear communication orbit (e.g., linear communication orbit 410) when one or more intermediate nodes (e.g., machine 472) ceases to respond to communications from its upstream neighbor (e.g., machine 474) and its downstream neighbor (e.g., machine 476).

In general, when one or more consecutive intermediate nodes of a linear communication orbit exit the managed network (e.g., due to failure or otherwise), a gap is created in the linear communication orbit, and the communications going upstream and downstream the linear communication orbit are blocked at the gap. In some embodiments, each node in the linear communication orbit implements a rule to periodically check whether its current upstream and downstream neighbors are still responsive. In some embodiments, if a node discovers that its current downstream neighbor is no longer responsive, the node tries to establish communication with the next live downstream node to repair the linear communication orbit. Similarly, if a node discovers that its current upstream neighbor is no longer responsive, the node tries to establish communication with the next live upstream node to repair the linear communication orbit. In some embodiments, the repair process proceeds as follows.

As shown in FIG. 4W, machines 474, 472, and 476 form a contiguous segment of linear communication orbit 470 in a managed network. The ordinal positions of machines 474, 472, and 476 in linear communication orbit 470 have been determined based on the sequential order of their respective unique identifiers (e.g., IP addresses) among all the currently known machines in the managed network. According to their respective identifiers, machine 476 is the current downstream neighbor for machine 472, machine 474 is the current upstream neighbor for machine 472. FIG. 4W shows that all machines are live and functional, and there is a pair of active communication channels supporting full duplex communications between each pair of machines. Specifically, forward communication channel 478 and backward communication channel 480 have been established between machine 474 and machine 472, and forward communication channel 482 and backward communication channel 484 have been established between machine 472 and machine 476. In other words, the segment of linear communication orbit 470 is contiguous and functional.

FIG. 4X illustrates that machine 472 has exited the network (e.g., either voluntarily or due to equipment or network failure). As a result, communication channels 478 and 480 between machines 474 and 472 as well as communication channels 482 and 484 between machines 472 and 476 are no longer functional. In some embodiments, each machine (including machines 474 and 476) independently pings its upstream and downstream neighbor nodes periodically to check whether these nodes are still responsive. In some embodiments, machines 474 and 476 continue to ping machine 472 with increasing time intervals, in case machine 472 becomes responsive again after a while.

In some embodiments, after failing to reach its downstream neighbor 472, machine 474 proactively closes forward communication channel 478 and backward communication channel 480 (e.g., reclaim the ports and other resources used for these channels). Similarly, after failing to reach its upstream neighbor 472, machine 476 proactively closes forward communication channel 482 and backward communication channel 484. In some embodiments, machines 474 and 476 do not proactively close any communication channel until they have established a replacement communication channel with a newly discovered neighbor node. In some embodiments, if machine 472 does become responsive again after a while, machines 474 and 476 restore the communication channels that have been proactively terminated.

FIG. 4Y illustrates that, in some embodiments, after machines 474 and 476 independently discover that machine 472 has exited the network, machines 474 and 476 independently contact server 404 to obtain respective lists of potential neighbor nodes, e.g., by submitting respective registration messages to server 404. In some embodiments, machines 474 and 476 only register with server 404 periodically, and if the time for registering with server 404 has not arrived, machines 474 and 476 simply use their respective list of potential neighbors they previously received from server 404.

FIG. 4Z illustrates that machine 474 goes down its respective list of potential neighbors one by one in the downstream direction until a live downstream node is found. In this case, after machine 472 has exited the network, machine 476 becomes the nearest live downstream neighbor for machine 474. Once machine 474 has made contact with machine 476 and confirmed that machine 476 is its new downstream neighbor, machine 474 proceeds to open forward communication channel 478 from machine 474 to machine 476, as shown in FIG. 4Z. Forward communication channel 478 will serve as a new propagation channel for machine 474 and a new receiving channel for machine 476. In some cases, more than one consecutive downstream node of machine 474 may have exited the network without the knowledge of server 404. In such cases, machine 474 may try to contact one or more failed nodes before reaching its closest live downstream node.

Also illustrated in FIG. 4Z, independently of the actions of machine 474, machine 476 goes down its list of potential neighbors one by one in the upstream direction until a closest live upstream node is found. In this case, after machine 472 has exited the network, machine 474 becomes the nearest live upstream node to machine 476. Once machine 476 has made contact with machine 474 and confirmed that machine 474 is its new upstream neighbor, machine 476 proceeds to open backward communication channel 480 from machine 476 to machine 474, as shown in FIG. 4Z. Backward communication channel 480 will serve as a new reporting channel for machine 476 and a new collection channel for machine 474. In some cases, more than one consecutive upstream node of machine 476 may have exited the network without the knowledge of server 404. In such cases, machine 476 may try to contact one or more failed nodes before reaching its closest live upstream node.

As shown in FIG. 4Z, once both machines 474 and 476 have established a new connection to each other, the repair of linear communication orbit 470 is completed. Full-duplex communication upstream and downstream of linear communication orbit 470 is restored.

FIGS. 5A-5D are flow diagrams illustrating exemplary interactions among a new node ($N_1$), two existing nodes ($N_2$ and $N_3$), and a central server of a managed network, when the new node comes into the managed network. According to the respective identifiers of the nodes, $N_1$ is the new upstream neighbor of $N_2$, and the new downstream neighbor of $N_3$. The flow diagram of each machine (i.e., $N_1$, $N_2$, and $N_3$) illustrates independent actions performed by that machine according to a common set of rules implemented by all machines in the network. The common set of rules result in different actions being taken by each machine depending on whether said machine is interacting with an upstream neighbor node versus a downstream neighbor node, and whether said machine is interacting with a previous neighbor node versus a new neighbor node.

In the flow diagrams, a new node ($N_1$) sends (5002) a registration message to a central sever (S) upon entry into the managed network. The registration message includes the new node's own unique identifier. The registration message represents a request for information regarding the registering machine's potential neighbors in the managed network. The server receives (5004) the registration message from the new node ($N_1$). In response to the registration message, the server sends (5006) a list of potential neighbor nodes to the new node ($N_1$).

In response to sending the registration message, the new node receives (5008) the list of potential neighbors from the server. The list provides one or more potential upstream neighbors and one or more potential downstream neighbors that have been identified by the server for the new node. In some embodiments, the server identifies the potential neighbors and sorts them according to respective unique identifiers of all machines currently known to be present in the network and their sequential order relative to the respective identifier of the new node.

In addition to, and independently of providing the registration message and obtaining the list of potential neighbor nodes, the new node also proactively establishes (5010) a forward connection and a backward connection to the server. The server accepts (5012) the forward and backward connection requests from the new node, and the connections are thus established. Using the forward connection, the new node can provide information to the server, and using the backward connection, the new node can receive information from the server. At this point, the new node is joined to the network, but has not been joined to any linear communication orbit. The new node is a singleton at this stage.

After obtaining the list of potential neighbor nodes in both the upstream and the downstream directions, the new node proceeds to search for (5014) its nearest live successor node (i.e., its downstream neighbor). In some embodiments, the new node runs down the list of potential downstream neighbors one by one, until a live downstream node is found. In some embodiments, the list of potential downstream neighbors is sorted according to increasing values of their respective identifiers (e.g., IP addresses). Sometimes, the new node may encounter one or more inactive nodes in the list of potential downstream neighbors before finding the nearest live succeeding node. The nearest live succeeding node (i.e., successor node $N_2$) responds (5016) to the contact from the new node.

Once the new node ($N_1$) has identified its downstream neighbor ($N_2$), the new node proactively establishes (5018) a forward connection to the downstream neighbor ($N_2$). The downstream neighbor ($N_2$) accepts (5020) the forward connection request from the new node ($N_1$), and the forward connection is thus established. The forward connection serves as a new propagation channel for the new node, and a new receiving channel for the downstream neighbor of the new node.

In some embodiments, after the new node ($N_1$) has established the forward connection to its downstream neighbor ($N_2$), the new node ($N_1$) proceeds to search for (5022) its nearest live predecessor node. In some embodiments, the new node starts the search for its nearest live predecessor node independently of whether the new node has already established the forward connection to its downstream neighbor. In some embodiments, the new node runs down the list of potential upstream neighbors one by one, until a live upstream node is found. In some embodiments, the list of potential upstream neighbors is sorted according to decreasing values of their respective identifiers (e.g., IP addresses). Sometimes, the new node may encounter one or more inactive nodes in the list of potential upstream neighbors before finding the upstream neighbor. The nearest live preceding node (i.e., predecessor node $N_3$) responds (5024) to the contact from the new node.

Once the new node has identified its upstream neighbor, the new node proactively establishes (5026) a backward connection to the upstream neighbor (i.e., predecessor node $N_3$). The predecessor node ($N_3$) accepts (5028) the backward connection request from the new node ($N_1$), and the backward connection is thus established. The backward connection serves as a new reporting channel for the new node, and a new collection channel for the upstream neighbor of the new node.

When the new node has established two backward connections (e.g., one to the server and the other to a newly discovered upstream neighbor $N_3$), the new node terminates the old backward connection. In this case, the new node proactively terminates (5030) the old backward connection to the server. The server accepts (5032) the new node's request for termination, and the backward connection between the new node and the server is thus terminated.

At this point, the proactive actions performed by the new node ($N_1$) are temporarily completed.

Independently of the actions of the new node ($N_1$), the successor node ($N_2$) performs the following actions based on the common set of rules implemented by all machines.

Successor node $N_2$ periodically registers (5034) with the server and provides its own identifier to the server in the registration message. The server receives (5036) the registration from the successor node ($N_2$) and sends (5038) a respective list of potential upstream neighbors and potential downstream neighbors for $N_2$ in response to the registration. Successor node ($N_2$) receives (5040) its respective list of potential upstream neighbors and potential downstream neighbors from the server.

Successor node $N_2$ checks whether it is currently connected to its own nearest live downstream node in its list of potential downstream neighbors. If the downstream neighbor for $N_2$ has not changed and there is already a forward connection from $N_2$ to its downstream neighbor, nothing further needs to be done by $N_2$ regarding its own successor node at this time.

Successor node $N_2$ further checks whether it is currently connected to its own nearest live upstream node in the list of potential upstream neighbors. In this scenario, the list of potential upstream neighbors includes the new node $N_1$ and predecessor node $N_3$, with the new node $N_1$ having a closer ordinal position to $N_2$ than $N_3$ does. $N_2$ recognizes that it does not currently have a backward connection to its closest live preceding node (i.e., the new node $N_1$), and therefore $N_2$ proactively establishes (5042) a backward connection to its closest live preceding node (i.e., the new node $N_1$). The new node $N_1$ accepts (5044) the backward connection request from $N_2$, and the backward connection is thus established between $N_2$ and $N_1$. The newly established backward connection serves as a new reporting channel for the $N_2$, and a new collection channel for the new node $N_1$.

Now, successor node $N_2$ has established two backward connections (an existing backward connection to $N_3$ established before $N_1$ entered the network, and a new backward connection to $N_1$). As a result (i.e., in response to successor node $N_2$ determining that is has two established backward connections), successor node $N_2$ proceeds to terminate (5046) the old backward connection to $N_3$. $N_3$ accepts (5048)

the request to terminate the existing backward connection between $N_2$ and $N_3$, and the old backward connection is thus terminated.

At this point, the proactive actions performed by $N_2$ are completed.

Independently of the actions of new node $N_1$ and successor node $N_2$, predecessor node $N_3$ performs the following actions based on the common set of rules implemented by all machines.

Predecessor node $N_3$ periodically registers (5050) with the server and provides its own identifier to the server in the registration message. The server receives (5052) receives the registration from $N_3$ and sends a respective list of potential upstream neighbors and potential downstream neighbors for $N_3$ in response to the registration. Predecessor node $N_3$ receives (5056) the list of potential upstream neighbors and potential downstream neighbors from the server.

Predecessor node $N_3$ checks whether it is currently connected to its nearest live downstream node in its list of potential downstream neighbors. In this scenario, the list of potential downstream neighbors for $N_3$ includes the new node $N_1$ and $N_3$'s previous downstream neighbor $N_2$. New node $N_1$ has a closer ordinal position to $N_3$ than $N_2$ does. Predecessor node $N_3$ recognizes that it does not currently have a forward connection to its closest live succeeding node (i.e., the new node $N_1$), and therefore $N_3$ proactively establishes (5058) a forward communication channel to its closest live succeeding node (i.e., the new node $N_1$). The new node $N_1$ accepts (5060) the forward connection request from $N_3$, and the forward connection is thus established between $N_3$ and $N_1$. The newly established forward connection serves as a new propagation channel for $N_3$, and a new receiving channel for the new node $N_1$.

Now, $N_3$ has established two forward communication channels (an old forward communication channel to its previous downstream neighbor $N_2$ and a new forward communication channel to its new downstream neighbor $N_1$). As a result (i.e., in response to node $N_3$ determining that is has two established forward communication channels), $N_3$ proceeds to terminate (5062) the old forward communication channel to $N_2$. $N_2$ accepts (5064) the request to terminate the existing forward connection between $N_3$ and $N_2$, and the existing forward connection is thus terminated.

$N_3$ further checks whether it is currently connected to the nearest live upstream node in its list of potential upstream neighbors. In this scenario, the upstream neighbor for $N_3$ has not changed, and nothing further needs to be done by $N_3$ regarding its upstream neighbor at this time.

At this point, the proactive actions performed by $N_3$ are completed.

After a forward connection has been established between $N_3$ and the new node $N_1$, (i.e., in response to the new node $N_1$ determining that there are two established forward connections to the new node, or equivalently, two established backward connections from the new node) the new node proceeds to terminate (5066) the older of the two forward connections to new node $N_1$, i.e., it proceeds to terminate the forward connection between the server and the new node $N_1$. It is noted that from the perspective of the new node, the new node determines that it has two backward connections (also called backward communication channels), and terminates the older of the two backward connections. The server accepts (5068) the request to terminate the forward connection received from the new node $N_1$, and insertion of the new node $N_1$ into the linear communication orbit is thus completed.

At this point, all proactive actions performed by the new node $N_1$ have been completed.

It is clear from the flow diagrams in FIGS. 5A-5D that the actions of $N_2$ to establish the backward connection to $N_1$ and the actions of $N_1$ to establish the backward connection to $N_3$ are independent actions resulted from the same set of rules implemented by $N_2$ and $N_1$, respectively. In addition, the actions of $N_3$ to establish the forward connection to $N_1$ and the actions of $N_1$ to establish the forward connection to $N_2$ are independent actions resulted from the same set of rules implemented by $N_3$ and $N_1$. In fact, each machine implements the same set of rules to proactively establish a forward connection to its closest live succeeding node, and a backward connection to its closest live preceding node when said closest live nodes are first discovered. In addition, each machine also implements the same set of rules to proactively terminate an old forward connection (forward communication channel) to a previous downstream neighbor (or the server), when a new forward connection has been established between said machine to its newly discovered downstream neighbor. In addition, each machine also implements the same set of rules to proactively terminate an old backward connection (backward communication channel) to a previous upstream neighbor (or the server), when a new backward connection has been established between said machine and its newly discovered upstream neighbor.

It is also clear from the flow diagrams in FIG. 5A-5D that the server's duties are light-weight. Basically, the server accepts connection requests of new nodes, each new node has a forward connection and a backward connection established to the server when the new node first joins the network. The server also keeps a record of all the nodes that have registered with the server. If a node has not registered with the server for a sufficient amount of time, the server removes that node from the list of known live nodes in the network. The server sorts the list of known live nodes according to respective unique identifiers of the nodes, such that for each given unique identifier, the server can identify a list of one or more potential neighbor nodes in the upstream and the downstream direction (e.g., decreasing value and increasing value of the identifiers), respectively. The server also accepts requests for opening new forward and backward connections and terminating existing forward and backward connections from nodes (e.g., head nodes, tail nodes, new nodes, and singleton nodes) in the network. In some embodiments, the server also maintains an up-to-date list of head nodes so that when a new request is issued (for system and security management operations, etc.) it instantaneously sends a signal to all the head nodes in the network to register, so they can download and propagate the request within their respective segments of the network. As a result, head nodes do not wait for their next registration with the server, but, optionally, download and propagate the request immediately. Furthermore, because in a typical network the node-to-node communications channels are wide open, overall operations latencies of this system are measured in seconds, not hours or days.

FIGS. 6A-6D are flow diagrams of an exemplary process 6000 for creating, maintaining, and repairing a local segment of a linear communication orbit in accordance with some embodiments. The process 6000 is described from the perspective of an intermediate node or a head node (referred to as the "first client node"), either to be newly inserted or already existing in the linear communication orbit.

In the process 6000, at a first client node coupled to a network: a respective local segment of a linear communication orbit in the network is proactively constructed and maintained (6002). The respective local segment includes (6004) the first client node and four communication channels each originating or terminating at the first client node. The four communication channels include: (1) a respective receiving channel for receiving information from a preceding neighbor node of the first client node, (2) a respective reporting channel for sending information to the preceding neighbor node of the first client node, (3) a respective propagation channel for sending information to a succeeding neighbor node of the first client node, and (4) a respective collection channel for receiving information from the succeeding neighbor node of the first client node.

In addition, in some embodiments, the proactive constructing and maintaining includes (6006) at least the following: (1) obtaining (6008) contact information of one or more potential neighbor nodes for the first client node; (2) proactively establishing (6010) the respective propagation communication channel from the first client node to a downstream neighbor upon detecting that said respective propagation channel to the downstream neighbor does not already exist, the downstream neighbor comprising a live succeeding node among the one or more potential neighbor nodes; and (3) when the one or more potential neighbor nodes include at least one preceding node, proactively establishing (6012) the respective reporting channel from the first client node to an upstream neighbor upon detecting that said respective reporting channel to the upstream neighbor does not already exist, the upstream neighbor comprising a live preceding node among the one or more potential neighbor nodes.

In some embodiments, the one or more potential neighbor nodes are identified (6014) based on proximity of respective unique identifiers of the one or more potential neighbor nodes to a respective unique identifier of the first client node.

In some embodiments, the downstream neighbor node is (6016) a closest live succeeding node among the one or more potential neighbor nodes and the upstream neighbor comprises a closest live preceding node among the one or more potential neighbor nodes.

In some embodiments, the proactive constructing and maintaining further includes: upon establishing the respective propagation channel from the first client node to the downstream neighbor, terminating (6018) a previously established propagation channel (if any) from the first client node to another succeeding node.

In some embodiments, the proactive constructing and maintaining further includes: upon establishing the respective reporting channel from the first client node to the upstream neighbor, terminating (6020) a previously established reporting channel (if any) from the first client node to another preceding node.

In some embodiments, the proactive constructing and maintaining further includes: allowing (6022) the respective receiving channel from the upstream neighbor to the first client node to be established upon a request by the upstream neighbor, wherein the request has been generated by the upstream neighbor to establish a respective propagation channel thereof.

In some embodiments, the proactive constructing and maintaining further includes: allowing (6024) the respective collection channel from the downstream neighbor to the first client node to be established upon a request by the downstream neighbor, wherein the request has been generated by the downstream neighbor to establish a respective reporting channel thereof.

In some implementations, the first client node is a new node to be inserted into the linear communication orbit. In some implementations, the first client node is an existing intermediate node in the linear communication orbit. In some implementations, the first client node is a new head node to be inserted into the linear communication orbit. When the first client node is a new head node to be inserted into the linear communication orbit, its upstream neighbor is the server, and its downstream neighbor is the old head node of the linear communication orbit. In some embodiments, the first client node is an existing head node of the linear communication orbit. When the first client node is an existing head node of the linear communication orbit, its upstream neighbor is the server. In some embodiments, the first client node is an existing tail node of the linear communication orbit. When the first client node is the existing tail node of the linear communication orbit, its downstream neighbor is the server.

In some embodiments, the actions are performed to incorporate a new node into the linear communication orbit. In some embodiments, the actions are performed to repair a gap formed in the linear communication orbit when an existing node of the linear communication orbit has exited the network.

In some embodiments, obtaining (6008) the contact information of the one or more potential neighbor nodes includes: submitting (6026) a respective registration message to a server of the network according to a predetermined maintenance schedule (e.g., periodically), the registration message including a respective unique identifier of the first client node; and receiving (6028) the contact information of the one or more potential neighbor nodes from the server, wherein the one or more potential neighbor nodes have been identified by the server for the first client node.

In some embodiments, proactively establishing (6010) the respective propagation channel from the first client node to the downstream neighbor further includes: monitoring (6030) responsiveness of a receiving end of an existing propagation channel of the first client node; upon detecting that the receiving end of the existing propagation channel of the first client node has ceased to be responsive, contacting (6032) at least one of the one or more potential neighbor nodes to identify the downstream neighbor; and proactively establishing (6034) a new propagation channel from the first client node to the downstream neighbor that has been identified.

In some embodiments, proactively establishing (6012) the respective reporting channel from the first client node to the upstream neighbor further includes: monitoring (6040) responsiveness of a receiving end of an existing reporting channel of the first client node; upon detecting that the receiving end of the existing reporting channel of the first client node has ceased to be responsive, contacting (6042) at least one of the one or more potential neighbor nodes to identify the upstream neighbor; and proactively establishing (6044) a new propagation channel from the first client node to the upstream neighbor that has been identified.

Figure 7A:
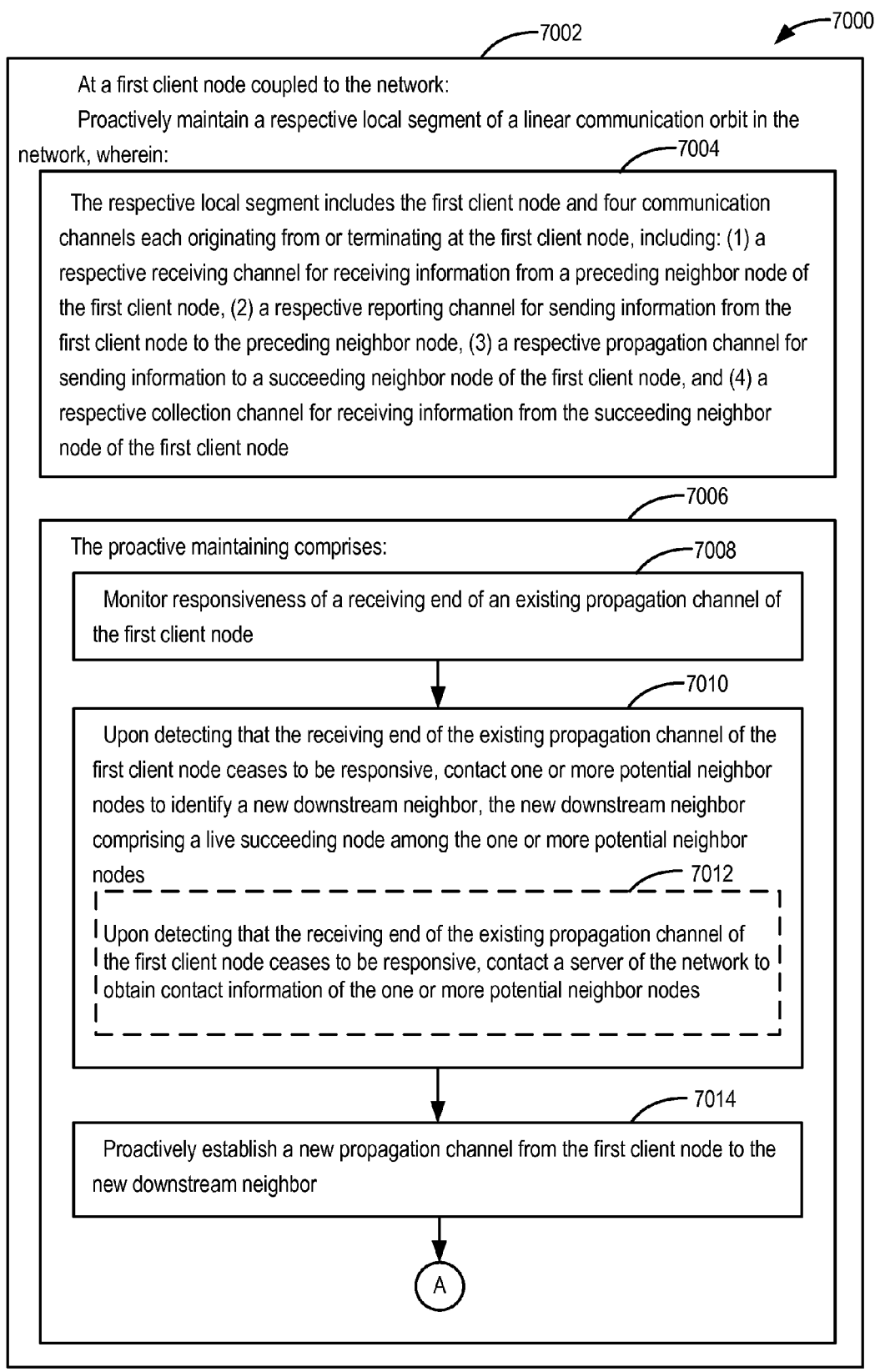
FIG. 7A-7C is a flow diagram illustrating a method performed by an existing node of a linear communication orbit in accordance with some embodiments.
Figure 7B:
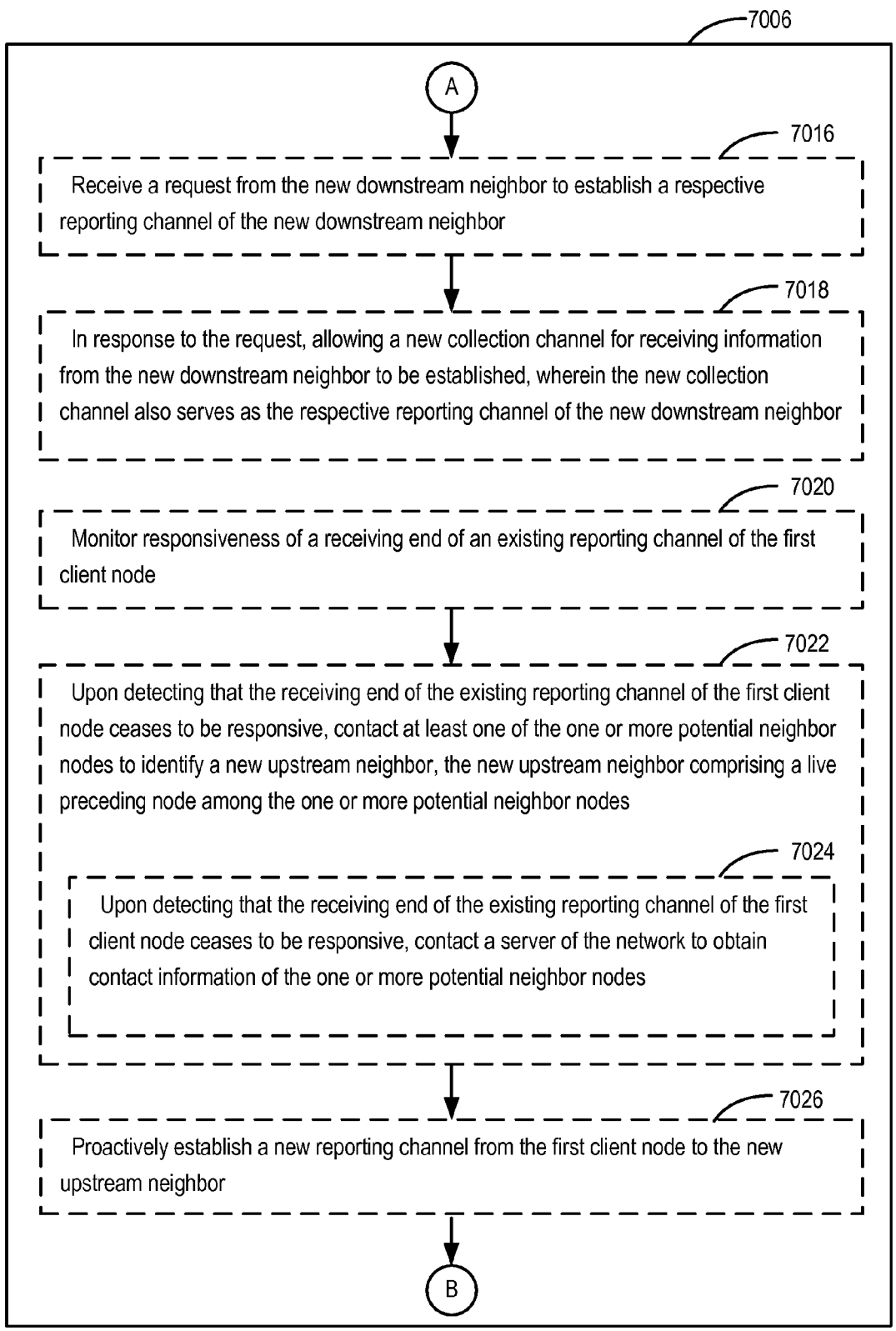
Figure 7C:
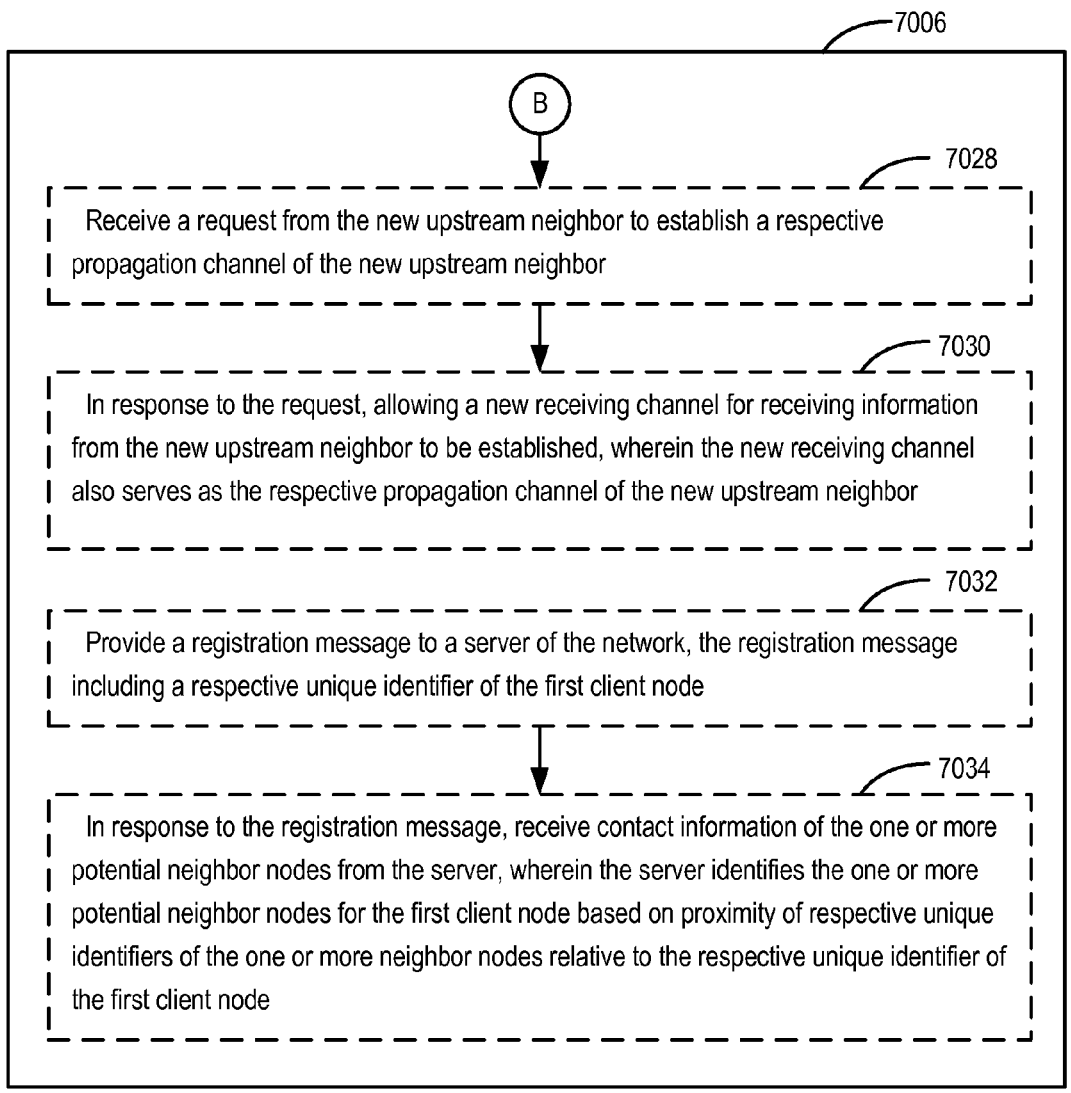

FIGS. 7A-7C are flow diagrams of an exemplary process 7000 for maintaining and repairing a local segment of a linear communication orbit in accordance with some embodiments. The process 7000 is described from the perspective of an existing intermediate node or an existing head node (referred to as the "first client node") in the linear communication orbit.

In the process 7000, at the first client node, a respective local segment of a linear communication orbit in the network is proactively maintained (7002). The respective local segment includes (7004) the first client node and four communication channels each originating from or terminating at the first client node, including: (1) a respective receiving channel for receiving information from a preceding neighbor node of the first client node, (2) a respective reporting channel for sending information from the first client node to the preceding neighbor node, (3) a respective propagation channel for sending information to a succeeding neighbor node of the first client node, and (4) a respective collection channel for receiving information from the succeeding neighbor node of the first client node. The proactive maintaining includes (7006) at least actions including: monitoring (7008) responsiveness of a receiving end of an existing propagation channel of the first client node; upon detecting that the receiving end of the existing propagation channel of the first client node ceases to be responsive, contacting (7010) one or more potential neighbor nodes to identify a new downstream neighbor, the new downstream neighbor including a live succeeding node (e.g., a closest live succeeding node) among the one or more potential neighbor nodes; and proactively establishing (7014) a new propagation channel from the first client node to the new downstream neighbor. In some embodiments, proactive monitoring and maintaining of the propagation channel is performed by both an existing intermediate node and the existing head node of the linear communication orbit.

In some embodiments, upon detecting that the receiving end of the existing propagation channel of the first client node ceases to be responsive, the first client node contacts (7012) a server of the network to obtain contact information of the one or more potential neighbor nodes.

In some embodiments, the proactive maintaining further includes (7006): receiving (7016) a request from the new downstream neighbor to establish a respective reporting channel of the new downstream neighbor; and in response to the request, allowing (7018) a new collection channel for receiving information from the new downstream neighbor to be established, where the new collection channel also serves as the respective reporting channel of the new downstream neighbor.

In some embodiments, the proactive maintaining further includes (7006): monitoring (7020) responsiveness of a receiving end of an existing reporting channel of the first client node; upon detecting that the receiving end of the existing reporting channel of the first client node ceases to be responsive, contacting (7022) at least one of the one or more potential neighbor nodes to identify a new upstream neighbor, the new upstream neighbor including a live preceding node (e.g., a closest live preceding node) among the one or more potential neighbor nodes; and proactively establishing (7028) a new reporting channel from the first client node to the new upstream neighbor. In some embodiments, monitoring and maintaining the reporting channel is only performed by an existing intermediate node of the linear communication orbit, and not by the existing head node of the linear communication orbit.

In some embodiments, upon detecting that the receiving end of the existing reporting channel of the first client node ceases to be responsive, the first client node contacts (7024) a server of the network to obtain contact information of the one or more potential neighbor nodes.

In some embodiments, the proactive maintaining further includes (7006): receiving (7028) a request from the new upstream neighbor to establish a respective propagation channel of the new upstream neighbor; and in response to the request, allowing (7030) a new receiving channel for receiving information from the new upstream neighbor to be established, where the new receiving channel also serves as the respective propagation channel of the new upstream neighbor.

In some embodiments, the first client node provides (7032) a registration message to a server of the network, the registration message including a respective unique identifier of the first client node; and in response to the registration message, the first client node receives (7034) contact information of the one or more potential neighbor nodes from the server. In some embodiments, the server identifies the one or more potential neighbor nodes for the first client node based on proximity of respective unique identifiers of the one or more neighbor nodes relative to the respective unique identifier of the first client node.

The exemplary process 7000 is also illustrated in FIGS. 4W-4Z. For example, in some embodiments, the first client node behaves similarly to node 474 when the first client node is the upstream neighbor to another node. The first client node behaves similarly to node 476 when the first client is a downstream neighbor to another node.

Figure 8A:
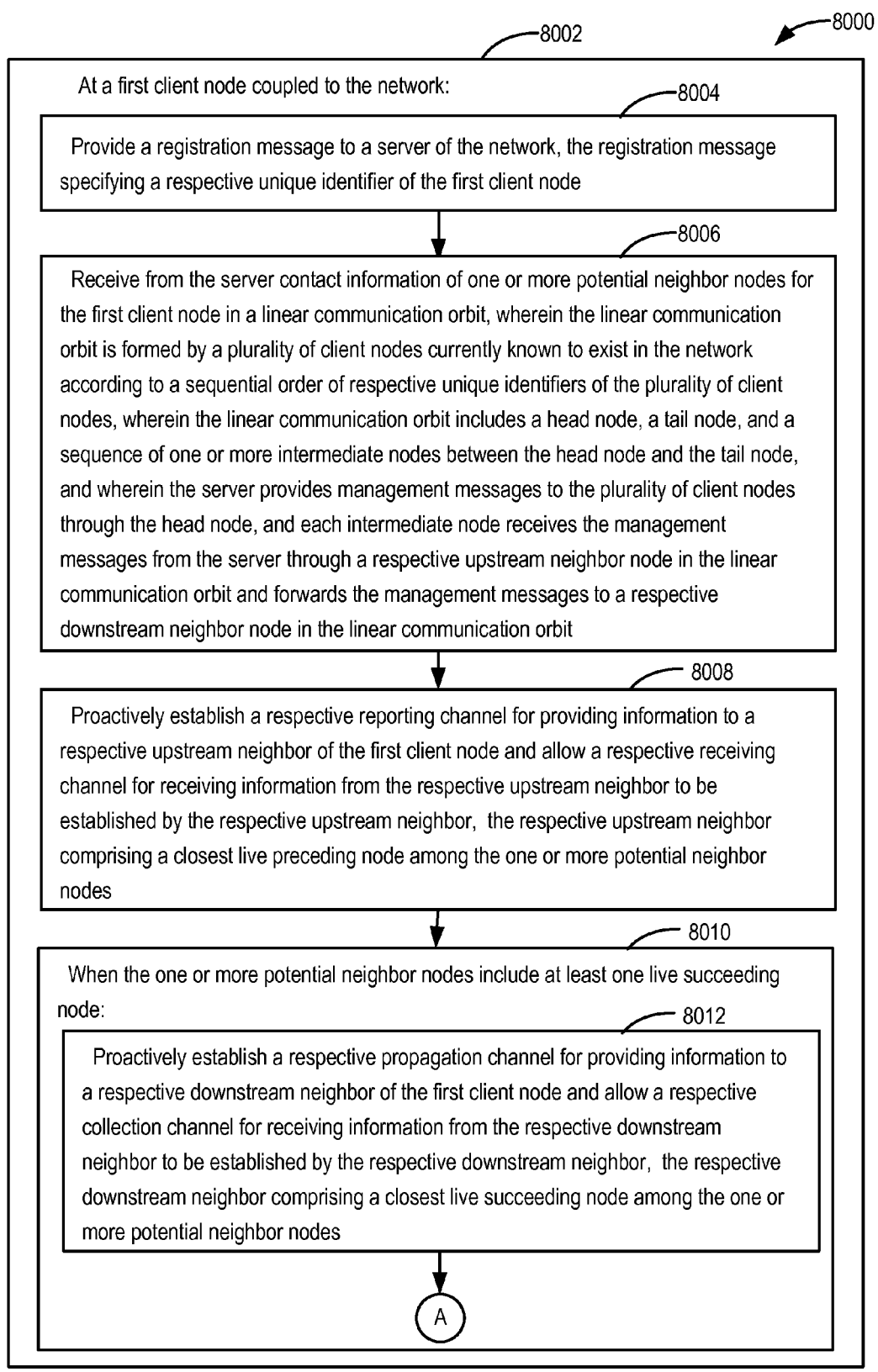
FIG. 8A-8C is a flow diagram illustrating a method performed by a new intermediate node or a new tail node of a linear communication orbit in accordance with some embodiments.
Figure 8B:
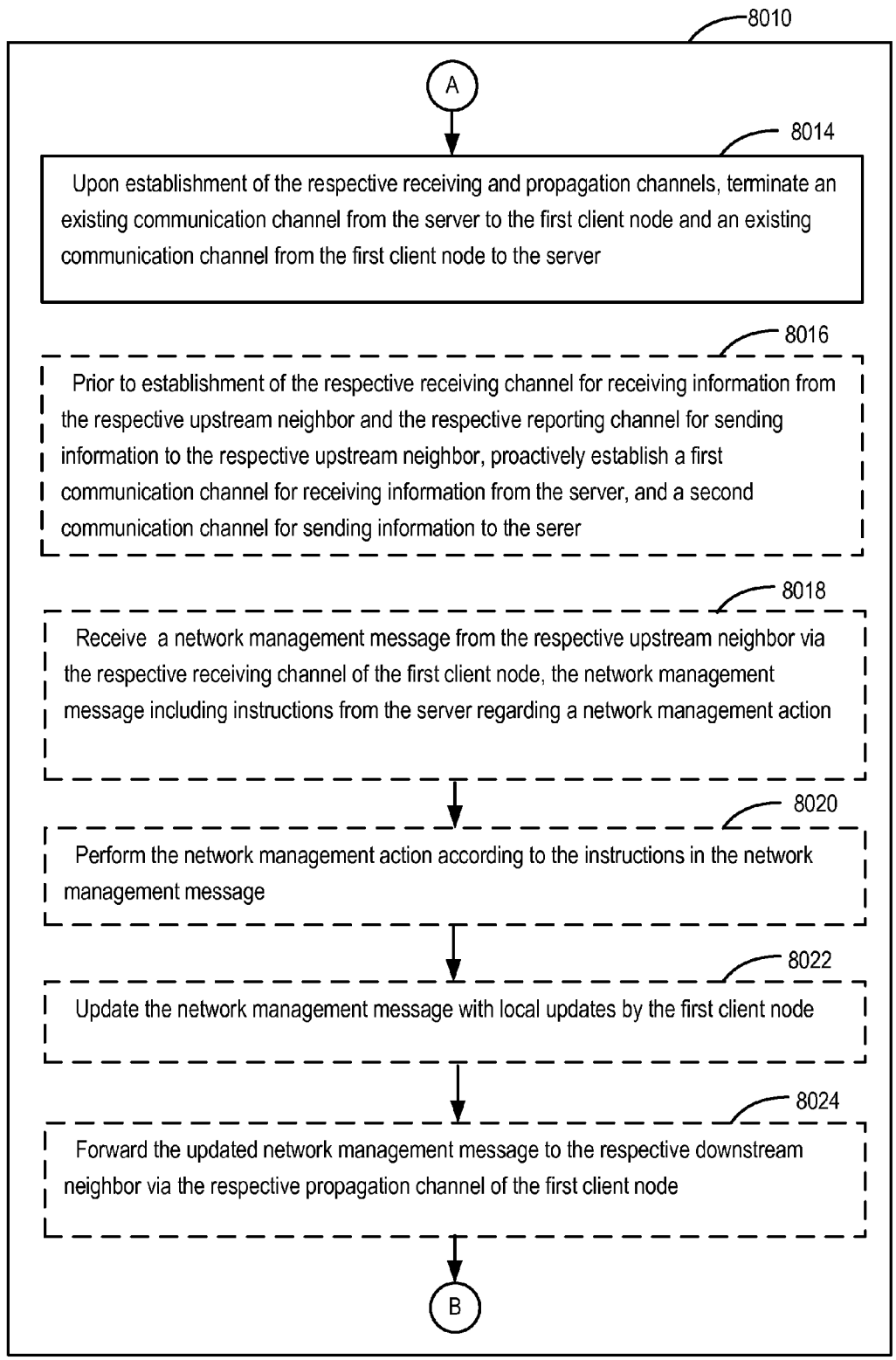
Figure 8C:
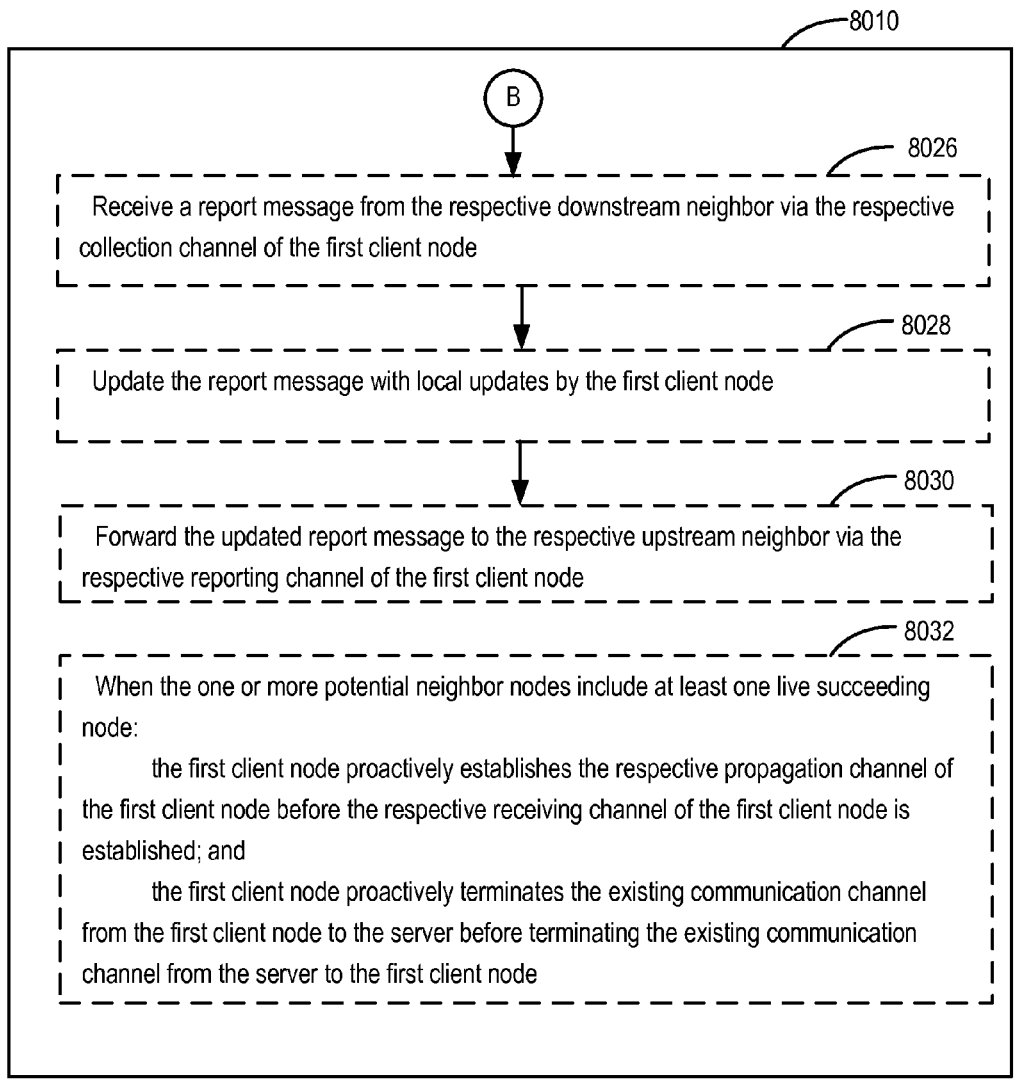

FIGS. 8A-8C are flow diagrams of an exemplary process 8000 for inserting a new intermediate node or a new tail node into an existing linear communication orbit in accordance with some embodiments. The process 8000 is described from the perspective of the new intermediate node or tail node (referred to as the "first client node") in the linear communication orbit.

In the process 8000, at a first client node to be coupled to the network, the following actions are performed (8002) by the first client node. A registration message is provided (8004) to a server of the network, the registration message specifying a respective unique identifier of the first client node. The first client node receives (8006) from the server contact information of one or more potential neighbor nodes for the first client node in a linear communication orbit. The linear communication orbit is formed by a plurality of client nodes currently known to exist in the network according to a sequential order of respective unique identifiers of the plurality of client nodes. The linear communication orbit includes a head node, a tail node, and a sequence of one or more intermediate nodes between the head node and the tail node. In some embodiments, the server provides management messages to the plurality of client nodes through the head node, and each intermediate node receives the management messages from the server through a respective upstream neighbor node in the linear communication orbit and forwards the management messages to a respective downstream neighbor node in the linear communication orbit.

The first client node proactively establishes (8008) a respective reporting channel for providing information to a respective upstream neighbor of the first client node and allows a respective receiving channel for receiving information from the respective upstream neighbor to be established by the respective upstream neighbor. In some embodiments, the respective upstream neighbor includes a closest live preceding node among the one or more potential neighbor nodes. In some embodiments, the first client node is a new intermediate node, and the respective upstream neighbor is an existing head node, an existing intermediate node, or an existing tail node of the linear communication orbit. In some embodiments, the first client node is a new tail node, and the respective upstream neighbor is an existing intermediate node or an existing tail node of the linear communication orbit.

In some embodiments, when the one or more potential neighbor nodes include (8010) at least one live succeeding node (e.g., when the first client node is to become a new intermediate node of the linear communication orbit): the first client node proactively establishes (8012) a respective propagation channel for providing information to a respective downstream neighbor of the first client node and allows establishes a respective collection channel for receiving information from the respective downstream neighbor to be established by the respective downstream neighbor. In some embodiments, the respective downstream neighbor includes a closest live succeeding node among the one or more potential neighbor nodes. In addition, upon establishment the respective receiving and propagation channels, the first client node terminates (8014) an existing communication channel from the server to the first client node and an existing communication channel from the first client node to the server. In some embodiments, the first client node only terminates the existing communication channel from the server to the first client node when the first client node is a new intermediate node in the linear communication orbit.

In some embodiments, prior to establishment of the respective receiving channel for receiving information from the respective upstream neighbor and the respective reporting channel for sending information to the respective upstream neighbor, the first client node proactively establishes (8016) a first communication channel for receiving information from the server, and a second communication channel for sending information to the serer. For example, when the first client first joins the network, it is a singleton in the linear communication orbit.

In some embodiments, the first client node receives (8018) a network management message from the respective upstream neighbor via the respective receiving channel of the first client node, the network management message including instructions from the server regarding a network management action. The first client node performs (8020) the network management action according to the instructions in the network management message; updates (8022) the network management message with local updates by the first client node; and forwards (8024) the updated network management message to the respective downstream neighbor via the respective propagation channel of the first client node. In some embodiments, when the first client node is the new tail node of the linear communication orbit, the first client node forwards the updated network management message to the server (a pseudo-downstream neighbor of the first client node).

In some embodiments, the first client node receives (8026) a report message from the respective downstream neighbor via the respective collection channel of the first client node; updates (8028) the report message with local updates by the first client node; and forwards (8030) the updated report message to the respective upstream neighbor via the respective reporting channel of the first client node.

In some embodiments, when the one or more potential neighbor nodes include at least one live succeeding node (e.g., when the first client node is a new intermediate node rather than a new tail node of the linear communication orbit): the first client node proactively establishes (8032) the respective propagation channel of the first client node before the respective receiving channel of the first client node is established, and proactively terminates the existing communication channel from the first client node to the server before terminating the existing communication channel from the server to the first client node.

The example process 8000 is also illustrated in FIGS. 4A-4D in which a new node first joins the network as a singleton and establishes a pair of communication channels with the server, FIGS. 4K-4P in which the new node becomes a new tail node of an existing linear communication orbit, and FIGS. 4Q-4V in which the new node becomes a new intermediate node of an existing linear communication orbit.

Figure 9A:
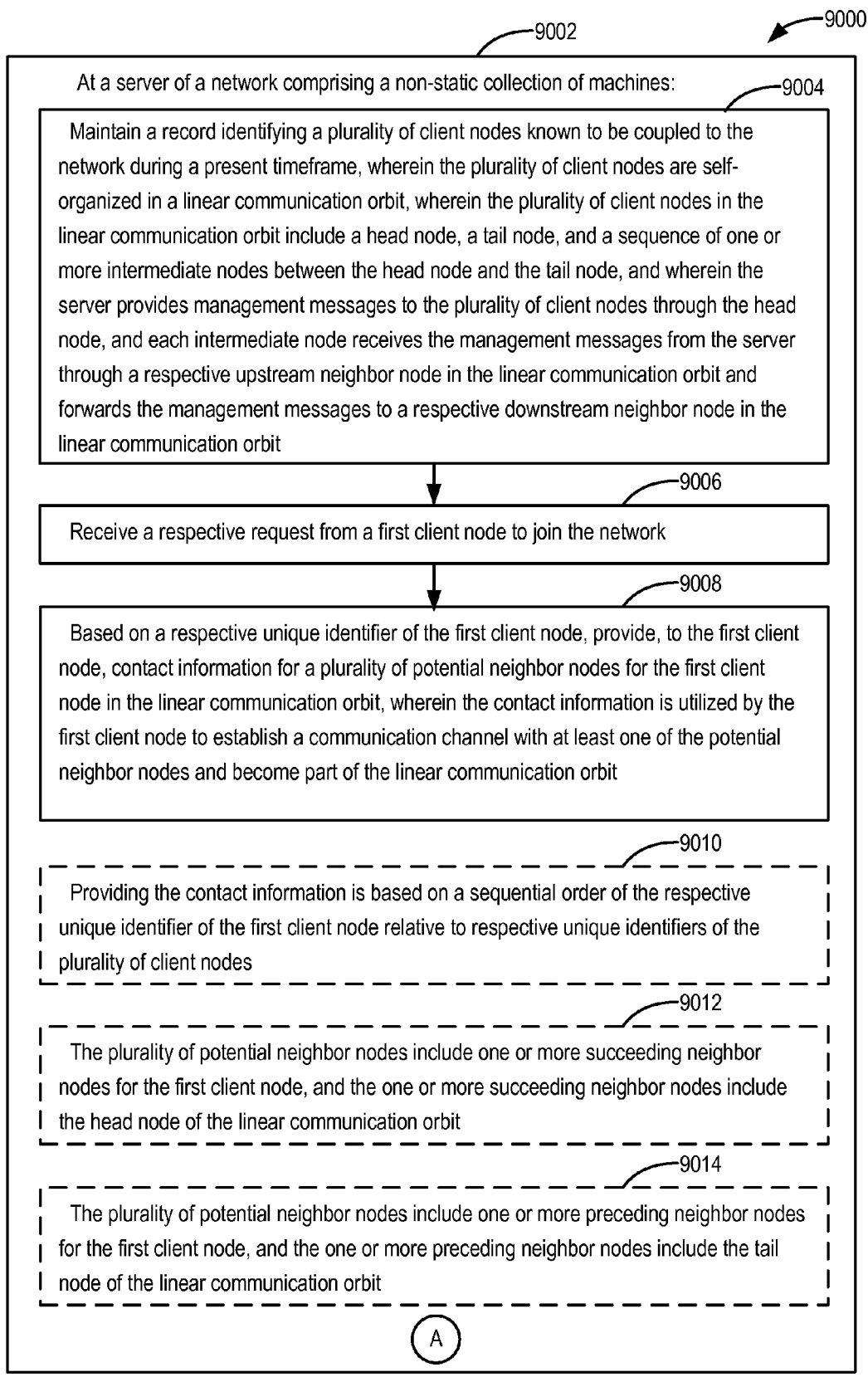
FIG. 9A-9C is a flow diagram illustrating a method performed by a server of a network of machines self-organized in a linear communication orbit in accordance with some embodiments.
Figure 9B:
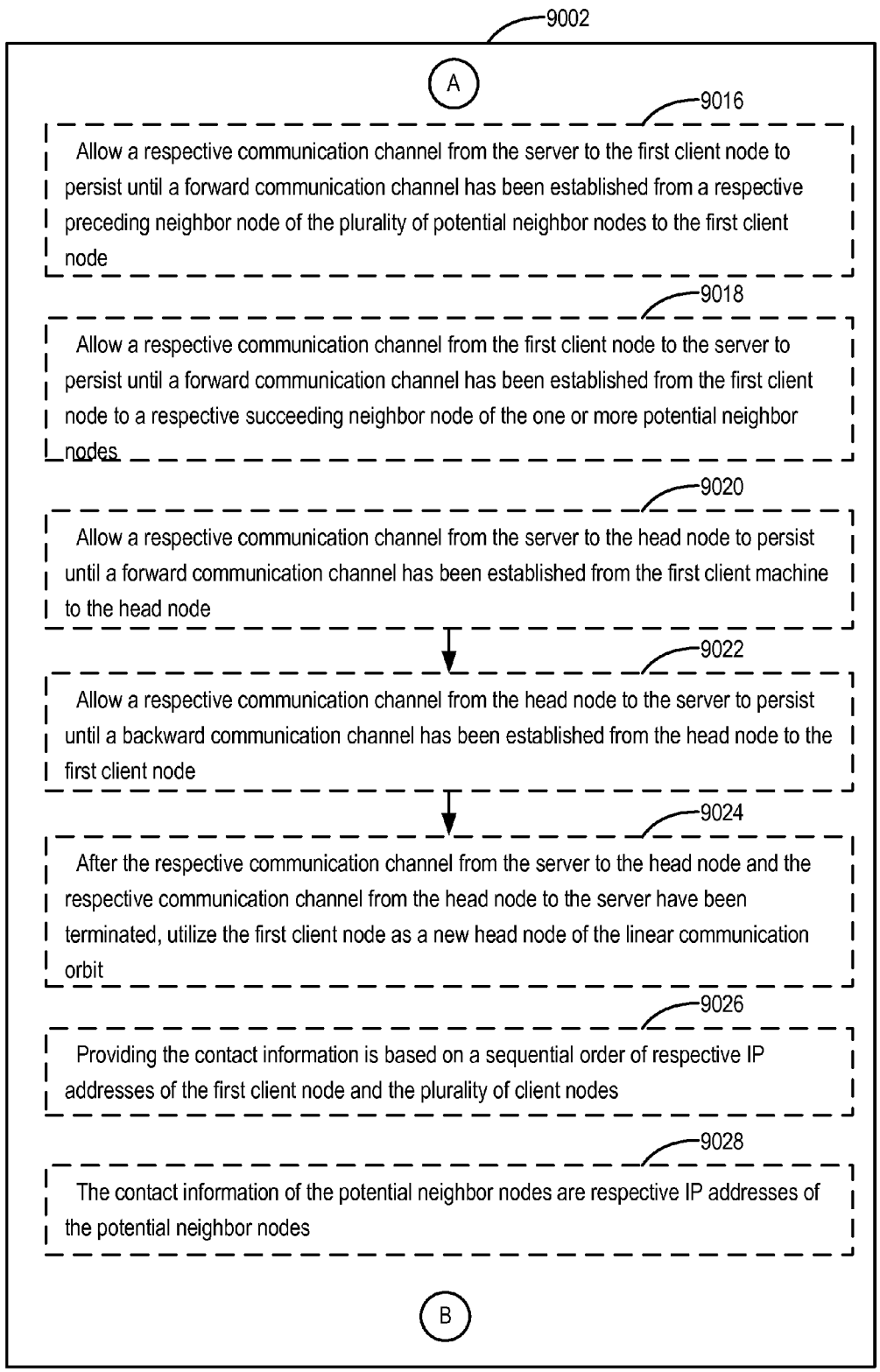
Figure 9C:
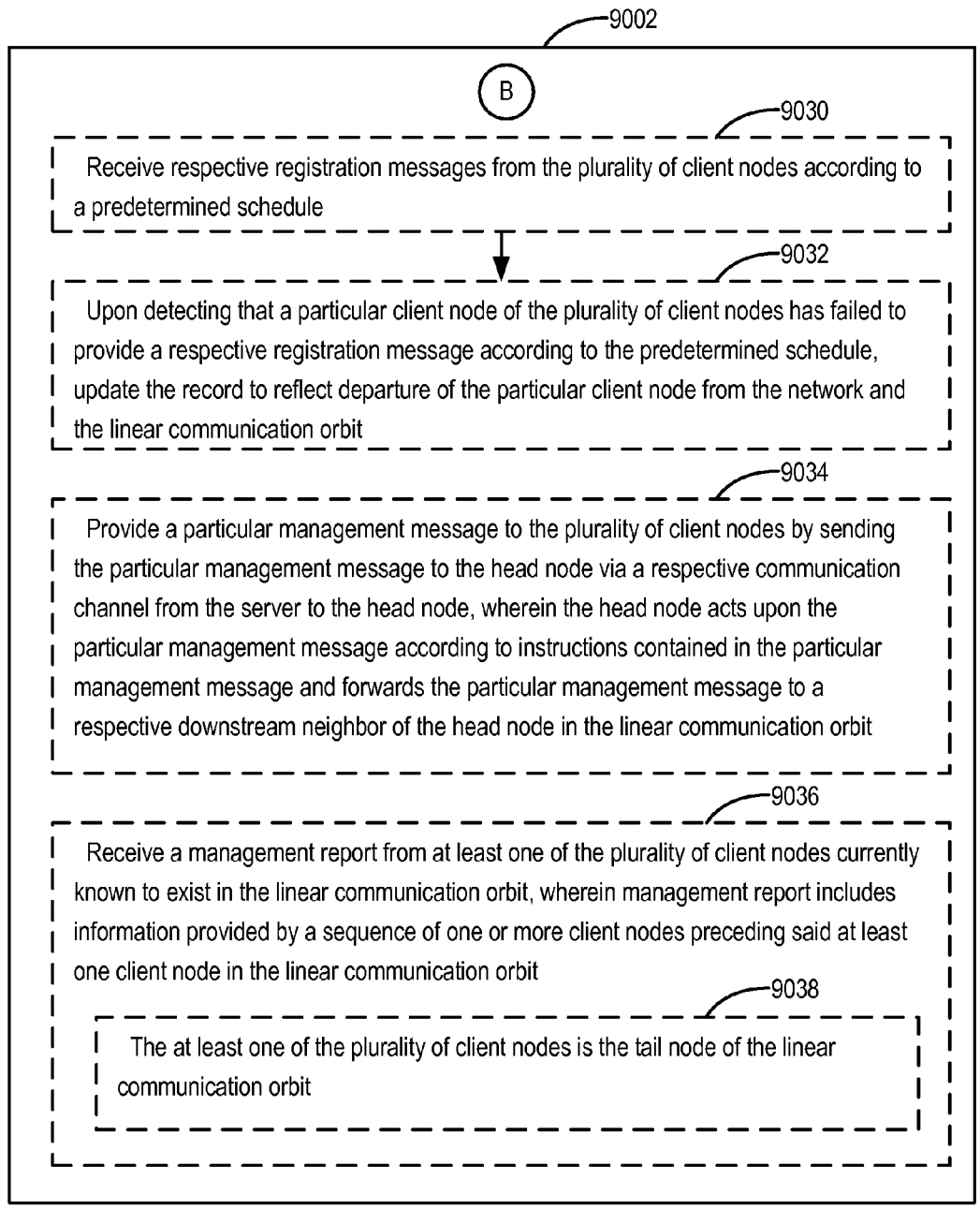

FIGS. 9A-9C are flow diagrams of an exemplary process 9000 for maintaining integrity of a linear communication orbit in a network. The process 9000 is described from the perspective of a server of the network.

In the process 9000, at a server of a network including a non-static collection of machines, the server performs (9002) actions including: maintaining (9004) a record identifying a plurality of client nodes known to be coupled to the network during a present timeframe. In some embodiments, the plurality of client nodes are self-organized in a linear communication orbit, and the plurality of client nodes in the linear communication orbit include a head node, a tail node, and a sequence of one or more intermediate nodes between the head node and the tail node. In some embodiments, the server provides management messages to the plurality of client nodes through the head node. In some embodiments, each intermediate node receives the management messages from the server through a respective upstream neighbor node in the linear communication orbit and forwards the management messages to a respective downstream neighbor node in the linear communication orbit.

The server receives (9006) a respective request from a first client node to join the network. Based on a respective unique identifier of the first client node, the server provides (9008) to the first client node contact information for a plurality of potential neighbor nodes for the first client node in the linear communication orbit, where the contact information is utilized by the first client node to establish a communication channel with at least one of the potential neighbor nodes and become part of the linear communication orbit.

In some embodiments, providing the contact information is based (9010) on a sequential order of the respective unique identifier of the first client node relative to respective unique identifiers of the plurality of client nodes.

In some embodiments, the plurality of potential neighbor nodes include (9012) one or more succeeding neighbor nodes for the first client node, and the one or more succeeding neighbor nodes include the head node of the linear communication orbit.

In some embodiments, the plurality of potential neighbor nodes include (9014) one or more preceding neighbor nodes for the first client node, and the one or more preceding neighbor nodes include the tail node of the linear communication orbit.

In some embodiments, the server allows (9016) a respective communication channel from the server to the first client node to persist until a forward communication channel has been established from a respective preceding neighbor node of the plurality of potential neighbor nodes to the first client node.

In some embodiments, the server allows (9018) a respective communication channel from the first client node to the server to persist until a forward communication channel has been established from the first client node to a respective succeeding neighbor node of the one or more potential neighbor nodes.

In some embodiments, the server allows (9020) a respective communication channel from the server to the head node to persist until a forward communication channel has been established from the first client machine to the head node. In some embodiments, the server allows (9022) a respective communication channel from the head node to the server to persist until a backward communication channel has been established from the head node to the first client node. In some embodiments, after the respective communication channel from the server to the head node and the respective communication channel from the head node to the server have been terminated, the server utilizes (9024) the first client node as a new head node of the linear communication orbit.

In some embodiments, providing the contact information is based (9026) on a sequential order of respective IP addresses of the first client node and the plurality of client nodes. In some embodiments, the contact information of the potential neighbor nodes are (9028) respective IP addresses of the potential neighbor nodes.

In some embodiments, the server receives (9030) respective registration messages from the plurality of client nodes according to a predetermined schedule. Upon detecting that a particular client node of the plurality of client nodes has failed to provide a respective registration message according to the predetermined schedule, the server updates (9032) the record to reflect departure of the particular client node from the network and the linear communication orbit.

In some embodiments, the server provides (9034) a particular management message to the plurality of client nodes by sending the particular management message to the head node via a respective communication channel from the server to the head node. In some embodiments, the head node acts upon the particular management message according to instructions contained in the particular management message and forwards the particular management message to a respective downstream neighbor of the head node in the linear communication orbit. In some embodiments, the linear communication orbit represents only one of multiple contiguous segments of a larger linear communication orbit formed within a managed network. Each of the multiple contiguous segments includes a respective head node, a respective tail node, and a respective plurality of intermediate nodes between said respective head and tail nodes. In some embodiments, the server selectively provides the particular management message to the nodes in only a subset of the multiple contiguous segments, e.g., by sending the particular management message to the respective head nodes of the subset of the multiple contiguous segments. In some embodiments, the server provides the particular management message to all the nodes in the managed network, e.g., by sending the particular management message to the respective head nodes of all of the multiple contiguous segments and any singleton nodes directly connected to the server. In some embodiments, within each contiguous segment, the management message traverses the contiguous segment, causing each node along the segment to act upon the message, until the message reaches the respective tail node of the contiguous segment. The respective tail node then reports (e.g., sending the completed status of the management message, or the collected information) to the server.

In some embodiments, the server receives (9036) a management report from at least one of the plurality of client nodes currently known to exist in the linear communication orbit, where management report includes information provided by a sequence of one or more client nodes preceding said at least one client node in the linear communication orbit. In some embodiments, the at least one of the plurality of client nodes is the tail node of the linear communication orbit.

The exemplary process 9000 performed by the server of a network is also illustrated in FIGS. 3A-3C, 4A-4Z, and 5A-5D, and accompanying descriptions.

The foregoing description has been provided with reference to specific embodiments. However, the illustrative discussions above are not intended to be exhaustive or to be limiting to the precise forms disclosed. Many modifications and variations are possible in view of the above teachings. The embodiments were chosen and described in order to best explain the principles disclosed and their practical applications, to thereby enable others to best utilize the disclosure and various embodiments with various modifications as are suited to the particular use contemplated.

What is claimed is:

1. A method of managing a network comprising a non-static collection of machines, comprising:
at a first client node to be coupled to the network:
providing a registration message to a server of the network, the registration message specifying a respective unique identifier of the first client node;
receiving from the server contact information of one or more potential neighbor nodes for the first client node in a linear communication orbit, wherein the linear communication orbit is formed by a plurality of client nodes currently known to exist in the network according to a sequential order of respective unique identifiers of the plurality of client nodes, wherein the linear communication orbit includes a head node, a tail node, and a sequence of one or more intermediate nodes between the head node and the tail node, and wherein the server provides management messages to the plurality of client nodes through the head node, and each intermediate node receives the management messages from the server through a respective upstream neighbor node in the linear communication orbit and forwards the management messages to a respective downstream neighbor node in the linear communication orbit;
proactively establishing a respective reporting channel for providing information to a respective upstream neighbor of the first client node and allowing a respective receiving channel for receiving information from the respective upstream neighbor to be established by the respective upstream neighbor, the respective upstream neighbor comprising a closest live preceding node among the one or more potential neighbor nodes; and
when the one or more potential neighbor nodes include at least one live succeeding node:
proactively establishing a respective propagation channel for providing information to a respective downstream neighbor of the first client node and allowing a respective collection channel for receiving information from the respective downstream neighbor to be established by the respective downstream neighbor, the respective downstream neighbor comprising a closest live succeeding node among the one or more potential neighbor nodes; and
upon establishment of the respective receiving and propagation channels, terminating an existing communication channel from the server to the first client node and an existing communication channel from the first client node to the server.

2. The method of claim 1, further comprising:
prior to establishment of the respective receiving channel for receiving information from the respective upstream neighbor and the respective reporting channel for sending information to the respective upstream neighbor, proactively establishing a first communication channel for receiving information from the server, and a second communication channel for sending information to the server.

3. The method of claim 1, further comprising:
receiving a network management message from the respective upstream neighbor via the respective receiving channel of the first client node, the network management message including instructions from the server regarding a network management action;
performing the network management action according to the instructions in the network management message;
updating the network management message with local updates by the first client node; and forwarding the updated network management message to the respective downstream neighbor via the respective propagation channel of the first client node.

4. The method of claim 1, further comprising:
receiving a report message from the respective downstream neighbor via the respective collection channel of the first client node;
updating the report message with local updates by the first client node; and
forwarding the updated report message to the respective upstream neighbor via the respective reporting channel of the first client node.

5. The method of claim 1, wherein:
when the one or more potential neighbor nodes include at least one live succeeding node:
the first client node establishes the respective propagation channel of the first client node before the respective receiving channel of the first client node is established; and
the first client node terminates the existing communication channel from the first client node to the server before terminating the existing communication channel from the server to the first client node.

6. A non-transitory computer-readable medium, having instructions stored thereon, which when executed by one or more processors cause the processors to perform operations comprising:
at a first client node to be coupled to a network comprising a non-static collection of machines:
providing a registration message to a server of the network, the registration message specifying a respective unique identifier of the first client node;
receiving from the server contact information of one or more potential neighbor nodes for the first client node in a linear communication orbit, wherein the linear communication orbit is formed by a plurality of client nodes currently known to exist in the network according to a sequential order of respective unique identifiers of the plurality of client nodes, wherein the linear communication orbit includes a head node, a tail node, and a sequence of one or more intermediate nodes between the head node and the tail node, and wherein the server provides management messages to the plurality of client nodes through the head node, and each intermediate node receives the management messages from the server through a respective upstream neighbor node in the linear communication orbit and forwards the management messages to a respective downstream neighbor node in the linear communication orbit;
proactively establishing a respective reporting channel for providing information to a respective upstream neighbor of the first client node and allowing a respective receiving channel for receiving information from the respective upstream neighbor to be established by the respective upstream neighbor, the respective upstream neighbor comprising a closest live preceding node among the one or more potential neighbor nodes; and
when the one or more potential neighbor nodes include at least one live succeeding node:
proactively establishing a respective propagation channel for providing information to a respective downstream neighbor of the first client node and allowing a respective collection channel for receiving information from the respective downstream neighbor to be established by the respective downstream neighbor, the respective downstream neighbor comprising a closest live succeeding node among the one or more potential neighbor nodes; and
upon establishment of the respective receiving and propagation channels, terminating an existing communication channel from the server to the first client node and an existing communication channel from the first client node to the server.

7. The non-transitory computer-readable medium of claim 6, wherein the operations further comprise:
prior to establishment of the respective receiving channel for receiving information from the respective upstream neighbor and the respective reporting channel for sending information to the respective upstream neighbor, proactively establishing a first communication channel for receiving information from the server, and a second communication channel for sending information to the server.

8. A system, comprising:
one or more processors; and
memory having instructions stored thereon, which when executed by the one or more processors cause the processors to perform operations comprising:
at a first client node to be coupled to a network comprising a non-static collection of machines:
providing a registration message to a server of the network, the registration message specifying a respective unique identifier of the first client node;
receiving from the server contact information of one or more potential neighbor nodes for the first client node in a linear communication orbit, wherein the linear communication orbit is formed by a plurality of client nodes currently known to exist in the network according to a sequential order of respective unique identifiers of the plurality of client nodes, wherein the linear communication orbit includes a head node, a tail node, and a sequence of one or more intermediate nodes between the head node and the tail node, and wherein the server provides management messages to the plurality of client nodes through the head node, and each intermediate node receives the management messages from the server through a respective upstream neighbor node in the linear communication orbit and forwards the management messages to a respective downstream neighbor node in the linear communication orbit;
proactively establishing a respective reporting channel for providing information to a respective upstream neighbor of the first client node and allowing a respective receiving channel for receiving information from the respective upstream neighbor to be established by the respective upstream neighbor, the respective upstream neighbor comprising a closest live preceding node among the one or more potential neighbor nodes; and
when the one or more potential neighbor nodes include at least one live succeeding node:
proactively establishing a respective propagation channel for providing information to a respective downstream neighbor of the first client node and allowing a respective collection channel for receiving information from the respective downstream neighbor to be established by the respective downstream neighbor, the respective downstream neighbor comprising a closest live succeeding node among the one or more potential neighbor nodes; and upon establishment of the respective receiving and propagation channels, terminating an existing communication channel from the server to the first client node and an existing communication channel from the first client node to the server.

9. The system of claim 8, wherein the operations further comprise:

prior to establishment of the respective receiving channel for receiving information from the respective upstream neighbor and the respective reporting channel for sending information to the respective upstream neighbor, proactively establishing a first communication channel for receiving information from the server, and a second communication channel for sending information to the server.

10. A method of managing a network comprising a non-static collection of machines, comprising:

at a server of the network:

maintaining a record identifying a plurality of client nodes known to be coupled to the network during a present timeframe, wherein the plurality of client nodes are self-organized in a linear communication orbit, wherein the plurality of client nodes in the linear communication orbit include a head node, a tail node, and a sequence of one or more intermediate nodes between the head node and the tail node, and wherein the server provides management messages to the plurality of client nodes through the head node, and each intermediate node receives the management messages from the server through a respective upstream neighbor node in the linear communication orbit and forwards the management messages to a respective downstream neighbor node in the linear communication orbit;

receiving a respective request from a first client node to join the network; and based on a respective unique identifier of the first client node, providing, to the first client node, contact information for a plurality of potential neighbor nodes for the first client node in the linear communication orbit, wherein the contact information is utilized by the first client node to establish a communication channel with at least one of the potential neighbor nodes and become part of the linear communication orbit.

11. The method of claim 10, wherein providing the contact information is based on a sequential order of the respective unique identifier of the first client node relative to respective unique identifiers of the plurality of client nodes.

12. The method of claim 10, wherein the plurality of potential neighbor nodes include one or more succeeding neighbor nodes for the first client node, and the one or more succeeding neighbor nodes include the head node of the linear communication orbit.

13. The method of claim 10, wherein the plurality of potential neighbor nodes include one or more preceding neighbor nodes for the first client node, and the one or more preceding neighbor nodes include the tail node of the linear communication orbit.

14. The method of claim 10, further comprising:

allowing a respective communication channel from the server to the first client node to persist until a forward communication channel has been established from a respective preceding neighbor node of the plurality of potential neighbor nodes to the first client node.

15. The method of claim 10, further comprising:

allowing a respective communication channel from the first client node to the server to persist until a forward communication channel has been established from the first client node to a respective succeeding neighbor node of the one or more potential neighbor nodes.

16. The method of claim 10, further comprising:

allowing a respective communication channel from the server to the head node to persist until a forward communication channel has been established from the first client machine to the head node.

17. The method of claim 16, further comprising:

allowing a respective communication channel from the head node to the server to persist until a backward communication channel has been established from the head node to the first client node.

18. The method of claim 17, further comprising:

after the respective communication channel from the server to the head node and the respective communication channel from the head node to the server have been terminated, utilizing the first client node as a new head node of the linear communication orbit.

19. The method of claim 10, wherein providing the contact information is based on a sequential order of respective IP addresses of the first client node and the plurality of client nodes.

20. The method of claim 10, wherein the contact information of the potential neighbor nodes are respective IP addresses of the potential neighbor nodes.

21. The method of claim 10, further comprising:

receiving respective registration messages from the plurality of client nodes according to a predetermined schedule; and upon detecting that a particular client node of the plurality of client nodes has failed to provide a respective registration message according to the predetermined schedule, updating the record to reflect departure of the particular client node from the network and the linear communication orbit.

22. The method of claim 10, further comprising:

providing a particular management message to the plurality of client nodes by sending the particular management message to the head node via a respective communication channel from the server to the head node, wherein the head node acts upon the particular management message according to instructions contained in the particular management message and forwards the particular management message to a respective downstream neighbor of the head node in the linear communication orbit.

23. The method of claim 10, further comprising:

receiving a management report from at least one of the plurality of client nodes currently known to exist in the linear communication orbit, wherein management report includes information provided by a sequence of one or more client nodes preceding said at least one client node in the linear communication orbit.

24. The method of claim 23, wherein the at least one of the plurality of client nodes is the tail node of the linear communication orbit.

25. A non-transitory computer-readable medium, having instructions stored thereon, which when executed by one or more processors cause the processors to perform operations comprising:

at a server of a network comprising a non-static collection of machines:

maintaining a record identifying a plurality of client nodes known to be coupled to the network during a present timeframe, wherein the plurality of client nodes are self-organized in a linear communication orbit, wherein the plurality of client nodes in the linear communication orbit include a head node, a tail node, and a sequence of one or more intermediate nodes between the head node and the tail node, and wherein the server provides management messages to the plurality of client nodes through the head node, and each intermediate node receives the management messages from the server through a respective upstream neighbor node in the linear communication orbit and forwards the management messages to a respective downstream neighbor node in the linear communication orbit;

receiving a respective request from a first client node to join the network; and based on a respective unique identifier of the first client node, providing, to the first client node, contact information for a plurality of potential neighbor nodes for the first client node in the linear communication orbit, wherein the contact information is utilized by the first client node to establish a communication channel with at least one of the potential neighbor nodes and become part of the linear communication orbit.

26. The non-transitory computer-readable medium of claim 25, wherein providing the contact information is based on a sequential order of the respective unique identifier of the first client node relative to respective unique identifiers of the plurality of client nodes.

27. A system, comprising:

one or more processors; and memory having instructions stored thereon, which when executed by the one or more processors cause the processors to perform operations comprising:

at a server of a network comprising a non-static collection of machines:

maintaining a record identifying a plurality of client nodes known to be coupled to the network during a present timeframe, wherein the plurality of client nodes are self-organized in a linear communication orbit, wherein the plurality of client nodes in the linear communication orbit include a head node, a tail node, and a sequence of one or more intermediate nodes between the head node and the tail node, and wherein the server provides management messages to the plurality of client nodes through the head node, and each intermediate node receives the management messages from the server through a respective upstream neighbor node in the linear communication orbit and forwards the management messages to a respective downstream neighbor node in the linear communication orbit; and receiving a respective request from a first client node to join the network;

based on a respective unique identifier of the first client node, providing, to the first client node, contact information for a plurality of potential neighbor nodes for the first client node in the linear communication orbit, wherein the contact information is utilized by the first client node to establish a communication channel with at least one of the potential neighbor nodes and become part of the linear communication orbit.

28. The system of claim 26, wherein providing the contact information is based on a sequential order of the respective unique identifier of the first client node relative to respective unique identifiers of the plurality of client nodes.

* * * * *